United States Patent
Elkaim et al.

(10) Patent No.: US 10,769,197 B2
(45) Date of Patent: Sep. 8, 2020

(54) MEDIA UNIT RETRIEVAL AND RELATED PROCESSES

(71) Applicant: DREAM IT GET IT LIMITED, London (GB)

(72) Inventors: Michael Elkaim, London (GB); Michael Kopp, London (GB); Kristjan Korjus, London (GB)

(73) Assignee: DREAM IT GET IT LIMITED, London (GB)

( * ) Notice: Subject to any disclaimer, the term of this patent is extended or adjusted under 35 U.S.C. 154(b) by 280 days.

(21) Appl. No.: 15/756,502

(22) PCT Filed: Aug. 31, 2016

(86) PCT No.: PCT/EP2016/070493
§ 371 (c)(1),
(2) Date: Feb. 28, 2018

(87) PCT Pub. No.: WO2017/037103
PCT Pub. Date: Mar. 9, 2017

(65) Prior Publication Data
US 2018/0260416 A1 Sep. 13, 2018

(30) Foreign Application Priority Data

Sep. 1, 2015 (EP) .................................... 15183394
Sep. 1, 2015 (EP) .................................... 15183395
(Continued)

(51) Int. Cl.
*G06F 16/58* (2019.01)
*G06F 16/21* (2019.01)
(Continued)

(52) U.S. Cl.
CPC ............ *G06F 16/58* (2019.01); *G06F 16/211* (2019.01); *G06F 16/907* (2019.01); *G06F 17/16* (2013.01); *G06N 3/04* (2013.01)

(58) Field of Classification Search
CPC ...... G06F 16/58; G06F 16/907; G06F 16/211; G06F 17/16; G06N 3/04
(Continued)

(56) References Cited

U.S. PATENT DOCUMENTS 5,579,471 A 11/1996 Barber et al.
5,696,964 A 12/1997 Cox et al.
(Continued)

FOREIGN PATENT DOCUMENTS

AU 2011299401 A1 1/2013
CA 2804052 A1 3/2012
(Continued)

OTHER PUBLICATIONS

International Search Report and Written Opinion for related PCT application No. PCT/EP2016/070493, dated Dec. 6, 2016, in 20 pages.
(Continued)

*Primary Examiner* — Evan Aspinwall
(74) *Attorney, Agent, or Firm* — Procopio, Cory, Hargreaves & Savitch LLP

(57) ABSTRACT

Media unit retrieval methods, systems and computer program products are provided that allow a user to search for an item by iteratively presenting media units such as images representing items to the user and receiving user input consisting of selections of the presented media units (including possibly the empty selection). Features, or attributes, a user is interested in, for example semantic features, are inferred from the interaction and media units are retrieved for presentation based on similarity with user-selected media
(Continued)

units, through sampling of a probability distribution describing the intent or interests, or combinations of approaches. Accordingly, the user-experience is akin to a conversation about what the user is looking for. Retrieval may be based on both selected and unselected media units and the selection may comprise making a selection with a single action. Further, a database of media units can capture similarity relationships for efficient media unit retrieval.

17 Claims, 21 Drawing Sheets

(30) Foreign Application Priority Data

| Sep. 1, 2015 | (EP) | 15183396 |
|---|---|---|
| Sep. 1, 2015 | (EP) | 15183397 |
| Sep. 1, 2015 | (EP) | 15183398 |
| Sep. 1, 2015 | (EP) | 15183399 |
| Sep. 1, 2015 | (EP) | 15183401 |
| Sep. 1, 2015 | (EP) | 15183402 |

(51) Int. Cl.
*G06F 16/907* (2019.01)
*G06F 17/16* (2006.01)
*G06N 3/04* (2006.01)

(58) Field of Classification Search
USPC .......................................................... 707/706
See application file for complete search history.

(56) References Cited

U.S. PATENT DOCUMENTS

| 5,751,286 | A | 5/1998 | Barber et al. |
| 6,182,069 | B1 | 1/2001 | Niblack et al. |
| 6,347,313 | B1 | 2/2002 | Ma et al. |
| 6,859,802 | B1 | 2/2005 | Rui |
| 7,003,515 | B1 | 2/2006 | Glaser et al. |
| 7,028,325 | B1 | 4/2006 | Rui et al. |
| 7,493,340 | B2 | 2/2009 | Rui |
| 7,519,200 | B2 | 4/2009 | Gokturk et al. |
| 7,546,293 | B2 | 6/2009 | Zhang et al. |
| 7,613,686 | B2 | 11/2009 | Rui |
| 7,620,552 | B2 | 11/2009 | Rui et al. |
| 7,657,100 | B2 | 2/2010 | Gokturk et al. |
| 7,657,126 | B2 | 2/2010 | Gokturk et al. |
| 7,660,468 | B2 | 2/2010 | Gokturk et al. |
| 7,660,822 | B1 | 2/2010 | Pfleger |
| 7,760,917 | B2 | 7/2010 | Vanhoucke et al. |
| 7,764,849 | B2 | 7/2010 | Aguera y Arcas et al. |
| 7,783,135 | B2 | 8/2010 | Gokturk et al. |
| 7,809,192 | B2 | 10/2010 | Gokturk et al. |
| 7,809,722 | B2 | 10/2010 | Gokturk et al. |
| 7,945,099 | B2 | 5/2011 | Gokturk et al. |
| 7,962,482 | B2 | 6/2011 | Handman et al. |
| 7,970,240 | B1 | 6/2011 | Chao et al. |
| 7,983,489 | B2 | 7/2011 | Aguera y Arcas et al. |
| 8,041,688 | B2 | 10/2011 | Itoh |
| 8,065,313 | B2 | 11/2011 | Yagnik |
| 8,139,900 | B2 | 3/2012 | Gokturk et al. |
| 8,161,072 | B1 | 4/2012 | Pfleger |
| 8,190,604 | B2 | 5/2012 | Wen et al. |
| 8,306,976 | B2 | 11/2012 | Handman et al. |
| 8,311,289 | B2 | 11/2012 | Vanhoucke et al. |
| 8,315,442 | B2 | 11/2012 | Gokturk et al. |
| 8,320,707 | B2 | 11/2012 | Gokturk et al. |
| 8,326,812 | B2 | 12/2012 | Itoh |
| 8,335,754 | B2 | 12/2012 | Dawson et al. |
| 8,345,982 | B2 | 1/2013 | Gokturk et al. |
| 8,412,594 | B2 | 4/2013 | Kundu |
| 9,110,955 | B1 * | 8/2015 | Bernhardsson ... G06F 16/24578 |
| 2003/0065661 | A1 | 4/2003 | Chang et al. |
| 2006/0165379 | A1 * | 7/2006 | Agnihotri ............... G11B 27/28 386/231 |
| 2006/0206478 | A1 | 9/2006 | Glaser et al. |
| 2008/0168055 | A1 * | 7/2008 | Rinearson ............. G06F 16/907 |
| 2009/0300008 | A1 * | 12/2009 | Hangartner ......... G06F 16/4387 |
| 2010/0100416 | A1 * | 4/2010 | Herbrich ................ G06Q 30/02 705/7.32 |
| 2010/0153411 | A1 * | 6/2010 | Toebes ................ G06F 16/9535 707/758 |
| 2010/0226533 | A1 | 9/2010 | Bharath et al. |
| 2011/0029561 | A1 * | 2/2011 | Slaney .................. G06F 16/583 707/772 |
| 2011/0034176 | A1 | 2/2011 | Lord et al. |
| 2011/0161354 | A1 | 6/2011 | Ma |
| 2011/0314039 | A1 * | 12/2011 | Zheleva ................ G06F 16/437 707/767 |
| 2012/0054060 | A1 | 3/2012 | Kundu |
| 2012/0254191 | A1 * | 10/2012 | Sanyal .................... G06F 16/58 707/744 |
| 2013/0121571 | A1 | 5/2013 | Gokturk et al. |
| 2013/0121589 | A1 | 5/2013 | Gokturk et al. |
| 2013/0127893 | A1 | 5/2013 | Gokturk et al. |
| 2013/0129228 | A1 | 5/2013 | Gokturk et al. |
| 2013/0132236 | A1 | 5/2013 | Gokturk et al. |
| 2013/0136319 | A1 | 5/2013 | Vanhoucke et al. |
| 2014/0250127 | A1 * | 9/2014 | Rhinelander .......... G06F 16/22 707/739 |
| 2015/0339381 | A1 * | 11/2015 | Jain ..................... G06F 16/9024 707/798 |
| 2016/0328432 | A1 * | 11/2016 | Raghunathan ...... G06F 16/2228 |

FOREIGN PATENT DOCUMENTS

| CN | 1094219 A | 11/1994 |
| CN | 101467145 A | 6/2009 |
| DE | 69723346 D1 | 8/2003 |
| DE | 502007009705 D1 | 11/2010 |
| EP | 802489 A2 | 10/1997 |
| EP | 2044532 A1 | 4/2009 |
| EP | 2064652 A1 | 6/2009 |
| EP | 2109049 A1 | 10/2009 |
| EP | 2260416 A2 | 12/2010 |
| EP | 2307983 A1 | 4/2011 |
| EP | 2353126 A1 | 8/2011 |
| EP | 2609551 A2 | 7/2013 |
| GB | 0820273 | 12/2008 |
| JP | 3053003 B2 | 6/2000 |
| JP | 2009025218 A | 2/2009 |
| WO | 2009129659 A1 | 10/2009 |
| WO | 2010000069 A1 | 1/2010 |
| WO | 2010052284 A1 | 5/2010 |
| WO | 2011123331 A1 | 10/2011 |

OTHER PUBLICATIONS

Bhanu et al. "Concepts learning with fuzzy clustering and relevance feedback." Engineering Applications of Artificial Intelligence. 15(2):123-138 (Apr. 1, 2002).
Partial European Search Report for related EP Patent Application No. EP15183398.5, dated May 18, 2016, in 9 pages.
Heesch. "The NN k technique for image searching and browsing." Nov. 2005, pp. 1-151. Retrieved from the Internet on Apr. 22, 2016: http://people.kmi.open.ac.uk/stefan/www-pub/d.heesch-phd.pdf.
Cox. "Information retrieval by browsing." 1992, pp. 1-6. Retrieved from the Internet on Apr. 26, 2016: http://web.simmons.edu/~chen/nit/NIT'92/069-cox.htm.
Partial European Search Report for related EP Patent Application No. EP15183399.3, dated May 18, 2016, in 9 pages.
Extended European Search Report for related EP Patent Application No. EP15183401.7, dated Apr. 26, 2016, in 10 pages.
Thomee. "A picture is worth a thousand words Content-based image retrieval techniques." ASCI Dissertation Series: 216 (Nov. 3, 2010); pp. 1-199. Leiden, The Netherlands. Retrieved from the Internet on Apr. 12, 2016: https://openaccess.leidenuniv.nl/bitstream/handle/1887/16108/ThesisFinalSubmission.pdf?sequence=1.

(56) References Cited

OTHER PUBLICATIONS

Extended European Search Report for related EP Patent Application No. EP15183397.7 dated Mar. 24, 2016, in 11 pages.
Extended European Search Report for related EP Patent Application No. EP15183394.4 dated Mar. 24, 2016, in 10 pages.
Extended European Search Report for related EP Patent Application No. EP15183396.9 dated Mar. 30, 2016, in 11 pages.
Extended European Search Report for related EP Patent Application No. EP15183395.1 dated Mar. 24, 2016, in 10 pages.
Elo (Elo, Arpad (1978). The Rating of Chessplayers, Past and Present. Arco. ISBN 0-668-04721-6.).
Glickman, Mark E., "Parameter estimation in large dynamic paired comparison experiments" (1999) Applied Statistics, 48, 377-394.
https://github.com/BVLC/caffe/tree/master/models/bvlc_alexnet.
ImageNet Classification with Deep Convolutional Neural Networks, Alex Krizhevsky et al, Advances in Neural Information Processing Systems 25, pp. 1097-1105, 2012, Curran Associates, Inc available at http://papers.nips.cc/paper/4824-imagenetclassification-with-deep-convolutional-neuralnetworks.pdf.AlexNet.
Wikipedia. "Principal component analy." Retrieved from the Internet on Feb. 27, 2018: https://en.wikipedia.org/wiki/Principal_component_analy.
Wikipedia. "Hellinger distance." Retrieved from the Internet on Feb. 27, 2018: https://en.wikipedia.org/wiki/Hellinger_distance.
Wikipedia. "Multivariate normal distributi." Retrieved from the Internet on Feb. 27, 2018: https://en.wikipedia.org/wiki/Multivariate_normal_distributi.

* cited by examiner

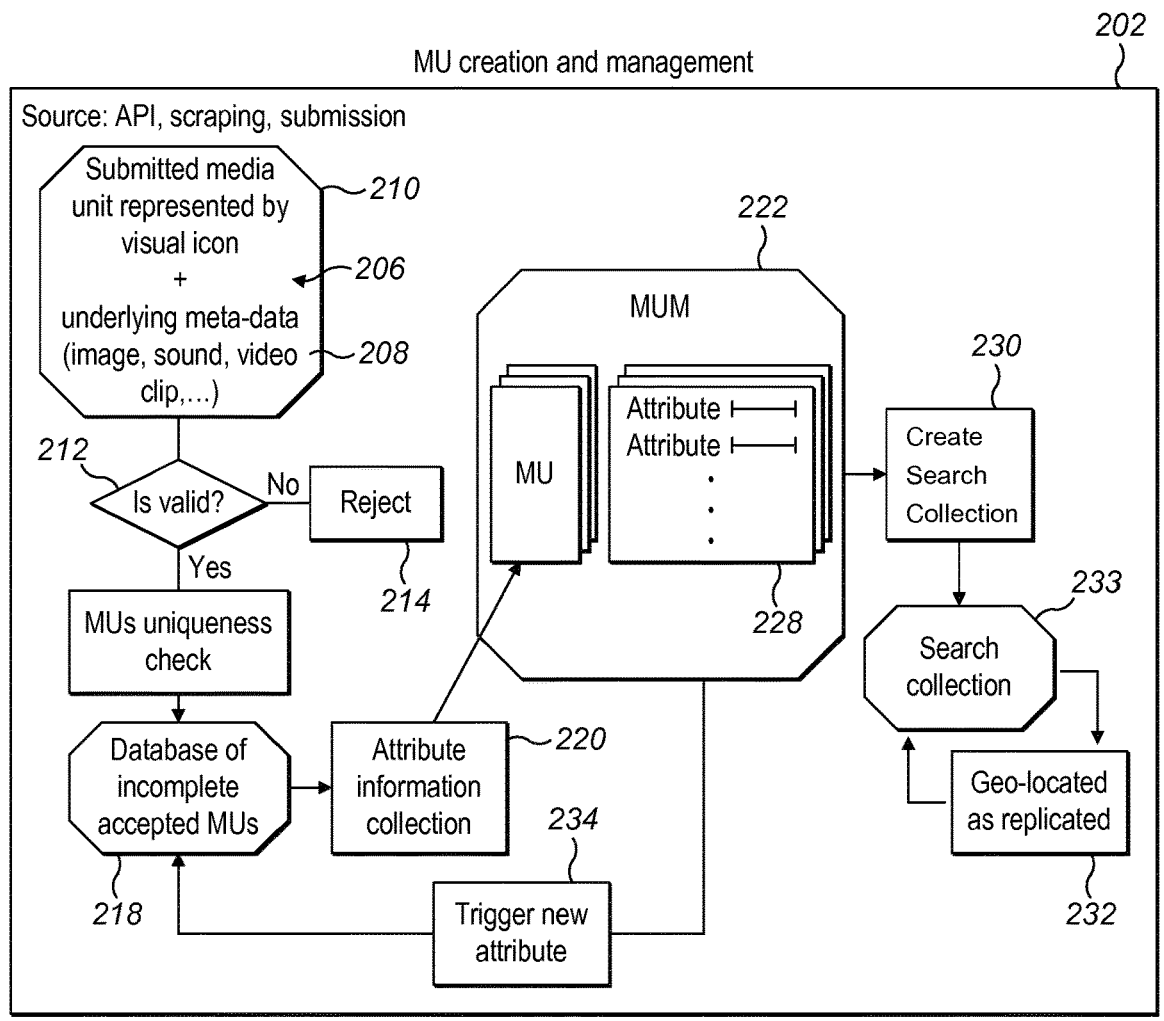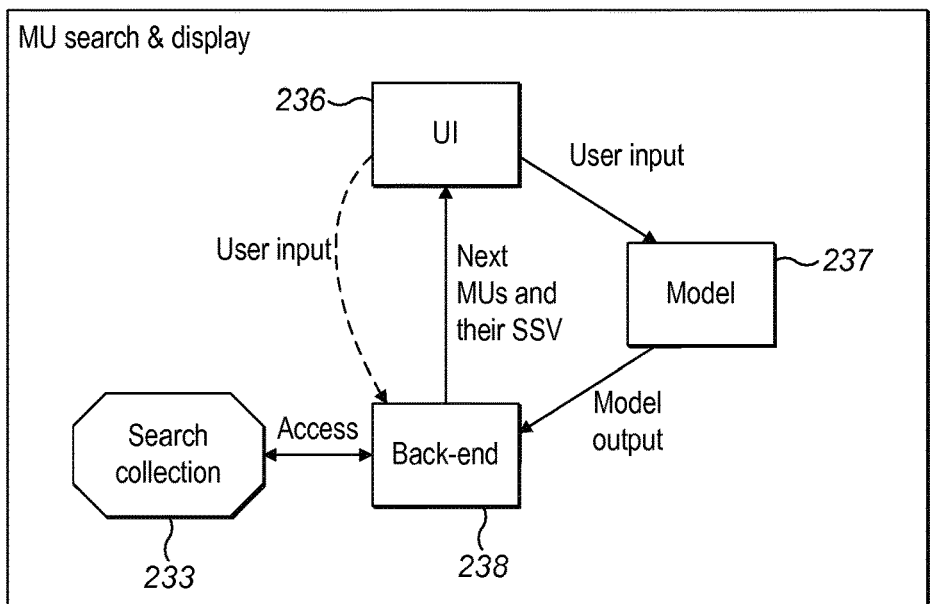
FIG. 2

Collected annotation values can be 'comparative' or 'absolute'

Y=1 Z=1 max neighbours=total number of neighbours in the list

N=value Y from the neighbours list

O=value Z in the neighbours list

Repeat this for all values in the neighbours list if N is not O
Measure the distance from N to O
Measure the distance from N to X
Measure the distance from O to X
if
(N to O) is less than (N to X)
and
(O to X) is less than (N to X)
then N is an indirect neighbour of X
Z=Z+1
if Z>max neighbours then Z=1

Repeat this for each value in the neighbours list

Y=Y+1
if Y>max neighbours then

Any value that is not an indirect neighbour is a direct neighbour

FIG. 11

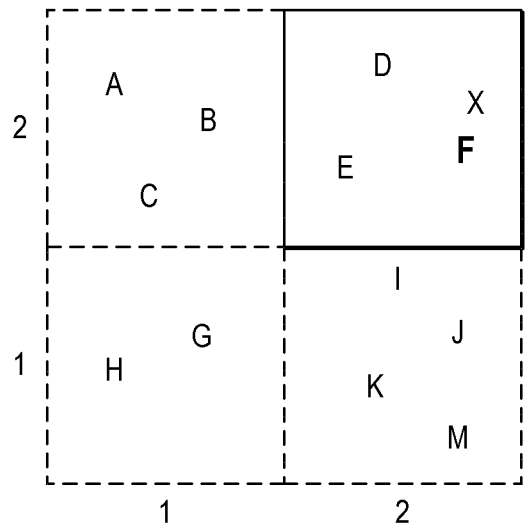

FIG. 12

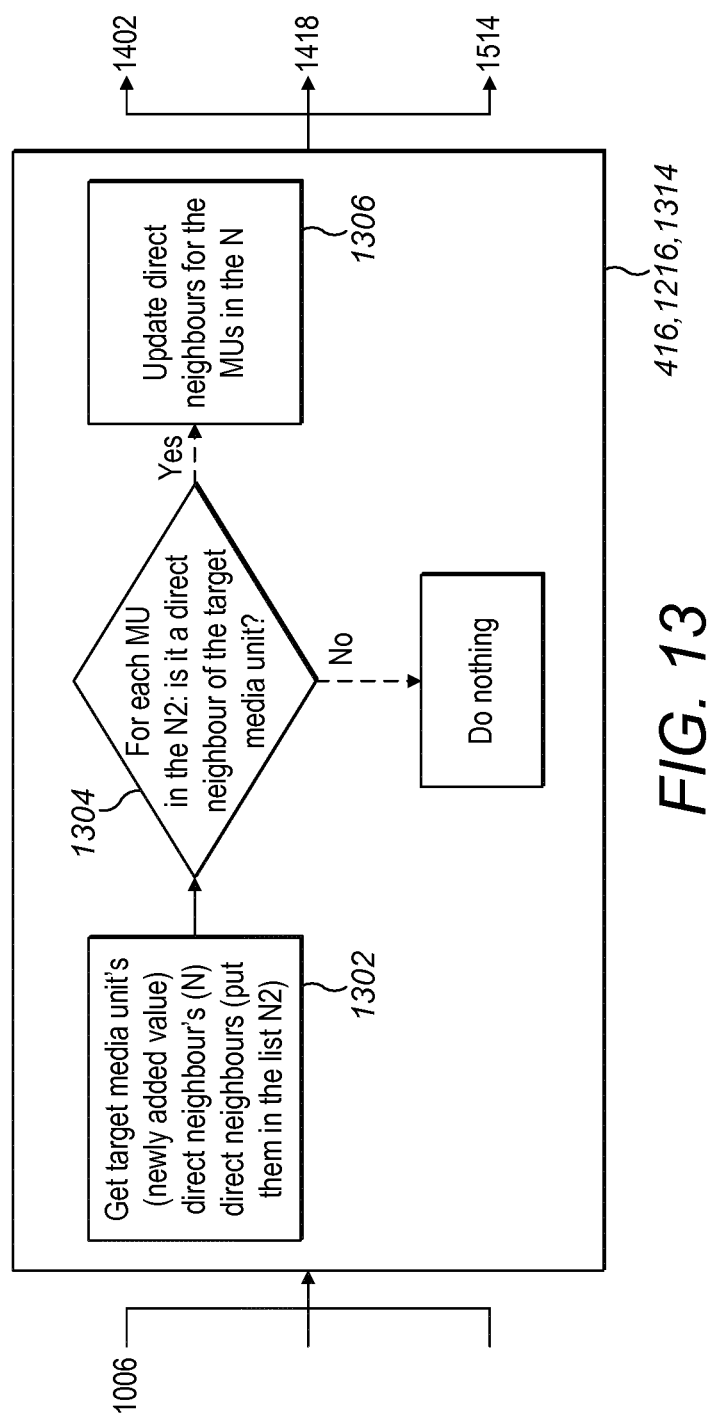

Max PP = 735   Log of max PP = 9.5216004397   Max depth (floor of log2 (max PP))+2 = 11

| Depth in attribute | 2 to the power of (depth - 1) | Min PP=(max PP-(2 to the power of (depth - 1) | Number of MU at this level (in each levels representatives list) |
|---|---|---|---|
| 11 | 1024 | -289* | 735 (up to 1024 media units could fit in this level) |
| 10 | 512 | 223 | 512 |
| 9 | 256 | 479 | 256 |
| 8 | 128 | 607 | 128 |
| 7 | 64 | 671 | 64 |
| 6 | 32 | 703 | 32 |
| 5 | 16 | 719 | 16 |
| 4 | 8 | 727 | 8 |
| 3 | 4 | 731 | 4 |
| 2 | 2 | 733 | 2 |
| 1 | 1 | 734 | 1 |

FIG. 16

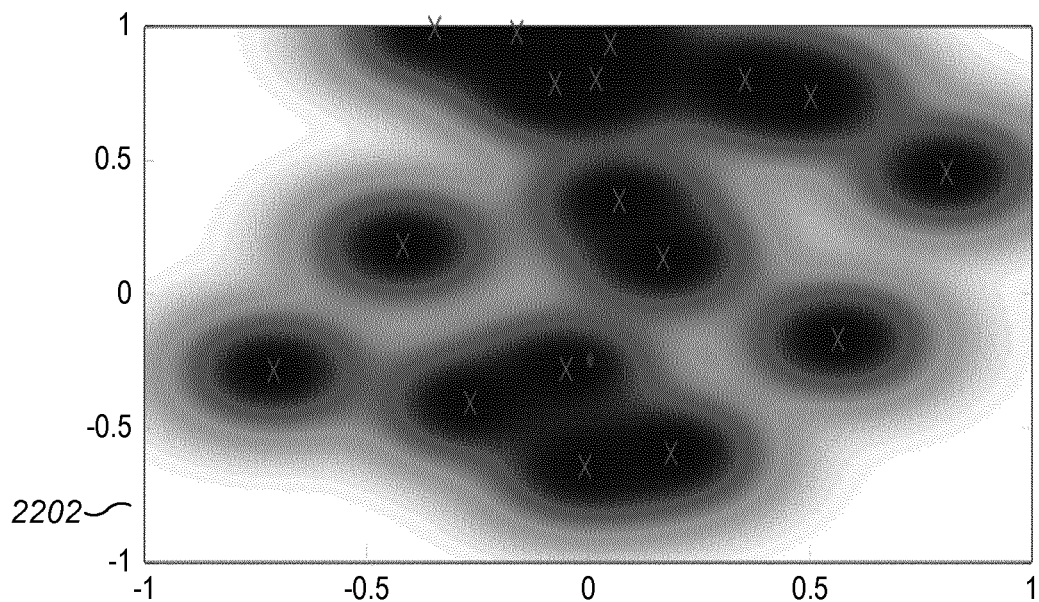
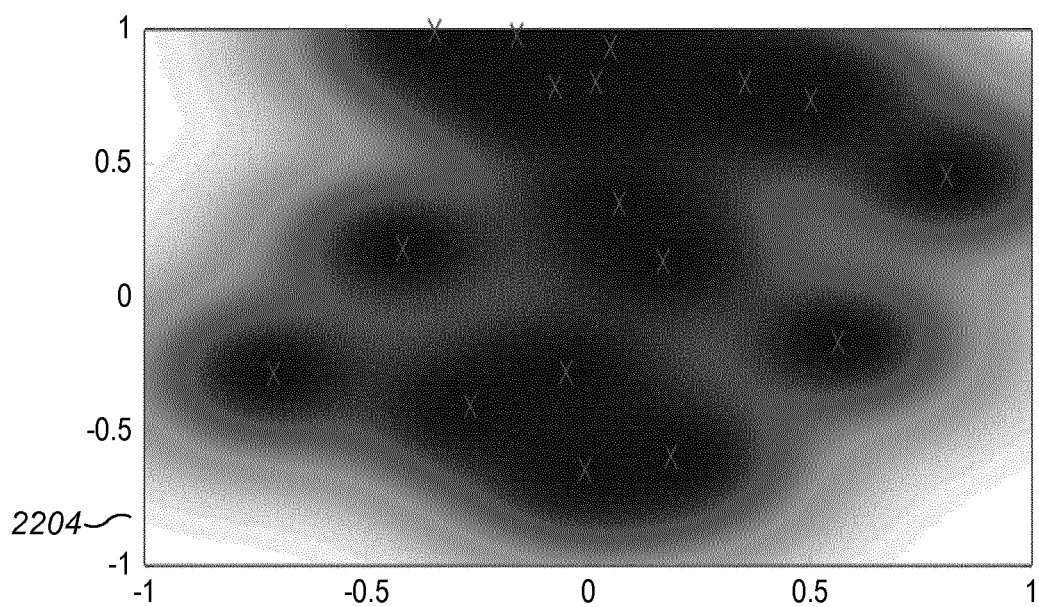
FIG. 22

| Level 0 | |
|---|---|
| Cube id | All MUs |
| | |

⋮

| Level k-1 | |
|---|---|
| Cube id 1 | MUs in cube 1 |
| Cube id 2 | MUs in cube 2 |
| ⋮ | ⋮ |
| Cube id $N_{k-1}$ | MUs in cube $N_{k-1}$ |
| | |

| Level k-1 | |
|---|---|
| Cube 1 | MUs in cube 1 |
| ⋮ | ⋮ |
| | |
| | |
| Cube $N_k$ | MUs in cube $N_k$ |

*FIG. 24*

MEDIA UNIT RETRIEVAL AND RELATED PROCESSES

The present disclosure relates systems and methods for transmitting media units or media unit identifiers to a user in response to a received user input. The present disclosure further relates to related systems and methods for supporting the selection of media units to transmit. In particular, although not exclusively, the present disclosure relates to media unit retrieval in response to user input so that the retrieved media units are relevant to something the user is looking for, as judged by the user input.

BACKGROUND

In the field of information retrieval, in particular in the context of image searches, many approaches are known to present images to a user, receive feedback about the relevance of the presented images from the user and present a new set of images taking account of the feedback. This process is repeated until the user has found the image he or she was looking for. Many of these approaches are based on a feature analysis of images rated as relevant by the user and use low-level image features. This state of the art is not satisfactory in that the features used are often not well adapted to represent the attributes or features of what the user is looking for and in that the user needs to make a conscious effort to rate the relevance of the presented images.

SUMMARY

Aspects of the invention are set out in the independent claims. Optional features of embodiments of the invention are set out in the dependent claims.

In some embodiments, a probability distribution is maintained and iteratively updated based on user input, in particular the selection of none, one or more media units, for example images, presented to the user. The distribution represents the user's intention behind the selections made, that is a particular set of attribute values that correspond to a target the user has in mind. By maintaining a distribution of probabilities of sets of attribute values (comparable to points in a feature space) being representative of what the user wants or prefers, the resulting distribution can be used in various ways to select media units for presentation to the user in response to user input, such as the selection of one or more media units. In some embodiments, the distribution is used to estimate the importance a user associates with each attribute. In some embodiments, the distribution (or a related one) is used to generate a set of media units to be presented to the user by means of sampling. Naturally, some embodiments combine the two approaches. Modelling the user's intentions in terms of attributes the user is looking for/deems important allow presented media units to be made more relevant, so that the browsing or search process is made more efficient.

In some embodiments, the process for selecting media units to be presented makes use of information not only about the media unit(s) selected by a user (if any) from a set of presented media units, but also from the remaining, presented but not selected, media units. The inventor has realised that those media units that are not selected also contain information about what the user wants, and that the search or browsing process may be made more efficient, more targeted and more quickly converging by making use of that information. For example, the information gained may be used to dispense with the need to ask the user for explicit relevance rankings when providing his or her feedback.

In some embodiments, the attributes associated with the media units are semantic attributes, that is attributes that are semantic in the conventional and computer science meaning of the term, i.e. attributes of the items represented by the media units that are meaningful to a human observer. This is in contrast to the features used in state of the art methods, which are low level image processing features characteristic of how the items are represented graphically in the image, rather than proper to the items represented. By using a representation that is closely linked to the meaning of represented items rather than the way in which they are represented, search and browsing processes may again be made more efficient and targeted on the assumption that the user's goal is to find certain items, rather than media units having certain representational features, such as texture and contrast in the case of images. This results in a decreased amount of time necessary for the system to identify and present media units that satisfy the user's search query, as compared to conventional approaches.

In some embodiments, feedback is received from the user in the form of single-action user inputs. By foregoing additional information that is required to be provided by the user by prior art methods, a simpler and more user-friendly user interface is provided.

In some embodiments, the level of mutual similarity of the results provided at each iteration are varied purposefully, for example making the media units presented at each iteration more similar to each other with each iteration. By varying the level of similarity, the user is enabled to "zoom" in on the desired result as progressively refined sets are provided for the user to choose from, while having a wider choice of media units earlier in the process. In other words, as more information about the user's intention is gathered, the results are more focused around what the target is estimated to be, while early iterations allow a wider choice to elucidate what the target is. In some embodiments, the level of similarity is adapted based on the user selections received, so that the process can return to a wider choice when it is estimated that the user wants to change course in the process. In some embodiments, an efficient implementation has pre-computed sets of media units with respective levels of similarity (or granularity in an attribute space) and the process switches between these pre-computed sets based on the inputs received from the user.

In some embodiments, retrieval of media units is based on pairwise comparisons using a similarity measure between one or more selected media units and media units available for presentation. Some embodiments efficiently implement similarity based retrieval using pre-computed neighbourhood/similarity relationships. In some embodiments, each media unit has associated with it a list of media units that are similar to it. This allows media units that are similar to, e.g. a selected media unit, to be retrieved using the corresponding list, rather than having to compute similarity measures across the entire set of available media units for each similarity comparison.

In some embodiments, media units are presented that are most dissimilar compared to media unit(s) selected from a previously presented set. This is counterintuitive in the context of browsing or searching methods, which typically aim to converge on what the user is looking for by finding items similar to those selected by the user. However, the inventor has realised that providing a more divergent set of results, initially or periodically, can improve convergence overall by allowing the user a broader choice of the region of the search space in which subsequent iterations can focus. In some embodiments, the presentation of dissimilar units is not unfettered, but the media units are selected from a set of relatively similar media units (e.g. as judged by a neighbourhood structure) and returning the most dissimilar media units from that set.

In some embodiments, the attributes of a media unit are represented by a probability distribution (a joint distribution over the attributes), or, equivalently, a collection of distributions (one for each attribute) the product of which may form the joint distribution on the assumption that the attributes are independent. An example of a distribution fulfilling this criterion is a block-diagonal normal distribution for the joint distribution. By using distributions to represent the attributes of media units, a richer representation enabling a spread of values/uncertainty in the values to be represented is provided. For example, where attributes are based on human input, the uncertainty or spread of annotations applied the population that annotated the attributes can be captured. In some embodiments, the distributions are parametric and parameters of the respective distribution for each attribute are associated with the media unit in place of only a single value for each attribute. In some embodiments, in particular where attributes are treated as equally important/equally weighted (or not weighted), all attributes and all their dimensions can be represented by a single distribution, for example a normal distribution with unconstrained covariance matrix (i.e. not limited to being diagonal or block diagonal).

At least the following aspects and embodiments are disclosed:

A1. A computer-implemented method of transmitting media units or media unit identifiers for presentation of media units to a user on a user device, the method comprising
  transmitting a set of media units or respective media unit identifiers for presentation of the media units to the user, each media unit being associated with a respective feature set defining a set of attribute values or a set of parameters defining a probability distribution over attribute values for respective attributes; and repeatedly:
  receiving a user input made by the user when presented with media units of the set of media units;
  updating a probability distribution over attribute values of the attributes using the user input;
  selecting a next set of media units using the updated probability distribution; and
  transmitting the media units of the next set or respective media unit identifiers for presentation of the media units to the user.

A2. A computer implemented method as set out in item A1, wherein the user input identifies a set of one or more media units not selected by the user.

A3. A computer-implemented method as set out in item A1, wherein
  receiving the user input comprises receiving one or more media unit identifiers each identifying a respective user-selected media unit selected by the user from media units presented to the user; and
  updating the probability distribution over attribute values of the attributes comprises using each respective feature set of the one or more selected media units.

A4. A method as set out in item A1, A2 or A3, wherein the probability distribution is parameterised by one or more parameters and updating the probability distribution comprises updating the distribution over the parameters using the set of attribute values of any selected media units; and determining updated parameters of the probability distribution from the distribution over the parameters.

A5. A method as set out in item A1, A2, A3 or item A4, wherein updating the probability distribution comprises updating the probability distribution using the set of attribute values of any user-selected media units and respective sets of attribute values of at least some remaining media units of the media units presented to the user.

A6. A method as set out in item A5, wherein updating the probability distribution comprises sampling sets of attribute values from the probability distribution with the updated parameters and subsampling the sampled sets of attribute values to define a plurality of subsampled sets of attribute values such as to reduce the similarity between the subsampled set of attribute values and the at least some remaining media units.

A7. A method as set out in item A5, wherein each feature set defines a respective set of attribute values and updating the probability distribution comprises sampling sets of attribute values from the probability distribution with the updated parameters and subsampling the sampled sets of attribute values to define a plurality of subsampled sets of attribute values such as to reduce or eliminate the probability of a set of attribute values of the plurality subsampled sets of attribute values coinciding with any of the sets of attribute values of the at least some remaining media units.

A8. A method as set out in item A6 or A7, wherein the probability distribution is a normal distribution and updating the probability distribution comprises determining parameters of the normal distribution from the plurality of subsampled sets of attribute values.

A9. A method as set out in any one of items A1 to A8, wherein each feature set defines a respective set of attribute values and selecting the next set of media units comprises
  for each attribute, computing a distance between the set of attribute values of one of the one or more user-selected media unit and respective sets of attribute values for a plurality of media units;
  computing a weighted combination of the distances for at least some of the attributes, wherein each distance is weighted by a respective attribute weight and the attribute weights are computed using the probability distribution; and
  using the weighted combination of the distances to select the next set of media units.

A10. A method as set out in item A9, wherein computing the attribute weights comprises
  computing, for each attribute, a measure of information gain between a component of the probability distribution for the attribute after updating and a component of the probability distribution for the attribute before updating; and
determining each attribute weight based on the respective measure of information.

A11. A method as set out in any one of items A1 to A8, wherein selecting the next set of media units comprises selecting a media unit of the next set of media units based on similarity of the media unit to a sampled set of attribute values sampled from a sampling distribution.

A12. A method as set out in item A11, wherein each feature set defines a respective set of attribute values and wherein the media units are grouped into media unit groups corresponding to a respective range for each attribute value based on the respective sets of attribute values and selecting the next set of media units comprises:

selecting a media unit group based on the sampled set of attribute values being within the respective range for each attribute value; and selecting a media unit from the media units in the selected media unit group.

A13. A method as set out in item A12, wherein the media units are grouped into media unit groups corresponding to a respective range for each attribute value based on the respective sets of attribute values for each of a plurality of levels, the size of the respective ranges increasing from one level to the next, and selecting the next set of media units comprises:

at a first one of the levels, determining if a media unit group exist associated with a range encompassing the sampled set of attribute values;

if the determination is negative, determining if a media unit group exist associated with a range encompassing the sampled set of attribute values at a second one of the levels, wherein the second one of the levels has larger ranges than the first one of the levels; and if the determination is positive, selecting a media unit from the media units in the media unit group associated with the range encompassing the sampled set of attribute values.

A14. A method as set out in item A12 or A13, wherein selecting a media unit of the next set of media units based on similarity comprises computing a measure of similarity between the set of attribute values of the media unit and the sampled set of attribute values.

A15. A method as set out in any one of items A1 to A8 or A11, wherein each feature set defines a respective set of parameters defining a probability distribution over attribute values.

A16. A method as set out in item A15, wherein selecting the next set of media units comprises selecting a media unit of the next set of media units based on values of the respective media unit distribution at a plurality of sampled sets of attribute values sampled from a sampling distribution.

A17. A method as set out in any one of items A11 to A14 or A16 and item A6, or any one of items A11 to A14 or A16 and A7, wherein the sampled set of attribute values is one of the plurality of subsampled sets of attribute values.

A18. A method as set out in any one of items A1 to A17, wherein one or more of the attributes are semantic attributes representative of semantic features of items represented by the media units.

B1. A computer-implemented method for transmitting media units or media unit identifiers for presentation of media units to a user on a user device, optionally as set out in any one of items A1 to A18, the method comprising transmitting a set of media units or respective media unit identifiers for presentation of the media units to the user, each media unit being associated with a respective feature set defining a set of attribute values or a set of parameters defining a probability distribution over attribute values for respective attributes; and repeatedly:

receiving an identifier identifying one or more user-selected media units selected by the user from media units presented to the user;

selecting a next set of media units based on respective feature sets of the one or more selected media units and respective feature sets of at least some of the remaining media units of the presented media units;

transmitting the media units of the next set or respective media unit identifiers for presentation of the media units to the user.

B2. A method as set out in item B1, wherein the next set of media units is selected by selecting the next set of media units using a selection function, the method comprising adjusting one or more parameters of the selection function based on the respective feature sets of the one or more selected media units and the respective feature sets of the at least some of the remaining media units of the presented media units.

B3. A method as set out in item B1 or B2, wherein selecting a next set of media units comprises selecting the next set of media units using a measure of similarity between the feature set of a user-selected media unit and the feature set of another media unit for potential inclusion in the next set; and adjusting one or more parameters of the measure of similarity based on the feature of the selected media unit and respective feature sets of the at least some of the remaining media units of the presented media units.

B4. A method as set out in item B3, wherein selecting the next set of media units comprises computing a distance between the feature set of the user-selected media unit and the respective feature sets of a plurality of media units for at least some of the attributes;

computing a weighted combination of the distances for the at least some of the attributes for each of the plurality of media units, wherein each distance is weighted by a respective attribute weight and the attribute weights are computed using the feature sets of the selected and the at least some of the remaining media units; and using the weighted combination of the distances to select the next set of media units.

B5. A method as set out in item B4, wherein the feature sets define respective sets of attribute values and computing the attribute weights comprises computing for each attribute a distance between a respective attribute value of each of the at least some remaining media units and an attribute value of the selected media unit.

B6. A method as set out in item B5, wherein computing the attribute weights comprises computing, for each attribute, an average of a difference between a distance between a respective attribute value of each of the at least some remaining media units and an attribute value of the selected media unit and a distance between a respective attribute value of each of the at least some remaining media units and an average attribute value of a set of media units comprising the selected media unit and the at least some remaining media units.

B7. A method as set out in item B6, wherein computing the average difference for each attribute comprises weighting each difference with an average across attributes of a distance between each respective one of the at least some remaining media units and the selected media unit.

B8. A method as set out in any one of items B4 to B7, wherein computing the attribute weights comprises computing an update quantity for each of the at least some of the attributes using the attribute values of the selected and the at least some of the remaining media units and combining each update quantity with a previously computed respective attribute weight.

B9. A method as set out in item B8, wherein the update quantity and previously computed attribute weight are combined in a proportion based on a comparison of the current and previous user selection.

B10. A method as set out in item B4, wherein computing the attribute weights comprises updating a probability distribution over sets of attribute values based on the selected media unit and the at least some of the remaining media units such that the probability distribution reflects a probability that a corresponding set of attribute values represents a user-intended target set of attribute values; and computing, for each attribute, a measure of information gain between a component of the probability distribution for the attribute after updating and a component of the probability distribution for the attribute before updating; and determining each attribute weight based on the respective measure of information.

B11. A method as set out in item B1 or B2, wherein selecting the next set of media units comprises sampling a sampled plurality of sets of attribute values from a probability distribution over sets of attribute values, the probability distribution being based on the one or more selected media units and the at least some of the remaining media units; and selecting the next set of media units based on the plurality of sets of attribute values.

B12. A method as set out in item B11, wherein sampling the plurality of attribute values comprises updating a probability distribution over sets of attribute values using the one or more selected media units;

sampling sets of attributes values from the updated probability distribution;

subsampling the sampled sets of attribute values to define a plurality of subsampled sets of attribute values such as to reduce the similarity between the subsampled set of attribute values and the at least some remaining media units.

B13. A method as set out in item B10, B11 or B12, wherein the probability distribution is a normal distribution with a covariance matrix having at least one diagonal entry per attribute.

B14. A method as set out in any one of items B1 to B13, wherein a single media unit is selected by the user and the single selected media unit was selected by a user input consisting of a binary selection of the selected media unit, preferably wherein the user input comprises a single selecting action.

B15. A method as set out in any one of items B1 to B14, wherein one or more of the attributes are semantic attributes representative of semantic features of items represented by the media units and/or wherein one or more of the attributes have attribute values representing a score in the respective attribute.

B16. A method as set out in any one of items B1 to 15, the method comprising selecting a next set of media units based on a function of one or more (or a plurality of) pairs of media units, each pair comprising one of each of the one or more selected and at least some remaining media units.

C1. A computer-implemented method of transmitting media units or media unit identifiers for presentation of media units to a user on a user device, optionally as set out in any one of items A1-A19 or B1-B16, the method comprising transmitting a set of media units or respective media unit identifiers for presentation of the media units to the user, each media unit being associated with a respective feature set defining a set of attribute values or a set of parameters defining a probability distributions over attribute values for a plurality of attributes, wherein one or more of the attributes are representative of semantic features of items represented by the media units;

receiving a user input made by the user when presented with media units of the set of media units; and repeatedly:

selecting a next set of media units based on the user input;

transmitting the media units of the next set or respective media unit identifiers for presentation of the media units to the user; and receiving a user input made by the user when presented with the next set of media units.

C2. A computer implemented method as set out in item C1, wherein the user input identifies a set of one or more media units not selected by the user.

C3. A computer-implemented method as set out in item C1, wherein receiving the user input comprises receiving one or more media unit identifiers each identifying a respective user-selected media unit selected by the user from media units presented to the user.

C4. A method as set out in item C1, C2 or C3, wherein the feature sets for the one or more of the attributes are derived from inputs received from human annotators presented with a plurality of media units.

C5. A method as set out in item C4, wherein the media units have been presented as pairwise comparisons and the inputs received from human annotators are binary choices between presented media units.

C6. A method as set out in any one of items C1 to C6, wherein attribute values for the one or more of the attributes are derived using a function taking images associated with the media units as an input and returning attribute values, the function having been trained with information derived from inputs received from human annotators presented with a plurality of media units.

C7. A method as set out in any one of items C4 to C6, wherein the plurality of media units comprises the set of media units.

D1. A computer-implemented method for transmitting media units or media unit identifiers for presentation of media units to a user on a user device, optionally as set out in any one of items A1 to A19, B1-B16 or C1-C7, the method comprising transmitting a set of media units or respective media unit identifiers for presentation of the media units to the user, each media unit being associated with a respective feature set defining a set of attribute values or a set of parameters defining a probability distributions over attribute values for respective attributes; and repeatedly:

receiving an identifier identifying a user-selected media unit selected by the user when presented with the set of media units, wherein the selected media unit was selected on the user device by a user input consisting of a single binary selecting action of the selected media unit;

selecting a next set of media units based on the set of attribute values of the selected media unit;

transmitting the media units of the next set or respective media unit identifiers for presentation of the media units to the user.

D2. A computer-implemented method for displaying media units on a user device, optionally including a method of transmitting as set out in any one of items A1 to A19, B1-B16 or C1-C7, the method comprising receiving a set of media units or respective media unit identifiers for presentation of the media units on the user device, each media unit being associated with a respective set of attribute values of a plurality of attributes;

displaying the set of media units; and repeatedly:
receiving a user input selecting a media unit of the displayed media units, wherein the user input consists of a single binary selecting action on the selected media unit;
sending an identifier identifying the user-selected media unit;
receiving a next set of media units or respective media unit identifiers for presentation of the media units on the user device, wherein the next set of media units is based on the set of attribute values of the selected media unit; and
displaying the next set of media units.

D3. A method as set out in item D1 or D2, wherein the next set of media units is selected based on the feature set of the selected media unit and respective feature sets of at least some of the remaining media units of the presented media units.

D4. A method as set out in any one of items D1, D2, D3 or C1 to C7, wherein the next set of media units is selected by selecting the next set of media units using a selection function, wherein one or more parameters of the selection function are adjusted based on the user input.

D5. A method as set out in item D4, wherein adjusting one or more parameters of the selection function is based on a set of values of one or more selected media unit and respective sets of attribute values of at least some of the remaining media units of the presented media units.

D6. A method as set out in item D4 or D5, wherein the selection function comprises a measure of similarity between the feature set of a selected media unit and the feature set of another media unit for potential inclusion in the next set.

D7. A method as set out in item D6, wherein the measure of similarity is a weighted sum of distances.

D8. A method as set out in item D4, D5, D6 or D7, wherein the selection function comprises a probability distribution from which sets of attribute values are sampled for selection of media units for inclusion in the next set.

D9. A method as set out in any one of items D1 to D8 or C1 to C7, wherein the set of parameters comprise two or more parameters of an attribute value probability distribution for each attribute.

D10. A method as set out in item D9, wherein the attribute value probability distribution is a normal distribution.

D11. A method as set out in any one of items D1 to D10 or C1 to C7, wherein at least one of the one more attribute values is a vector value having two or more components.

D12. A method as set out in any one of items D1 to D11, wherein one or more of the attributes are semantic attributes representative of semantic features of items represented by the media units.

D13. A method as set out in any one of items D1 to D12, wherein the single binary selecting action consists of a single on-screen interaction.

D14. A method as set out in any one of items D1 to D13, wherein the single binary selecting action consists of a click or touch gesture.

E1. A computer-implemented method of transmitting media units or media unit identifiers for presentation of media units to a user on a user device, optionally as set out in any one of items A1-A19, B1-B16, C1-C7 or D1 to D14, the method comprising
receiving a first media unit identifier identifying a first user-selected media unit selected by the user;
selecting a first set of media units similar to the user-selected media unit based on a value of a measure of similarity with respect to the first user-selected media unit;
transmitting the media units of the first set or respective media unit identifiers for presentation of the media units to the user;
receiving a second media unit identifier identifying a second user-selected media unit selected from the first set by the user;
evaluating a first similarity condition for the first and second user-selected media units, wherein the second user-selected media unit is more similar in an attribute of the media units to the first user-selected media unit if the first similarity condition is met than if the first similarity condition is not met;
if the first similarity condition has been evaluated as met, selecting a second set of media units, such that the media units of the second set are on average more similar to each other in the attribute than the media units of the first set are similar to each other in the attribute and the media units of the second set are similar to the second user-selected media unit based on a value the measure of similarity with respect to the second user-selected media unit; and
transmitting the media units of the second set or respective media unit identifiers for presentation of the media units to the user.

E2. A method as set out in item E1, wherein the first similarity condition is that the second media unit is in a pre-defined list of media units associated with the first media unit and the attribute, wherein media units are included in the pre-defined list based on an attribute measure of similarity in the attribute with the first media unit.

E3. A method as set out in item E1, wherein the first set of media units is selected from a first pre-defined set associated with the attribute and the second set of media units is selected from a second pre-defined set associated with the attribute, the method comprising
if the first similarity condition is met, selecting the second pre-defined set from a plurality of pre-defined sets of media units such that the media units of the second pre-defined set are on average more similar to each other in the attribute than the media units of the first pre-defined set are on average similar to each other in the attribute.

E4. A method as set out in item E3 comprising, if the first similarity condition is not met, selecting media units based on similarity in the attribute with the second user-selected media unit such that mutual similarity is on average either as for the first set or less than for the first set.

E5. A method as set out in item E3 or E4, wherein the first similarity condition is that the second media unit is in a pre-defined list associated with the first media unit and the attribute, wherein media units are included in the pre-defined list based on a value of an attribute measure of similarity in the attribute with respect to the first media unit.

E6. A method as set out in item E5, the method comprising evaluating a second similarity condition for the first and second media unit, wherein the second media unit is less similar in the attribute to the first media unit if the first similarity condition is not met and the second similarity condition is met than if the first similarity condition is met and wherein the second media unit is less similar in the attribute to the first media unit if neither the first nor the second similarity condition is met than if the second similarity condition is met; and if the first similarity condition is not met and the second similarity condition is met, selecting the second set of media units from the first pre-defined set in the second selection set.

E7. A method as set out in item E6, wherein the second similarity condition is that first condition is not met, so that the mutual similarity stays the same if first condition is not met.

E8. A method as set out in item E6 or E7, wherein the second similarity condition is that the second media unit is in a first pre-defined list associated with the attribute and with a media unit in a second predefined list associated with the attribute and the first media unit, wherein media units are included in the second pre-defined list based on a value of the attribute measure of similarity in the attribute with respect to the first media unit and media units are included in the first pre-defined list based on a value of the attribute measure of similarity in the attribute with respect to the media unit in the second pre-defined list.

E9. A method as set out in item E6, E7 or E8, the method comprising
if the first similarity condition is not met and the second similarity condition is not met, selecting the second set of media units from a third pre-defined set of media units associated with the attribute, wherein the media units of the third pre-defined set are on average less similar to each other in the attribute than the media units of the first pre-defined set are similar to each other.

E10. A method as set out in any one of items E1 to E9, wherein the media units are associated with a plurality of attributes and the measure of similarity is computed by combining an attribute measure of similarity for at least some of the attributes.

E11. A method as set out in any one of items E3 to E10, wherein the media units are associated with a plurality of attributes and the measure of similarity is computed by combining an attribute measure of similarity for at least some of the attributes, the second set of media units comprising media units from respective pre-defined sets of media units for at least some of the attributes.

E12. A method as set in item E10 or E11, the second set of media units comprising media units from respective pre-defined sets of media units for each of the attributes and/or the measure of similarity is computed by combining an attribute measure of similarity for each of the attributes.

E13. A computer-implemented method of transmitting media units or media unit identifiers for presentation of media units to a user on a user device, optionally as set out in any one of items A1-A19, B1-B16, C1-C7 or D1 to D14, the method comprising
receiving a first media unit identifier identifying a first user-selected media unit selected by the user;
selecting, from a first pre-defined set of media units, a first set of media units similar to the user-selected media unit based on a measure of similarity with the first user-selected media unit;
transmitting the media units of the first set or respective media unit identifiers for presentation of the media units to the user;
receiving a second media unit identifier identifying a second user-selected media unit selected from the first set using the user device;
selecting, from a second pre-defined set of media units, a second set of media units similar to the second user-selected media unit based on a measure of similarity with the second user-selected media unit, wherein the first and second pre-defined sets are pre-defined such that the media units of the second pre-defined set are on average more similar to each other in an attribute of the media units than the media units of the first pre-defined set are similar to each other in the attribute;
transmitting the media units of the second set or respective media unit identifiers for presentation of the media units to the user.

E14. A method as set out in item E13, comprising increasing average similarity with each iteration, on a schedule as a function of iteration or based on evaluation of a condition, for example a similarity condition between the first and second selected media units.

E15. A computer-implemented method of defining pre-defined sets of media units from a database of media units for use in a method as set out in any one of items E3 or E4 to E14 when dependent on E3, the pre-defined sets being associated with an attribute of the media units and the method comprising
defining a list of the media units in the database;
while there are media units in the list, repeating steps a-d:
a) for each media unit in the list, determining a value of an attribute measure of similarity in the attribute between the media unit and that media unit in the list that is most similar in the attribute to the media unit;
b) identifying a media unit that is most similar to its most similar media unit in the list based on the determined values;
c) assigning a rank to the identified media unit, wherein the rank is indicative of the iteration during which the rank is assigned; and
d) removing the identified media unit from the list; and
assigning the ranked media units to the pre-defined sets based on their respective rank by grouping together media units with adjacent ranks.

E16. A method as set out in item E15, wherein the pre-defined sets are associated with corresponding threshold values and the media units are assigned to the pre-defined sets such that all media units with a rank exceeding the threshold value associated with one of the pre-defined set are assigned to that one of the pre-defined sets, whereby a media unit is assigned to all pre-defined sets for which its rank exceeds the corresponding threshold value.

E17. A method as set out in any one of items E1-E16, wherein the attribute or one or more of the attributes are semantic attributes representative of semantic features of items represented by the media units, for example derived using pairwise comparisons.

F1. A computer-implemented method of retrieving media units that are similar to a selected media unit, optionally for use in conjunction with a method as set out in any one of items A1-A19, B1-B16, C1-C7, D1-D14, or E1-E16, the method comprising
receiving from a user device an identifier identifying a selected media unit selected by a user;
accessing a respective list associated with the selected media unit, wherein the respective list is a list of media units that have been pre-determined to be similar to the selected media unit based on a measure of similarity; and
transmitting at least some of the media units in the respective list, or identifiers thereof, fore presentation to the user.

F2. A method as set out in item F1, the method including accessing a respective list associated with each media unit in the list associated with the selected media unit, wherein each respective list is a list of media units that have been pre-determined to be similar, based on a measure of similarity, to the respective media unit with which the respective list is associated; and transmitting some or all of the media units in the list associated with the selected media unit and the media units in the respective lists associated with the media units in the list associated with the selected media unit, or identifiers thereof, for presentation to the user.

F3. A method as set out in item F1 or item F2, wherein the respective list and, where applicable, the respective lists include a value of the measure of similarity for each media unit in the list or lists, the method comprising transmitting a pre-determined number of media units based on their value of the measure of similarity.

F4. A method as set out in any one of items F1 to F3, wherein each respective list contains list media units from a set of candidate media units and wherein for each list media unit there is no candidate media unit that is more similar to the list media unit than the list media unit is similar to the selected media unit and that is more similar to the selected media unit than the list media unit is similar to the selected media unit.

F5. A computer-implemented method of generating a database for use with a method as set out in any one of items F1 to F4, the method comprising generating a database of records, each for a respective media unit; and populating each record with a respective list identifying media units determined to be similar to the respective media unit of the record based on a measure of similarity.

F6. A computer-implemented method of adding a new media unit to a database for use with a method as set out in any one of items F1 to F5, wherein the database comprises media units, each of which is associated with a respective list identifying media units that are similar to the media unit with which the list is associated, the method comprising determining a most similar media unit that is most similar to the new media unit based on a measure of similarity;
accessing a first list associated with the most similar media unit, the first list identifying media units that are similar to the most similar media unit;
identifying a set of similar media units for the new media unit, including the media units in the first list;
adding some or all of the media units in the set of similar media units to a second list associated with the new media unit.

F7. A method as set out in item F6, wherein identifying a set of similar media units includes accessing further respective lists, each associated with a media unit in the first list and identifying further media units that are similar to each respective media unit in the first list; and adding the further media units to the set of similar media units.

F8. A method as set out in item F6 or F7, wherein each respective list associated with an associated media unit contains list media units from the database and wherein for each list media unit there is no media unit in the database that is more similar to the list media unit than the list media unit is similar to the associated media unit and that is more similar to the associated media unit than the list media unit is similar to the associated media unit.

F9. A method as set out in item F8, the method comprising
for each media unit in the set, marking that media unit in the set if there is a media unit in the data base that is more similar to that media unit in the set than that media unit in the set is to the new media unit and that is more similar to the new media unit than that media unit in the set is to the new media unit; and removing the marked media units in the set from the set prior to adding the media units of the set to the second list.

F10. A method as set out in any one of items F6 to F9, the method comprising generating a working list comprising media units in the respective lists associated with the media units in the second list;
removing any media unit in the working list that is also in the second list from the respective list in which it was included.

F11. A method as set out in any one of items F1 to F10, wherein each media unit is associated with a plurality of attributes and wherein each media unit is associated with a respective list for each attribute, and wherein the respective list for each attribute is a list of media units that have been pre-determined to be similar to the selected media unit based on a measure of similarity in the attribute.

F12. A method as set out in any one of items F1 to F4 and item F11, the method comprising
accessing a respective list associated with the selected media unit for each attribute;
combining the media units in the respective lists for at least some of the attributes of the plurality of attributes into a selection set;
transmitting at least some of the media units in the selection set, or identifiers thereof, to the user device.

F13. A method as set out in item F12, the method comprising selecting at least some of the media units in the selection set based on a measure of similarity; and
transmitting the selected media units, or identifiers thereof, to the user device.

F14. A method as set out in item F13, wherein the measure of similarity combines respective measures of similarity with the selected media unit in each of the at least some attributes.

G1. A computer-implemented method of retrieving media units that are similar to a selected media unit, optionally for use in conjunction with a method as set out in any one of items A1-A19, B1-B16, C1-C7, D1-D14, E1-E16, or F1-F14, the method comprising
receiving from a user device an identifier identifying a selected media unit selected by a user;
defining a candidate set of media units that meet a first similarity condition, wherein media units that meet the similarity condition are more similar to the selected media unit than media units that do not meet the similarity condition;
computing a value of a measure of similarity for each media unit in the candidate set;
based on the values, including media units from the candidate set in a selection set, wherein the remaining media units in the candidate set are more similar to the selected media unit than the media units in the selection set; and
transmitting at least some of the media units in the selection set, or identifiers thereof, for presentation to the user.

G2. A method as set out in item G1, wherein each media unit is associated with a plurality of attributes, the method comprising
defining for each of the attributes a respective candidate set of media units that meet a similarity condition in the attribute, wherein media units that meet the similarity condition are more similar in the attribute to the selected media unit than media units that do not meet the similarity condition;

for each candidate set, computing a value of a measure of similarity for each media unit in the candidate set with respect to the selected media unit;

based on the values, including media units from each candidate set in a selection set, wherein the remaining media units in each candidate set are more similar in the attribute to the selected media unit than the media units from the candidate set included in the selection set.

G3. A method as set out in item G2, wherein computing a value of a measure of similarity for each media unit in the candidate set with respect to the selected media unit comprises computing a value of a measure of similarity in the respective attribute for each media unit in the candidate set with respect to the selected media unit.

G4. A method as set out in item G2 or G3, the method comprising, repeatedly adding, for each candidate set, the media unit in the candidate set that is least similar to the selected media unit and that is not in the selection set to the selection set until a pre-determined number of media units has been added to the selection set.

G5. A method as set out in item G1, the method comprising
receiving from the user device a further identifier identifying a further selected media unit selected using the user device subsequent to transmitting at least some of the media units in the selection set, or identifiers thereof, for presentation to the user;
defining a further candidate set of media units that meet a second similarity condition, wherein media units that meet the similarity condition are more similar to the selected media unit than media units that do not meet the similarity condition;
computing a value of a second measure of similarity for each media unit in the further candidate set;
based on the values, including media units from the further candidate set in a further selection set, wherein the remaining media units in the further candidate set are less similar to the further selected media unit than the media units in the further selection set; and
transmitting at least some of the media units in the further selection set, or identifiers thereof, to the user device.

G6. A method as set out in item G3 or G4, the method comprising
receiving from the user device a further identifier identifying a further selected media unit selected using the user device subsequent to transmitting at least some of the media units in the selection set, or identifiers thereof, to the user device;
defining for each of the attributes a further respective candidate set of media units that meet a second similarity condition in the attribute, wherein media units that meet the second similarity condition are more similar to the further selected media unit than media units that do not meet the second similarity condition;
computing a value of a combined measure of similarity combining a measure of similarity for each attribute for each media unit in the further candidate set;
based on the values, including media units from the further candidate sets in a further selection set, wherein the remaining media units in the further candidate sets are less similar to the further selected media unit than the media units in the further selection set based on the combined measure of similarity; and
transmitting at least some of the media units in the further selection set, or identifiers thereof, for presentation to the user.

G7. A method as set out in item G5 or G6, wherein the first and second similarity conditions are the same.

G8. A method as set out in item G5, wherein the first and second measures of similarity are the same.

G9. A method as set out in item G6, wherein the combined measure of similarity is a weighted combination of respective measures of similarity in each attribute.

G10. A method as set out in any one of items G1 to G9, wherein the first and/or second similarity conditions are met if a media unit is present in a pre-computed list associated with the selected and/or further select media unit.

G11. A method as set out in item G10, wherein the first and/or second similarity conditions are met if a media unit is present in a pre-computed list associated with a media unit in a pre-computed list associated with the selected and/or further media unit.

G12. A method as set out in one of item G10 or G11 and one of item G2, G3, G4 or G6, wherein one pre-computed list is associated with each media unit and attribute and the similarity condition in an attribute is met if a media unit is present in one of the pre-computed lists associated with that attribute.

G13. A method as set out in item G2 and any one of items G3 to G12 when dependent on item G2, wherein one or more of the attributes are semantic attributes representative of semantic features of items represented by the media units.

G14. A method as set out in item G2 and any one of items G3 to G13 when dependent on item G2, wherein at least some of the attributes have attribute values derived from pairwise comparisons between media units.

H1. A computer-implemented method of transmitting media units or media unit identifiers for presentation of media units to a user on a user device optionally as set out in any one of items A1-A19, B1-B16, C1-C7, or D1-D14, or for use in conjunction with a method as set out in any one of items E1-E16, F1-F14 or G1 to G14, the method comprising
transmitting a set of media units or respective media unit identifiers for presentation of the media units to the user, each media unit being associated with a respective feature set defining a probability distributions over attribute values for each of a plurality of attributes; and
repeatedly:
receiving a user input made by the user when presented with media units of the set of media units;
selecting a next set of media units using the user input; and
transmitting the media units of the next set or respective media unit identifiers for presentation of the media units to the user.

H2. A method as set out in item H1, wherein the user input identifies a set of one or more media units not selected by the user.

H3. A method as set out in item H1, wherein receiving the user input comprises receiving one or more media unit identifiers each identifying a respective user-selected media unit selected by the user from media units presented to the user.

H4. A method as set out in any one of items H1 to H3, wherein the one or more probability distributions are normal distributions.

H5. A method as set out in item H4, wherein the covariance matrix of the joint distribution of the one or more normal distributions is diagonal.

H6. A method as set out in any one of items H1 to H5, wherein selecting the next set of media units comprises selecting a media unit of the next set of media units based on the value of the respective media unit distribution at a plurality of sampled sets of attribute values sampled from a sampling distribution over attribute values.

H7. A method as set out in item H6, wherein the distribution is indicative of user interest in items associated with the attribute values.

H8. A method as set out in any one of items H1 to H7, wherein the user input consists of a single binary action by the user on the user device.

H9. A method as set out in item H8, wherein the single binary selecting action consists of a single on-screen interaction.

H10. A method as set out in item H8 or H9, wherein the single binary selecting action consists of a click or touch gesture.

H11. A method as set out in any one of items H1 to H10, wherein one or more of the attributes are semantic attributes representative of semantic features of items represented by the media units.

H12. A method as set out in any one of items H1 to H11, wherein one or more of the attributes have attribute values derived from pairwise comparisons between media units.

I1. A method as set out in any preceding item, wherein one or more of the attribute values are derived from neural activations of an artificial neural network presented with an image associated with the media unit.

I2. A computer-implemented method of transmitting media units or media unit identifiers for presentation of media units to a user on a user device, optionally as set out in A1-A19, B1-B16, C1-C7, D1-D14 or H1 to H12, or for use in conjunction with a method as set out in any one of items E1-E16, F1-F14 or G1 to G14, the method comprising transmitting a set of media units or respective media unit identifiers for presentation of the media units to the user, each media unit being associated with a respective feature set defining a set of attribute values or a set of parameters defining a probability distributions over attribute values for a plurality of attributes, wherein one or more of the attribute values are derived from neural activations of an artificial neural network presented with an image associated with the media unit;

receiving a user input made by the user when presented with media units of the set of media units; and repeatedly:

selecting a next set of media units based on the user input;

transmitting the media units of the next set or respective media unit identifiers for presentation of the media units to the user; and receiving a user input made by the user when presented with the next set of media units.

I3. A method as set out in item I1 or I2, wherein the one or more of the attribute values are representative of semantic features of items represented by the media units.

I4. A method as set out in any one of items I1 to I3, wherein the artificial neural network is a supervised neural network.

I5. A method as set out in any one of items I1 to I5, wherein the artificial neural network is a supervised neural network trained to classify images using training data comprising pairs of images and respective classifications, wherein the images have been classified by a human observer.

I6. A method as set out in any one of items I1 to I5, wherein the neural activations are activations of a hidden layer of the artificial neural network.

I7. A method as set out in any one of items I1 to I6, wherein the artificial neural network is a convolutional neural network.

J1. A method of adding an attribute value of an attribute to a plurality of media units for use in a method as set out in any preceding item, the method comprising presenting one or more pairs of media units of the plurality of media units on a display;

for each pair, receiving an input indicating the relative ranking of the media units of the pair in respect of the attribute and storing data indicating for each pair the media units of the pair and the relative rankings;

processing the data to update a score in the attribute across the plurality of media units for each media unit of the plurality of media units; and storing an attribute value indicative of the score for each media unit.

J2. A method as set out in item J1, wherein processing the data includes deriving parameters of a normal distribution for each score and storing the attribute value includes storing the parameters.

In some embodiments, use is made of information on unselected media units, that is media units presented to a user but not selected. For example, where a user selected one or more media units displayed on a screen, the remaining displayed media units are unselected media units. It will be understood that a user input, and/or the information transmitted in response to a user input may identify unselected media units either explicitly or implicitly. For example, only the identities of any selected media units (or the NULL selection if no unit was selected) may be transmitted, with the identities of the remaining (unselected) displayed units being inferred from the set of media units sent/presented to the user.

The selection and presentation of media units will typically occur on the same user device to which the media units are initially transmitted, although in some embodiments a different user device may be used for each task or the user device may vary between display iterations as the process is handed from one device to another. Media units and/or their identifiers may be sent directly to and received directly from a user device or may be sent to and received from an intermediary, for example an entity hosting a website for presenting the media units and interfacing with a server running the method(s) described above, for example interfacing via an API.

The parameters in a feature set may define either feature values or parameters of one or more distributions over parameter values. One or more of the attributes may have vector values, in which case there is a group of two or more attribute values for each such attribute.

It will be understood that a set of parameters of individual distributions over respective features can be seen as parameters of the (single) joint distribution over features, which is defined in terms of the individual distributions. The parameters thus may define one distribution over all attribute values or, equivalently in certain circumstances, one distribution for each attribute value. The or each distribution can be one or more dimensional depending on the dimension of the attribute value; in some embodiments, an independent distribution for each dimension of each attribute value is used, for example a normal with a diagonal covariance matrix with a diagonal entry for each dimension. The set of parameters may comprise two or more parameters of an attribute value probability distribution for each attribute, for example the mean and variance (or standard deviation or precision) for a normal distribution.

In some embodiments, a normal distribution with diagonal covariance and one or more diagonal entries per attribute is used to represent attributes. In some embodiments, the covariance matrix may also have non-diagonal entries, block-diagonal or otherwise as the case may be. The normal distribution may be a multivariate normal over all attributes, which can be considered a joint distribution of individual normal distributions (uni- or multivariate) over sets one or more attribute. More generally, the attribute distribution may be a joint distribution (normal or otherwise) over all attributes and may be separable into individual constituent distributions for sets of one or more attributes, e.g. into one constituent distribution per attribute.

As used herein, a probability distribution is a function of attribute values of the attributes. In particular, it is a function defined over a continuum of attribute values (over a continuous domain), for example the continuum of real or integer numbers, as opposed to being defined over a discrete domain, for example being defined only for a finite set of examples. Further, as used herein, the term "probability distribution" includes all distributions that integrate or sum to a positive constant over their domain, typically although not necessarily to unity.

Some of the described embodiments rely on a similarity measure between media, such as a distance between feature sets. The distance may be any suitable metric, for example an absolute difference for 1D attributes, an Euclidean distance for vector attributes, sum of absolute difference of each component for vector attributes, etc. The distance or similarity measure may incorporate attribute weights that determine the relative contribution of each attribute to the value of the distance or similarity measure. In the case of feature sets defining parameters for distributions over attribute values, distance between distributions can be defined in terms of, for example, the distance between respective means or by a suitable distance measure defined for distributions, for example the Hellinger distance, or a metric induced by the L2-norm, or any other suitable measure indicative of the similarity between distributions.

In some embodiments, the media units are associated with a plurality of attributes and a measure of similarity is computed by combining individual attribute measures of similarity for at least some of the attributes, optionally for each of the attributes. For example, the attribute measure of similarity may be a distance or difference between respective values of the attribute for the media units in question. The measure of similarity may be based on pre-computed lists associated with the media units and encoding similarity relationships, calculated on the fly, or combination of both, for example a first selection based on pre-computed lists and followed by a second selection from the resulting set based on a measure calculated on the fly, for example combining attribute measures of similarity into an overall similarity measure using a weighted combination such as a weighted sum.

Where methods employ an iterative process where media units in a next set are selected based on selections made from a set in a previous iteration, it will be understood that the next set may not be the one following immediately on the iteration in which the user input originated, but that a more general schedule may be employed, for example in which the next set is based not on the immediately preceding iteration but to one previous to that. Some embodiments calculate weight factors to weight the contribution of different attributes in the calculation of similarity measures/distances. These attribute weights may be calculated before or after a next set is selected for presentation, for example for use during a different iteration.

In some embodiments, computing the attribute weights comprises computing an update quantity for each of the at least some of the attributes using the attribute values of the selected and the at least some of the remaining media units and combining each update quantity with a previously computed respective attribute weight. Specifically, in some embodiments the update quantity and previously computed attribute weight are combined in a proportion based on a comparison of the current and previous user selection. Even more specifically, in some embodiments, the proportion in which the update quantities and previously computed respective attribute weights are combined is computed by averaging a difference between a first quantity and a second quantity, the first quantity comprising a difference between a distance between a respective attribute value of each of the at least some remaining media units and an attribute value of the selected media unit and a distance between a respective attribute value of each of the at least some remaining media units and an average attribute value of the selected media unit and the at least some remaining media units and the second quantity comprises a value of the first quantity corresponding to a previous iteration.

In some embodiments, a measure of information gain is employed to calculate attribute weights. The measure of information gain may, in some embodiments be computed using a Kullback-Leibler (KL) divergence measure. In some of these (or other) embodiments, the measure of information gain may be computed between the a probability distribution over user intentions after updating as part of an iteration of the method and an initial probability distribution prior to a first update of the probability distribution (prior to a first iteration).

In some embodiments, where a probability distribution over user intentions is maintained, feature sets (points in attribute space) are sampled from a sampling distribution. In some embodiments, the sampling distribution and maintained probability distribution are the same. In some embodiments an intermediate distribution used to calculate the maintained distribution is used as the sampling distribution, which may be particularly advantageous if the intermediate distribution contains more information than the maintained distribution and/or the maintained distribution is an approximation of the intermediate distribution. For example, the maintained distribution may be an analytical function defined by a limited number of parameters (for example a normal distribution) and the intermediate distribution may be a more complicated function that is not practical or possible to evaluate analytically but from which values can nevertheless be sampled.

The sampled sets are, in some embodiments, used to find media units to present to the user. Where the attributes are represented by an attribute distribution (the feature sets are parameters of the distribution), some embodiments use the values of the attribute distribution evaluated at the sampled points to provide a score to the media unit corresponding to the feature set. The score is then used in selecting one or more media units. For example, the media unit may be scored by combining the distribution values at the sampled feature sets using a suitable function, such as the product of the values (corresponding or related to the probability of generating the sampled feature sets the distribution of the media unit); the maximum of the distribution values; the sum of the distribution values, etc. More generally, the next set of media units may be selected using similarity measures, such as distances, in which the attribute values are unweighted (such that attribute weights need not be calculated in these embodiments), the attribute values may be weighted.

Media units can in some embodiments be selected based on sampled points using a tree approach which subdivides the virtual space into successively more granular levels and builds a relational database of media units, keyed by virtual points. In some embodiments, a set of candidate media units is found in this way for a given virtual point and one or more of the candidate media units can be selected based on a ranking in a similarity measure or by selecting the most similar/closest media unit based on a respective measure.

In some embodiments, in which one or more selected and remaining media units are used in conjunction with a probability distribution to select the next set of media units, one or more parameters of the probability distribution are adjusted based on the respective feature sets of the one or more selected media units and the respective feature sets of the remaining media units. In some embodiments, the adjustment is such that the distribution is increased at the feature set of the selected media unit and decreased at the feature sets of the unselected ones. In some embodiments, the probability of sampling a selected media unit again is increased. It will be recalled that, in some embodiments, the selected and unselected media units are used to update a measure of similarly, specifically attribute weights used in the measure.

In some embodiments, the attributes of a media unit represent sematic attributes of item(s) represented by the media unit. Values for these sematic attributes may be derived from inputs made by humans to which the media units are presented. The inputs may comprise pair wise comparisons between media units, for example by providing an indication of which media units ranks higher in the attribute in question and/or to which media unit the attributes applies more or to a greater degree, for example by selection of one media unit of the pair. More generally, attribute values may derived from pairwise comparisons between media units, whether based on human input or otherwise. In some embodiments, a score in the attribute in question for media units is derived from a set of pairwise comparisons, for example using algorithms used to score the strength of players in chess or other games where pairwise competitions lead to a binary outcome (win/loss)

Examples of sematic attributes are: style (cool, chic, formal, elegant, energetic, luxurious . . . ), mood (happy and sad, bright, summery, spring like, evening appropriate), comfort, warmth, environmental impact, shape (square, open, high cut, low cut . . . ), patterns (striped, polka dots, chequered, complexity . . . ) . . . .

It will be understood that, while in some embodiments semantic attributes may be used exclusively, in some embodiments both semantic and non-semantic attributes are used to define the feature set. In some embodiments, only non-semantic attributes are used, for example low-level image processing features or filter outputs, such as Gabor filters, contrast filters, histogram features, etc.

In some embodiments, the user is enabled to provide input using a single, binary selection action. In this context, a binary selection is a two choice input, that is it is a yes/no selection (either a media unit is selected, or it is not), in particular without a graduated input of information about relevance or similar quantities. The action may be an on-screen action, that is an action taken on screen, either by moving a displayed cursor or pointer by means of a keyboard or other input device such as a mouse, track ball, touch pad, touch screen, etc., or by a single or multi touch gesture on a touch sensitive screen. Examples of such single actions are: click or double click with, for example, a mouse, or touch gestures such as tap, double tap, tap and hold, swipe, pinch, etc.

In some aspects and embodiments, a computer-implemented method of transmitting media units or media unit identifiers for presentation of media units to a user or a user device is provided. The method comprises transmitting a set of media units or respective media unit identifiers for presentation of the media units on the user device, each media unit being associated with a respective set of attribute values. The method further comprises repeatedly: receiving a media unit identifier identifying a user-selected media unit selected on the user device from media units presented on the user device; updating an estimate of a target set of attribute values for the user using the set of attribute values of the selected media unit; selecting a next set of media units using the updated estimate; and transmitting the media units of the next set or respective media unit identifiers for presentation of the media units on the user device.

In some aspects and embodiments, a computer implemented method transmitting media units or media unit identifiers for presentation of media units to a user or a user device is provided. The method comprises:
  transmitting a set of media units or respective media unit identifiers for presentation of the media units on the user device, each media unit being associated with a respective set of attribute values of a plurality of attributes, wherein one or more of the attributes are representative of semantic features of items represented by the media units and the corresponding attribute value is a vector value having two or more components;
  receiving an identifier identifying a user-selected media unit selected on the user device from media units presented on the user device;
  selecting a next set of media units based on the set of attribute values of the selected media unit; and
  transmitting the media units of the next set or respective media unit identifiers for presentation of the media units on the user device.

Aspects of the invention extend a computer program product comprising coded instructions that, when run on a processor, implement one or more of the methods as set out above and in particular as set out in any of the items listed above.

Aspects of the invention also extend to one or more tangible computer readable media carrying coded instructions that, when run on a processor, implement one or more of the methods as set out above and in particular as set out in any of the items listed above.

Further aspects of the invention extend to a system comprising a communications interface and a processor, wherein the processor is configured to cause the system to implement one or more of the methods as set out above and in particular as set out in any of the items listed above.

Yet further aspects of the invention extend to a system comprising means for carrying out one or more of the methods as set out above and in particular as set out in any of the items listed above. Aspects also extend to a system comprising respective means for carrying out each step of one or more of the methods as set out above and in particular as set out in any of the items listed above.

BRIEF DESCRIPTION OF THE DRAWINGS

Embodiments will now be described by way of example to further the understanding of aspects of the invention, with reference to the accompanying drawings, in which:

FIG. 2 illustrates an a system overview in terms of logical organisation of media unit creation, management, search and display processes;

FIG. 11 illustrates, in pseudo code, a direct neighbour media units algorithm;

FIG. 12 illustrates the concept of direct neighbours;

FIG. 13 illustrates a process of updating media unit neighbourhoods;

FIG. 16 illustrates an example of the application of the process in FIG. 15;

FIG. 22 illustrates how unselected media units are used in updating probability distributions;

FIG. 24 illustrates a data structure for the efficient Association of media units with virtual attribute points;

DETAILED DESCRIPTION OF EMBODIMENTS

1. Overview

Figure 1:
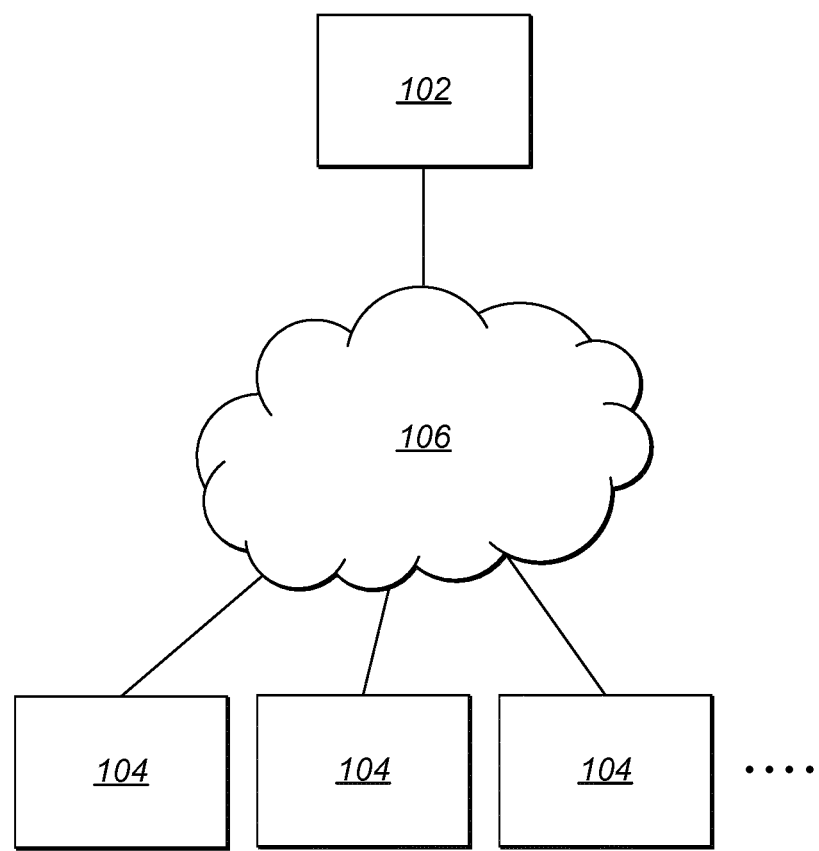
FIG. 1 illustrates a high-level overview of system architecture.

In overview, the present disclosure provides a search system and method that allows a user to search for an item by iteratively presenting media units such as images representing items to the user and receiving user input comprising user selections of the presented media units (including possibly the empty selection). Media units may also or alternatively comprise videos, music, text, etc. Features, or attributes, a user is interested in, for example semantic features, are inferred from the user interaction and media units are presented based on similarity with user-selected media units, through sampling of a probability distribution describing the users intent or interests, or a combination of these approaches.

For the avoidance of doubt, the term "media unit" is taken to mean any digital representation of an item, for example an image (possibly animated) containing an item or visually representing the item, a textual description an audio clip or a video clip. The term "semantic" is used in the way it is typically understood in the field of computer science, web design, information retrieval, etc., to refer to features that are meaningful to a human observer, for example the style, kind or colour of an item, as opposed to low-level image features such as overall image colour, a colour histogram, texture or other moments of an image. "Semantic" features exist independent of their visual, auditory, or other perceptual representation of an item but rather are features of the item itself, which are meaningful to a human. A semantic feature describes what an item is, rather than how the item (or the semantic feature) is digitally represented, for example in an image.

In the following description, similarity between media units, or, more accurately between items represented by the media units is considered. Similarity can be measured by a measure of similarity on attribute values and any measure suitable for a given representation of the semantic attributes on which the search is based can be used in accordance with the specific embodiments and applications. For example, where the representation of the semantic attributes is encoded in a n-dimensional space, a possible corresponding measure of similarity would be an Euclidean distance. For a representation which includes several attributes encoded in this way, a weighted sum of the corresponding Euclidean distances between media units in the respective attribute space would be one appropriate measure of similarity. The weights can usefully represent how interesting the respective attributes are to the user.

Another concept in the following description is that of estimating the users intent using a probability distribution on the collection of semantic attributes which is then updated successively with each user interaction. Throughout this document, a probability distribution is a function defined over a continuum of attribute values (over a continuous domain), for example the continuum of real numbers, as opposed to being defined over a discrete domain such as a finite set, for example a finite set of media units. For example, where the representation of the semantic attributes is encoded as points in a finite dimensional space or even as distributions on a finite dimensional space, the users intent may be represented as a normal distribution. At each step, this distribution is updated by the new information received. In most implementations in accordance with this disclosure, this updating is done by appealing to Bayes' Theorem and appropriate approximation techniques as described in detail below.

With reference to FIG. 1, a possible embodiment of infrastructure for implementing the described search methodology includes a server 102 and clients 104, connected through a network 106. It will be appreciated that this is merely an illustrative embodiment and that the various processing tasks described below can be distributed between the server 102 and one or more of the clients 104 in any way known to persons skilled in the art. Neither the server 102 nor the clients 104 are limited to distinct physical units. For example, the server 102 may be implemented by a plurality of individual server machines, for example a server farm, and may include various forms of storage such as may be provided in a datacentre. The clients 104 can be implemented using general-purpose computing devices such as personal computers, laptops, note books, tablet computers, smart phones, or any other mobile, stationary, wearable or other computing device. The clients 104 may implement some functionality locally using suitable Application Program Interfaces (APIs), for example provided by the server 102. Alternatively, the clients may provide only a browser implementation enabling the search methodology described here to be accessed as a web service. Typically, the network 106 is the Internet, with communications implemented using standard web protocols such as HTTP or HTTPS, although some embodiments use differing network or protocol implementations. It will be understood that the clients 104 may implement any one or all of the various interfaces described below (for example the annotator interface, the user search interface, etc.).

2. System Overview

With reference to FIG. 2, the disclosed methods can be broken down into two components, media unit creation and management 202 and a media unit search and display 204. This document will present several different embodiments of media unit search and display 204 which in each case will involve, as described in detail below, different implementations of some steps in media unit creation and management 202.

2.1. Media Unit Creation and Management 202

With regards to media unit creation and management 202, media unit creation starts with the submission of a media unit 206 at step 210. For example the media unit 206 may be an image, together with image meta data 208 such as a Universal Resource Identifier for the image, source metadata including metadata of the item or items the media units represents, etc. Where the system allows media units of different categories to be stored in one and the same database, the meta data may also include a descriptor of the category (or topic) of the media unit or what it represents in question, for example "shoe", "car", "mushroom", etc. If, for example, a media unit represents an individual image, that image may represent multiple items, each to be represented by respective media units. Each such derived media unit gets annotated with different respective sets of annotations as described in detail below. The respective media units may identify a portion of the image to be highlighted to a user when the image is displayed in association with the respective media unit, or to only display the portion. Media units may represent different aspects of the same underlying item for any type of underlying item (video clips, audio clips, text . . . ). In the example of the underlying item of a media unit being an image, the media unit may be associated with a bitmap of the portion of the image to be displayed. The bitmap may be displayed instead of the image as a representation of the given media unit.

Media units may be submitted from a variety of sources such as APIs, scraping of images from webpages or submission of images by users or other third parties.

At step 212 it is determined whether the submitted media unit is valid and whether the meta data is valid. If the media unit or meta data is not valid, the image is rejected at step 214, otherwise the process proceeds to a media uniqueness check at step 216. Briefly, at step 216, if the image URI is already in the system, it is checked whether the image is from a trusted source (e.g. a certified or partner source) and if so the existing media unit is either updated (including noting its new source) or, should the submitted media unit represent another category, a new media unit is created representing the same item. If the URI is not yet in the system, the image is compared to images already in the system using an image hash as known in the art. If this indicates that the image is a new image, the new image is processed further as described below. Otherwise, the image is treated as a new image with an existing URI already in the system. If the similarity indicated by the hashes is too close to call automatically, human validation may be used in some embodiments to decide whether to treat the image as a new image or as an image already existing in system.

If the media unit uniqueness check at step 216 determines that the image is unique and new to the system, it is added as a new media unit to a database 218 of incomplete media units and the process proceeds to step 220, at which attribute information is gathered. Step 220 is described in detail below but, as an example, some implementations collect comparative annotation data for each attribute and use well known scoring systems such as ELO (*Elo, Arpad* (1978). *The Rating of Chessplayers, Past and Present*. Arco. ISBN 0-668-04721-6) or existing Bayesian alternatives such as the Glicko algorithm (Glickman, Mark E., "*Parameter estimation in large dynamic paired comparison experiments*" (1999) Applied Statistics, 48, 377-394) to infer valid information of all media units for a given attribute from the comparative annotation provided.

For the purpose of clarity, it is helpful to note that algorithms like Glicko or ELO have their origins in trying to evaluate player strengths in certain single player games (like chess) from the outcome of a collection of played matches only. In the application described above, games and player strengths are not considered. Nevertheless, one can regard an attribute annotation, i.e. the information that one media unit would be considered higher in a certain attribute than another, as akin to a game outcome. Upon applying the algorithms to all the comparative information (e.g. an annotator ranking media unit 1 higher in an attribute than a comparison media unit 2) viewed as games outcomes in that way, the results are considered attribute values consistent with the observed comparative annotation. In some implementations the associated uncertainty of these relative values is inferred, in effect providing probability distributions of each media unit's numerical value with respect to the given attribute.

2.2. Feature Sets and Search Collections

In all implementations, each media unit is uniquely represented by a finite set of values which either describes a set of attribute values or a set of parameters which, in turn, describe a probability distribution over all possible sets of attribute values thus quantitatively assigning respective probabilities to all possible sets of attribute values the media unit in question can take. A set of attribute values is referred to below as an Attribute Space Value (ASV) and corresponds to a point in attribute space (the set of all ASV).

The media units for which attribute values and/or other information has been collected at step 220 are then stored in a media unit master (MUM) database 222, which associates each media unit 210 with media unit meta data 208 including the values for each attribute collected in step 220. Subsequent step 220, a process 230 creates a Search Collection 233 from media units in the MUM.

A Search Collection 233 is a database of a set of media units interfacing with a back-end component 238 of a certain implementation of the media unit search and display 204 that are all annotated for the same attributes. For example, if media units are represented by feature of sets of attribute values then some Search Collections 233 consist of a database of these attribute values. Another example of a Search Collection 233 is a database of neighbourhood relationships stored for each attribute as described below, or a combination of these. Each implementation of media unit search and display 204 described below allows for the media units in a corresponding Search Collection 233 to be searched. Building the search collection comprises running a query on the MUM to extract those media units that meet these criteria. The search collection may be processed further in some implementations, as described below.

In some embodiments many different instances of Search Collections 233 can be created from the MUM database 222. In implementations where the number of media units is relatively small the Search Collection 233 database is stored in random access memory (RAM) of a computer for the purpose of further necessary calculations by the back-end component 238. For larger sets of media units, in other embodiments, the Search Collection 233 database is housed in a separate database with a client server architecture enabling efficient processing of the data. Several different embodiments of Search Collections 233 and the associated process 230 are described below in the context of different embodiments of the media unit search and display 204.

In some embodiments, the Search Collections 233 are rebuilt by process 230 multiple times a day from the media unit master database 222 and sent out to the browsing servers around the world for client access (see geolocating below). This enables recent media units to be available and means that the servers for browsing can be made read only.

Process 230 can also be triggered by adding new attribute information at step 220 (e.g. adding a new media unit and annotation information or a new set of annotations along one given attribute for pairs of existing media units in the MUM database 222, each annotation describing which of the two media units should score higher for that given attribute) with regards to either existing or new media units in the MUM database 222.

Process 230 completes the setup and maintenance of the media unit master database 222 and the Search Collection 233, followed by replication and distribution of the resulting data to data centres or other global hubs for local distribution at step 232.

The processes 230 and step 232 need to be repeated when new media units 210 are added to the media unit master database 222, when new attributes are added to a media unit 210 at step 234 or when further comparative annotation information between existing media units is added. In some implementations, this process runs on the fly, while in other implementations media units to be saved into attribute space and geo-located are collected and batch processed, for example at times of expected low traffic to the system.

2.3. Media Unit Search and Display 204

Various embodiments of the media unit search and display 204, displaying and searching for an item a user is looking for by providing user input is discussed in detail further below. Embodiments of this process decompose into the same three logical or notional components. A back-end component 238 interfaces with the Search Collection 233 of the MUM database 222 in order to provide media units and their meta data to a user interface component (UI) 236 as well as receive from a model component 237 certain outputs that are used to make this selection. In some embodiments, the back-end component 238 also receives user input from the user interface component 236. In some implementations the model component 237 provides information to a State Memory component 239 (described below with reference to FIG. 5b) and reads the content of this component at its next call. The back-end component's 238 function in different implementations of media unit search and display 204 is described in detail below. The UI component 236 receives media unit meta data from the back-end component 238 and displays media units. Upon receiving input by a user, it provides media unit meta data for selected as well as unselected media units to the model component 237 and/or the back-end component 238. In many embodiments of media unit searching and displaying 204 the implementation of the UI component 236 is substantially the same and a detailed description follows below.

Briefly, a client device 104 displays the UI component 236 (through a browser interface for instance), and accesses the geo-located and replicated data on the server 102 over the network 106 to download media units and their meta data and upload user input.

The model component 237 takes as input data corresponding to the user input (comprising meta data of the selected, unselected, or both, media units) from the UI component 236 as well as state information from previous iterations (such as previously selected media units, or, as in some implementations below, a description of a prior probability distribution outlining the sum total of all the information gleaned in past steps) from State Memory 239 and generates an output for the back-end component 238. In some implementations this output will consist of numerical values that, as described below, represent an estimate of the users interest in certain attributes. The back-end component 238 choses the next set of media units to provide to the UI component based on these values and the knowledge of the user input.

In other implementations the output of the model component 237 consists of sample points of sets of attribute values which are the common attributes used to describe the feature set of all media units in the Search Collection 233 or both such sample points and numerical values as described above. These sample points are referred to herein as virtual points. The model component 237 recommends media units corresponding to these virtual points for display to the user. In these implementations the model component 237 also saves elaborate information in the State Memory component 239 (such the description of a probability distribution that the model has inferred given the new data) for its own use when it is called next. The back-end component 238 is tasked to find media units that best represent these virtual points using also the numerical values if provided and to recommend these media units to the UI component to be shown to the user. Several such solutions are described below in detail.

For the avoidance of doubt, where certain steps or pre-processes are present grouped into certain logical or notional components or functions, this is done for the sake of clarity of presentation, not limitation of an underlying implementation of these functions in software or hardware (although such an implementation may of course follow these groupings). A detailed description of the matters outlined above now follows.

3. Attribute Collection

Figure 3:
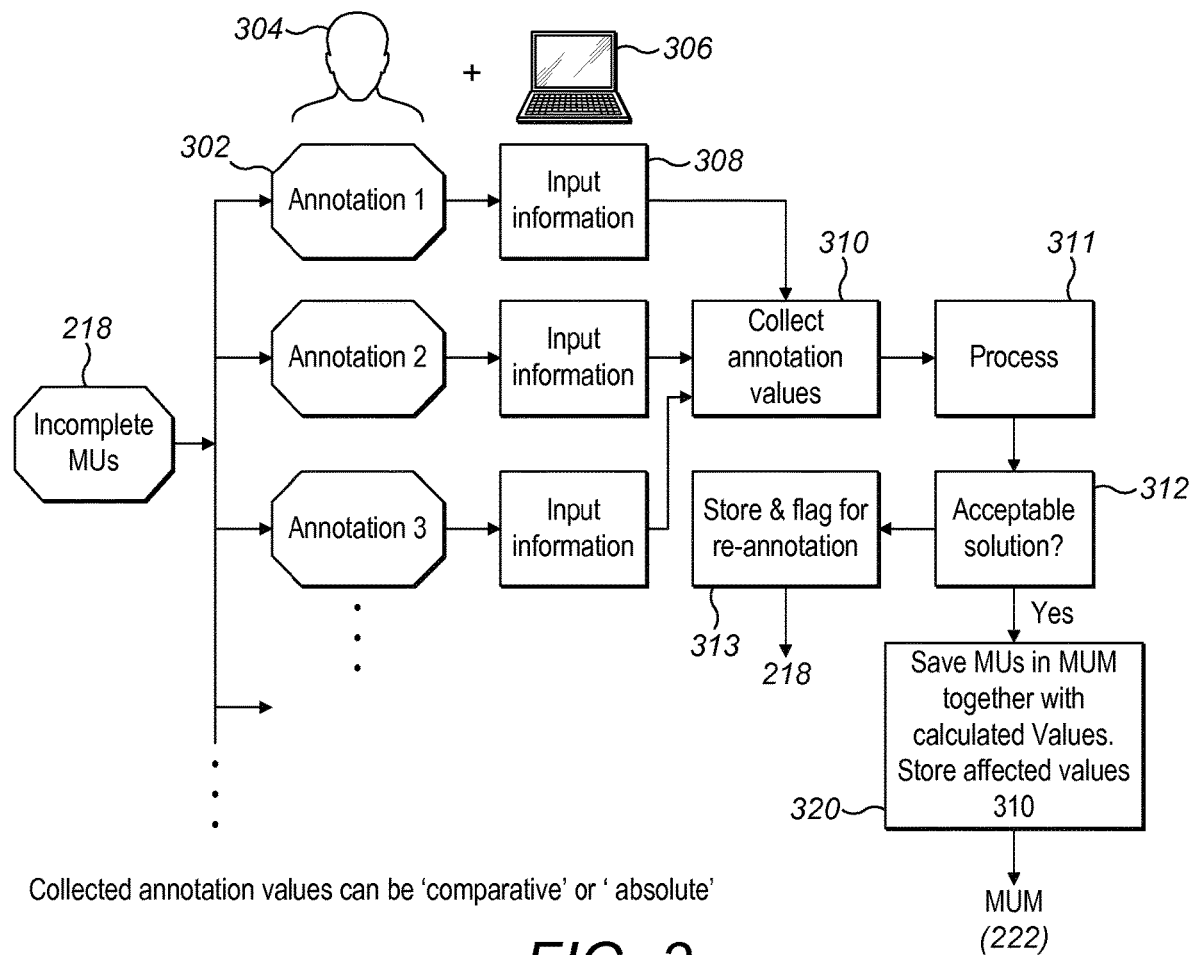
FIG. 3 illustrates a media unit annotation process.

With reference to FIG. 3, the collection of feature sets describing media units for the media units 210 in the database 218 of incomplete media units is now described. A plurality of annotators 302 (each of which may be a human annotator 304 interacting with an annotation function implemented on server 102 via client 104 or a computer annotator 306) are presented with incomplete media units in an annotation interface on client 104 (for example a user interface such as a web page in case of human annotators). Each such annotator either directly inputs the corresponding feature set values of the attributes presented for annotation by the annotation interface at step 308 or inputs comparative information of two or more given media units along a given attribute by a human annotator, for example by selecting a media unit to be perceived as higher ranked in the given attribute.

In some implementations, feature set information is derived from using machine learning techniques, such as using activations of neurons (that is values of units in the network) from one or more layers of one or more artificial neural networks. In some implementations the following four general steps are followed for media units representing images. First the images are resized to a standard size.

Secondly, these standard sized images are then used as inputs into a pre-trained image-classification artificial neural network and the neuron activations on all layers are then calculated via a feed-forward pass. The system then stores predetermined neuron activations for further processing for each image. In some implementations the neuron activations that are stored are those of all neurons in one particular layer of the artificial neural network, for example a hidden layer. For example, in a classifier artificial neural network, an input layer receiving inputs derived from an image (e.g. pixel values) and an output layer reports a classification for the image in terms of activation of the output layer. These are typically referred to as visible layers. In most artificial neural networks, these visible layers are connected to each other via one or more hidden layers of neurons, as is well-known.

In a third step, the system normalises the stored activations and applies a form of dimensionality reduction in a fourth step, if the number of stored activations is larger than a desired number of feature set dimensions. In some implementations the steps described above may be interleaved in order to augment the data. For instance, in some implementations, the activations saved in step two are calculated for each resized image and some symmetric transformation of it (for example every image that can be obtained by 90 degree rotations and reflection in mathematical terms the orbit under the diahedral group acting on the image) and the activations saved in step two for each image are computed as the averages of all the activations recorded for the transformed versions of that image. In short, in accordance with the process described above, the system produces a feature set for each image as a set of activations of a neural network when the artificial neural network is presented with each image, in some implementations as and averaged/dimensionality reduced version of the activations, as described above.

In some implementations, resizing the image is done by using white padding on the shorter side to obtain a square image and then using conventional resizing techniques to obtain a standard square image that can be used as an input to an artificial neural network. Other resizing techniques can be employed, for instance in some implementations simple cropping is employed.

In some implementations, the artificial neural network is a supervised artificial neural network. Specifically, the supervised artificial neural network may have been trained to classify images using image/class pairs created using classifications applied to the images by one or more human observers. This training data may take the form of pairs of input layer (image) activations and output layer (classification) activation. Classifications may be encoded in the output layer by, an activated state for a neuron corresponding the classification (binary output layer) or an activation above a threshold (real valued output layer).

In some implementations the artificial neural network used is AlexNet [https://github.com/BVLC/caffe/tree/master/models/bvlc_alexnet], implemented in the cafe environment. See also "ImageNet Classification with Deep Convolutional Neural Networks", Alex Krizhevsky et al, Advances in Neural Information Processing Systems 25, pages 1097-1105, 2012, Curran Associates, Inc, available at http://papers.nips.cc/paper/4824-imagenet-classification-with-deep-convolutional-neural-networks.pdf.AlexNet forms part of a particular class of artificial neural networks, called convolutional neural networks, in which in some layers the weight parameters are "tied" (i.e. forced to be equal thereby reducing the complexity of such a network) as described in [https://en.wikipedia.org/wiki/Convolutional_neural_network]. In some implementations using AlexNet, the input images are resized as described into 256 by 256 square input images and the activation layer that is saved is the last fully connected activation layer of 4096 neurons feeding into the 1000 neuron strong output layer.

In some implementations the normalization of the saved activations is done using the L2-norm (i.e. for each image the vector of numbers making up the saved activation layer is multiplied by a scalar so that the root of the sum of the squares of these numbers is equal to one). In some implementations the normalization is trivial in that it does nothing to the outputted number of the saved activation layer for each image, i.e. normalisation is omitted. In some implementation normalization is done using the L1 norm, i.e. for each image the vector of numbers saved from the activation layers is scalar multiplied so that the sum of the absolute values of the resulting numbers is equal to one.

In some implementations dimensionality reduction is done via principal component analysis [https://en.wikipedia.org/wiki/Principal_component_analysis] but any other machine learning technique known in the art for projecting a high dimensional set of points or vector to either a subspace or any other manifold in order to reduce the dimensionality of the set/vector could be employed.

In other embodiments, a human annotator is shown two images and is asked which one, in her/his opinion, would score higher in a given attribute.

For example, a user is first shown a series of images asking them whether a certain attribute applies and then, restricting attention only to those where users found that it does.

In step 310, all the input information of step 308 is collected. For the avoidance of doubt, this information can either be numerical values describing a feature set for an collection of attributes or comparative information or both as described above. In step 311 the annotated data is processed and transformed into a value for the attribute in question for the feature set of the given media unit, for example as described above. In some implementations this value is a numerical value for the attribute, in others it will be a probability distribution describing the possible numerical values of the media unit's attribute value in the given Search Collection 233. In implementations where step 311 deals with annotation data of numerical values, the output is again a numerical value which might be scaled to a predetermined normalization range. In some implementations numerical media unit attribute values are scaled to lie in the closed real valued interval from −1 to 1.

Where step 311 deals with a set of comparative annotations for a given attribute, standard algorithms to determine a numerical value or a distribution of that value of each media unit based on these annotations are employed. Some implementations utilize the ELO scoring algorithm. Other implementations use the Glicko algorithm, a Bayesian variant of ELO. As described above, both these algorithms were originally conceived to infer distributions for player strengths in a two-player game from the outcome of a given number of games only. In some of the disclosed implementations these algorithms are applied to annotations rather than games and the resulting distributions are distributions of numerical values consistent with the given comparative annotations. In step 312 the resulting attribute values are collected and compared in order to decide whether or not these values are acceptable. In embodiments in which step 311 returns probability distributions for the estimate of media unit attributes, step 312 can be performed using the variances of these distributions, for instance in making sure that these variances are not too large with regards to the range of mean values for too many media units (otherwise this would mean that the system is too unsure given the annotations so far to infer a reasonable strength estimate). In embodiments in which step 311 returns single values, step 312 involves checking that a minimum number of values has been received, that the standard deviation, variance or other measure of variability of the values is within accepted limits, the shape of the distribution of values, any other statistical measure of data quality or any combination of one or more of the above. If step 311 determines that the results from step 312 were not satisfactory, the raw annotation data is stored for further use and the media units are returned to the incomplete accepted media unit store 218. If step 312 finds the output of step 311 acceptable then, in step 320, the media unit or units in question are stored in the MUM database 222 together with the attribute values calculated in step 311.

While various processes for deriving media unit annotations have been described separately above, it will be understood that a mixture of various processes can be employed, deriving annotations for some attributes with one process and for others with another. For example, attributes that have been annotated with machine learning annotations (for example using an artificial neural network as described above) can be combined in the same implementation with those for which values are directly derived from human input (for example using direct input of an attribute value such as on a defined scale and/or inputs representing pairwise comparisons and their subsequent analysis).

4. The User Interface Component 236

Figure 4:
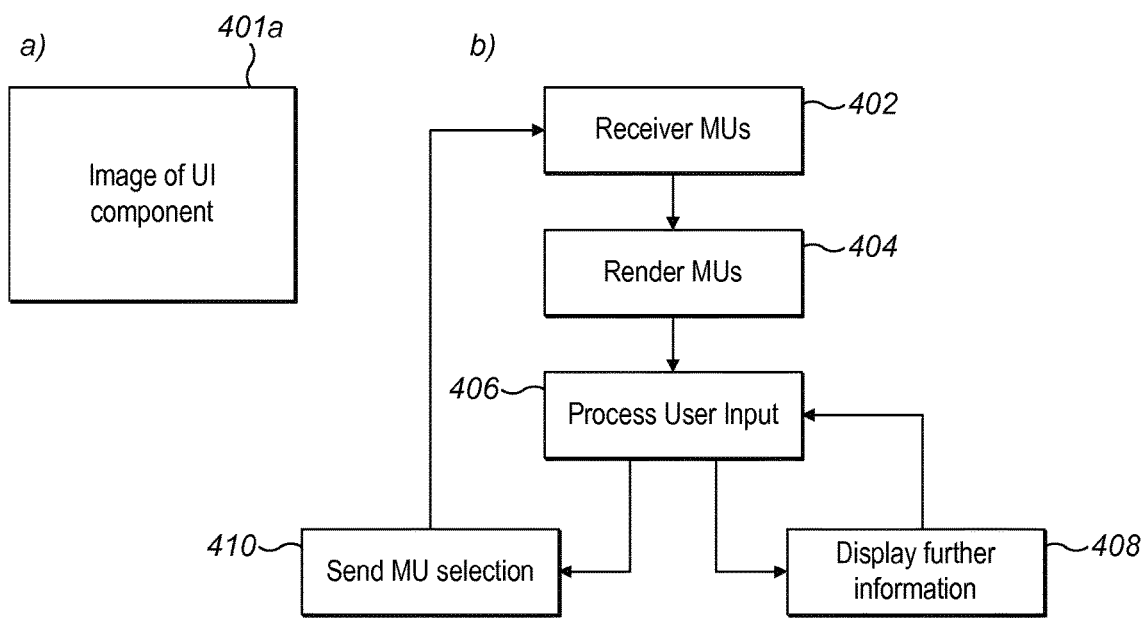
FIG. 4A illustrates a user interface.
FIG. 4B illustrates a user interface process.

Before describing different embodiments of the model 237 and back-end component 238 components of the media unit search and display 204 as well as associated embodiments of step 230 and the underlying Search Collection 233, the UI component 236, which is common to all these embodiments, is described. With reference to FIG. 4a, the client 104 displays a screen 401 with an arrangement of media units. In general the number of media units displayed is arbitrary and differs from case to case. The images are of different sizes and the display is tiled regularly or irregularly with these units. A history bar is displayed in some embodiments which displays to the user input given in the past. In some embodiment of screen 401 this history bar is at the top of the screen but, in other implementations, it can be found on one of the frames on the side or at the bottom. The user can view an enlarged version of the media unit through a single action (a click of a mouse is used, or a tab on a touch screen device, etc.) for inspection and can then choose one of the following three actions, each a single action such as a click, or tap, etc. as described above: Dismiss the chosen image and revert to the previous screen; select the media unit for the next iteration; or view further meta data information of the media unit. In another implementation where user input consists of at most one selection, user input is received through a single action, such as a click of a mouse (or tap on a portable device such as an pad or phone) on either a displayed media unit or on an empty selection icon (such as a "show more" feature).

A workflow of the UI component 236 is now described with reference to FIG. 4b. At step 402, the UI component 236 receives a number of media units and their meta data from the back-end component 238. The back-end component 238 retrieves this information from the Search Collection 233 in case all the media unit meta data is stored there, or from both the Search Collection 233.

In step 404, the UI component then displays media units, in some implementations, the received media units as described with reference to screen 401 above, and, at step 406 the user input is processed. Should the user request to see further (e.g. product) information then this information is displayed in step 408. If the user, through an action, selects none, one or more of the given media units, that media units together with its meta data as well as the collection of unselected media units together with their meta data is provided to the model component 237. The model component 237 generates output for the back-end component 238 in accordance with the relevant media unit search and display 204. The back-end component 238 then, in turn initiates step 402 again with a next iteration of its output based on the input received from the model component 237, as described above. Of course, other information flows between the three components 236, 237 and 238 are possible. The advantage of the arrangement above is that it can cater for very general uses of the media unit search and display 204. For instance, the UI component 236 can decide to only present a subset or in fact even a different set of the suggested set of media units by the back-end component 238 to the user. The user input provided by the UI component 236 to the model component 237 can therefore not be inferred by knowing the identifiers of the user selection made, if any. As a practical example, if the media unit search and display process is a shoe browser and that the UI component 236 interfaces with the other components 237 and 238 via an application programing interface (API), the shoe browser can pre-filter results suggested by the back-end component 238 before showing it to its users based on criteria the operator of the UI component determines independent of the media unit search and display process described here. One such criteria would be impromptu special offers. The UI component 236 then only shows the special offers that the back-end component 238 returned and the next call to the model component 237 (through the API) will then need to provide both the information of which media units were shown and the user input. Another example using this shoe browser API framework is that the UI component 236 is tasked to show certain pre-determined related media units to the user for each suggested media unit the back-end component 238 provides. For example, for each shoe a list of other shoes that customers found relevant exists for each shoe and the operator of the UI component 236 adds these for each suggested shoe to display from the back-end component 238. In this case the user is shown an extended set of the media units than that provided to the UI component 236 by the back-end component 238 which the model component 237 has to be informed of at the next step.

5. Implementations of the Model and Back-End Component

Figure 5A:
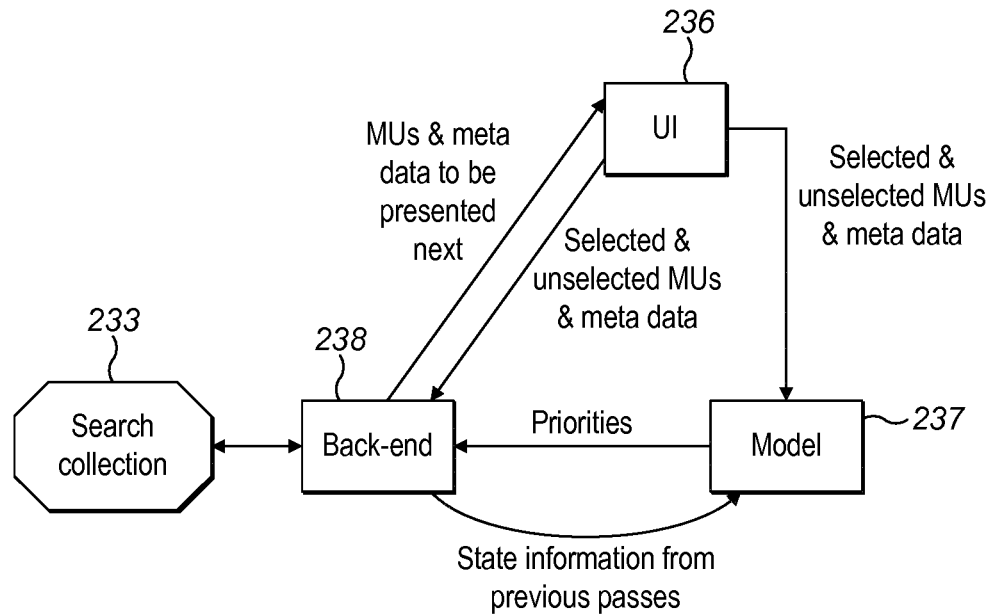
FIG. 5A illustrates a system overview in terms of logical organisation of a media unit search and display process based on similarity comparisons.

With reference to FIG. 5a, a description of several implementation of the model component 237, the associated back-end component 238, the corresponding Search Collection 233 and the corresponding implementation of step 230 are now described. The assumptions for all these implementations are the following. Unless stated otherwise, all media units in the Search Collection 233 are assumed to have numerical values defined for the same attributes. Furthermore, all these implementations share the property that the model component 237 will have as an output a numerical value for each attribute represented in the Search Collection 233. It is noted that the description includes the trivial implementations of component 237, namely any component that returns the same non-zero constant value for each attribute. These values are referred to herein as Priority Weights and can be thought of as giving a numerical quantization of how important to the user the corresponding attribute is. This implies that the back-end component 238 in conjunction with the Search Collection 233 has the task to identify new media units to show to the user based on these Priority Weights.

Some implementations of the Search Collection 233 in the setting described in FIG. 5a are now described. The following two additional assumptions hold in this implementation. Firstly, the user input comprises at least one selected media unit by the user. Secondly, that the feature set for each media unit describes attribute values in ASV (i.e. points) and not distributions over ASV. The Search Collection 233 comprises a stratification of both media units and neighbourhood relationships between media units indexed by a finite sequence of integers, organised into levels of granularity as described below. The media units and neighbourhood relationships at a given integer level is referred to as a depth level of the attribute space. These depths levels can be thought of as indicating how granular neighbourhood relationships in a given depth level are. For instance, media units on a low depth level can be thought of as having neighbours that have large average distances from each other compared to those on a high depth level. The motivation for such an arrangement comes from implementation of this model component 237 described below which make it desirable to be able to retrieve media units at certain steps that are similar to one another to a certain level of accuracy (or granularity).

As described below, once a media unit is part of a certain depth level it will appear in all higher depth levels and all media units occur in at least one depth level. From the last statement the minimum depth level of a media unit can be defined to be the lowest depth level at which it occurs. This notion will be important for the back-end component 238 attached to this Search Collection 233. The Search Collection 233 described here can either be implemented in a database or a sequence of databases (one for each depth level). Some implementations use a postgreSQL database.

In order to describe this implementation of the Search Collection 233 a precise construction is described in process 230.

5.1. Geometric Implementation of the Back-End Component 238
Overview With reference to FIG. 6, the collection of media units in the MUM database 222 that are saved to the Search Collection 233 in step 230 all contain attribute values describing their feature sets (as assumed above) with respect to the same attributes. Process 230 is performed on a collection of media units 601 as follows. At step 602, a postcode is derived for each media unit from its attribute space values (ASV) and an attribute postcode count, as described in detail below. The term "postcode" is used to refer to a label for a defined region of attribute space, in effect discretising attribute space for the purpose of using media units, to enable more efficient searching of attribute space.

At step 603, the media unit with a ASV closest to the ASV of the media unit is determined, using a search methodology based on the postcodes described above, as will be detailed below. The closest neighbour of the media unit is used at step 604 to find the direct neighbours of the media unit. The direct neighbours of a media unit include those that are nearest to the media unit and may result in a set of direct neighbour relationships that require the smallest amount of links between MUs to cover the entire attribute space. Details of how direct neighbours are defined and determined are discussed below. With direct neighbour relationships established at step 604, the MUs neighbourhood is updated at step 605, again as described in detail below. In some implementation, for example as described below or unless stated otherwise, the neighbourhood of an MU comprises the MUs direct neighbours as determined at step 604 and the direct neighbours of those direct neighbours.

At step 606, a quantity referred to herein as "pruning priority" is calculated for each MU in the current attribute, to enable MUs to be pruned for the purpose of defining depth levels of MUs, enabling the granularity of results returned to a user to be controlled by selecting an appropriate such level as described in more detail below. Subsequently, at step 607, a "powers of two" algorithm is used to define the depth levels using the pruning priority quantity, again as described in more detail below.

5.2. Post Codes

Figures 6, 7A, 7B, 7C:
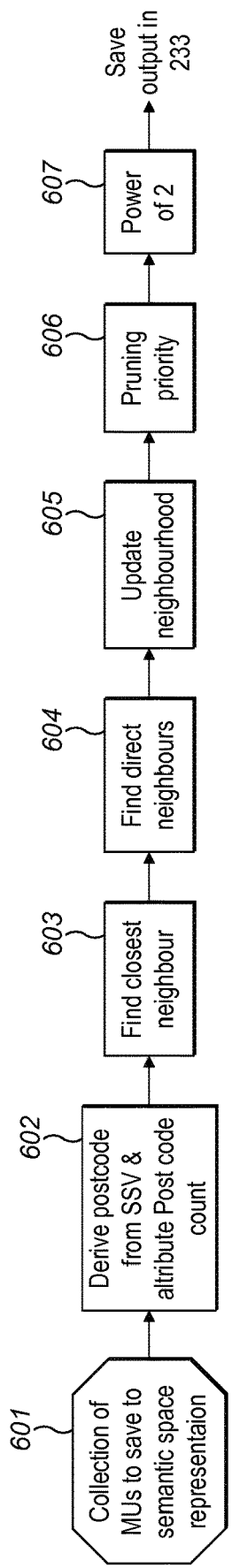
FIG. 6 illustrates a process for saving media units in a search collection, in overview.
FIGS. 7A, 7B and 7C illustrate the concept of postcodes for similarity comparisons.

With reference to FIG. 7A to C, the subdivision of attribute space for an attribute into postcodes (step 602 above) is now described. FIG. 7A illustrates an attribute space with media units illustrated by letters. A threshold for subdivision into postcodes is said, in this example at 12 media units. Therefore, addition of media unit F triggers a subdivision of the space in FIG. 7A. The result is shown in FIG. 7B, with the space now subdivided into 2×2 postcodes. The media unit F is now located at postcode (2, 2). When further media units are added to the space, the threshold will eventually be exceeded in one of the existing postcodes, triggering a further subdivision into the next level of granularity, in this case 3×3 postcodes as illustrated in FIG. 7C. In general, for a 2-dimensional space, at a level of granularity n, there will be $n \times n = n^2$ postcodes; for a d-dimensional space, there are $n^d$ postcodes.

The postcode of each media unit can be pre-calculated and stored as meta data (with appropriate updates triggered by each new subdivision of the space of the attribute), or may be calculated on the fly in other implementations. To calculate the postcode of a media unit, each dimension of the attribute value is divided by the width of a postcode cell in the attribute space and rounded (rounded up in case that the postcode values start at one, rounded down in case that the postcode values start at zero). In general, the width of a postcode is a function of the value range of the attribute space divided by the postcode level and may be calculated on the fly or pre-stored for the attribute space. In many implementation the attributes values take values between −1 and 1 and hence their range is known. It will be understood that other implementations can use other subdivisions of the space of an attribute, for example non-uniform subdivisions, with appropriate adaptation of how media units are assigned to postcodes and postcodes are determined.

5.3. Closest Neighbours

Figure 8:
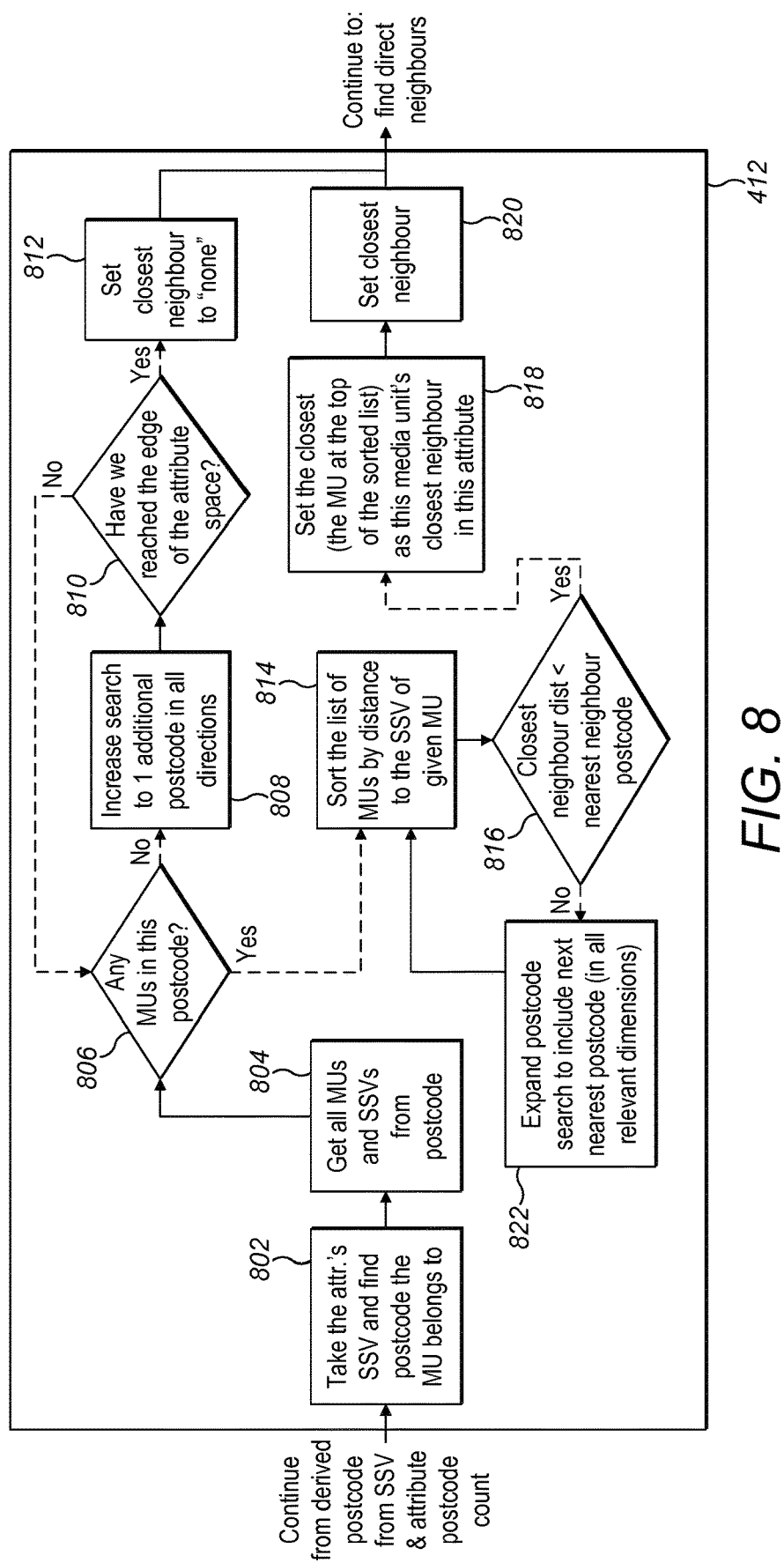
FIG. 8 illustrates a process for finding nearest neighbour media units using postcodes.

With reference to FIG. 8, a process for finding the closest neighbour (step 603 above) of a MU, in a given attribute space for an attribute of the MU is now described. At step 802, the postcode is determined for a target MU X based on its ASV. At step 804, all MUs from that postcode are obtained. Step 806 tests if any MU have been obtained. If the answer is no, step 808 increases the search to include one additional neighbouring postcode in all directions. Then, step 810 checks if the edge of the attribute space has been reached, that is if all the attribute space has been searched. If the answer is yes, this means that the MU X is the only one in the attribute space and the closest neighbour meta data of the media unit found is set to "none" at step 812 and further media unit(s) are awaited.

Figure 9C:
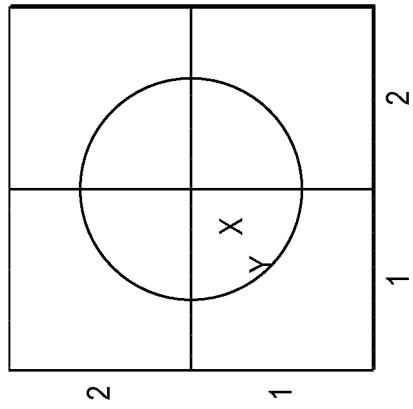
FIGS. 9A, 9B and 9C illustrate a search expansion during the process of FIG. 8.

If step 806 determines that there are MUs in the currently considered postcode or postcodes, the list of MUs found is sorted by the distance to the ASV of the MU X at step 814. Suitable distance measures for MUs with single or multiple attribute values in an attribute space are described below. Then, step 816 checks if the smallest distance between the ASV of the media unit X and the ASVs of the MUs found is less than the distance to the nearest postcode boundary. If so, the MU for which the distance from the media unit X is smallest (the closest MU at the top of the sorted list) is set as the closest neighbour at step 818 and a reference to it is stored in the meta data for MU X at step 820. If the determination at step 816 is negative, the algorithm proceed to step 822 to expand the postcode search to include next nearest postcodes in relevant dimensions, as illustrated below with reference to FIGS. 9a to c. Step 822 results in an expanded list of MUs which is passed to step 814, from where the process proceeds as described above.

Figure 9B:
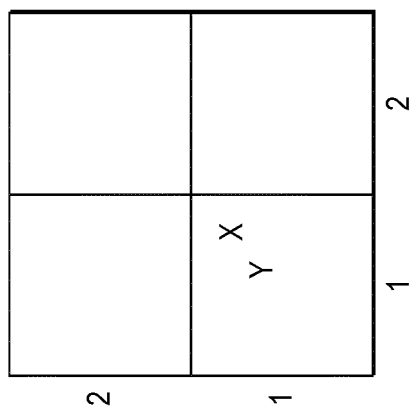
Figure 9A:
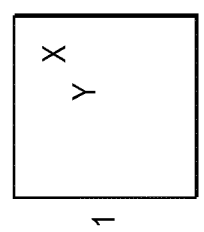

Step 822 determines for which postcode boundaries the distance from the boundary to MU X is less to the closest MU in the postcode (MU Y in the illustration of FIG. 9a). In the example of FIG. 9a, this is the case for the top and right boundary and so the search is expanded into these postcodes, as illustrated in FIG. 9b. The illustration is made for a two dimensional space, but an analogous expansion would apply in a three-dimensional space, with an increased likelihood of adding further postcodes. This is then followed by a search to find any MUs that are closer to MU X than MU Y. A search can be through all MUs in the expanded search space (postcodes 1, 1; 1, 2; 2, 1; 2, 2 in the present example), or through all MUs within a circle centred on MU X and having a radius equal to the distance between MUs X and Y.

5.4. Direct Neighbours

Figure 10:
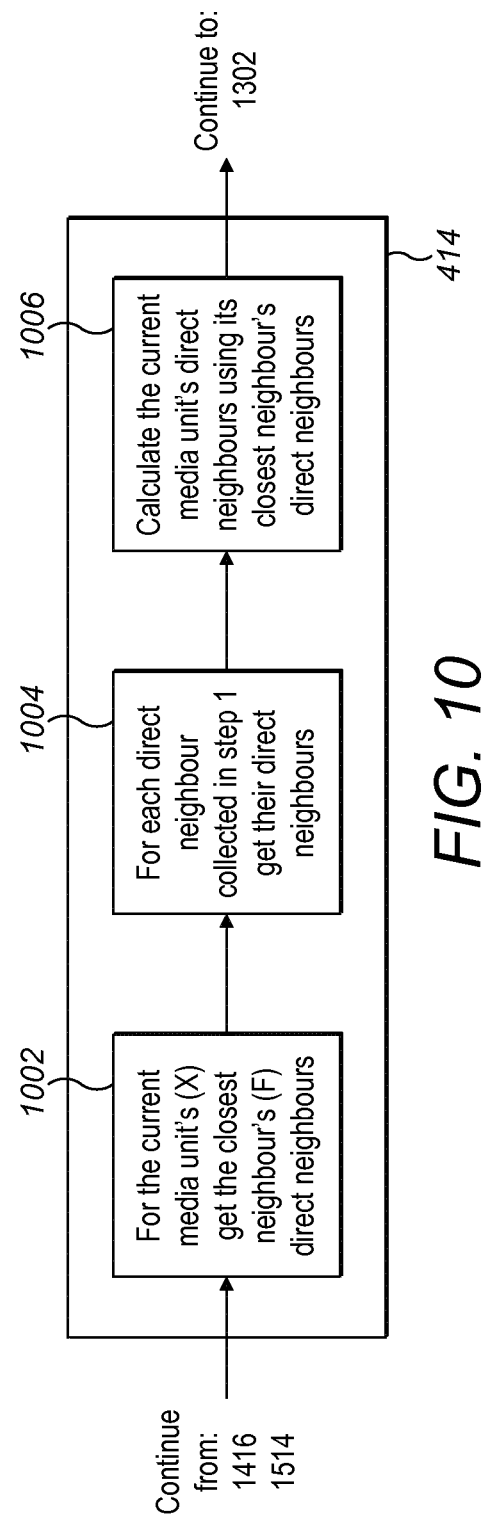
FIG. 10 illustrates, in overview, a process for finding direct neighbour media units.

With reference to FIG. 10, a process implementing step 604 above to find the direct neighbours of a given MU X is now described. The term "direct neighbour" is used in the sense that MU Y is a "direct neighbour" of a MU X with respect to a certain attribute if there is no other MU Z such that the distance from X to Y is larger than that from X to Z and that of Y to Z. This is equivalent to saying that the length of the side XY in the triangle XYZ is the largest amongst the three sides XY, XZ and YZ for any MU Z.

The media units of the direct neighbours found are stored in a list in the meta data 224 for MU X for later use. In some implementations, additionally or alternatively, other lists identifying a neighbourhood for MU X can be stored, for example a neighbourhood list including the direct neighbours for MU X and the direct neighbours of the direct neighbours of MU X or a list including further levels of direct neighbours' direct neighbours. In some implementations, the neighbourhood list may be derived and stored using a different similarity criteria, for example a cut-off distance relative to MU X or any other suitable similarity criterion relative to MU X. In all of these implementations, the purpose of storing a neighbourhood list is to rapidly provide MUs that have ASVs similar to the ASV for the MU X (are close in the relevant attribute space), when needed, without having to carry out searching for similar MUs then.

Turning, then, to FIG. 10, at step 1002 the closest neighbour for MU X derived at step 603 is accessed and the direct neighbours of the closest neighbour are retrieved. For an empty database, the second MU added is a direct neighbour of the first one found before and vice versa. At step 1004, for each retrieved direct neighbour MU from step 1002, its respective direct neighbours are retrieved and all retrieved direct neighbours in a neighbourhood list are stored. Additionally, the closest neighbour and the direct neighbours are added to that list.

It will be understood that in implementations where direct neighbours' direct neighbours are saved in a list, that list can be accessed directly for the closest neighbour. Finally, at step 1006 the direct neighbours of MU X are calculated using any suitable algorithm, for example the one illustrated in FIG. 11, where Y and Z are ASVs of MUs in the neighbourhood list of and the current media unit for which direct neighbours are to be determined and X is the ASV for that media unit.

The direct neighbour calculations described above are now illustrated with reference to FIG. 12, which shows an example simplified 2-D attribute space filled with a plurality of MUs, including an MU X for which direct neighbours are to be found, and its closest neighbour F. In this illustrative scenario, MUs D, E and I are direct neighbours of MU F and are retrieved because F is to closest neighbour of X. D's direct neighbours are E and F, E's direct neighbours are D, F, B, I, G, C and I's direct neighbours are E, K, J, G, C. Therefore the neighbours in the neighbourhood list or neighbourhood of media unit F are E, F, D, B, I, K, J, G, C. Running the algorithm of FIG. 9, the direct neighbours of X are determined as D, F and E.

5.5. Neighbourhood Update

With the direct neighbours determined, the algorithm returns from step 604 to step 605 in FIG. 6 to update the neighbourhood of the new MU X. This is now described in detail with reference to FIG. 13. At step 1302, the media units of the direct neighbours of the direct neighbours of the target media unit (newly added MU X) are retrieved and saved in a list. Step 1304 checks if any of the media units in the list are listed as direct neighbours of MU X. Any media unit in the list which is also in the list of direct neighbours for MU X is then removed from the list of direct neighbours of the MU for which it was initially listed as a direct neighbour at step 1306. To illustrate, consider an example: MU Y is a direct neighbour of X and MU Z is a direct neighbour of Y initially and therefore included in the list. If step 1304 determines that MU Z is listed as a direct neighbour for MU X, it is removed from the list of direct neighbours of MU Y. Any media unit in the list not determined to be of a direct neighbour of MU X at step 1304 remains as initially listed in the relevant direct neighbour list and no changes are made for the respective MUs.

Subsequent to step 605, all media units in the media unit master database 222 in the embodiment described currently are linked to other media units by their respective neighbourhood lists of each media unit, so that, for any one media unit, media units similar to that can be retrieved by retrieving its neighbourhood list, the neighbourhood lists of media units in its neighbourhood list, and so on. This retrieves media units at a low level of granularity, since the direct neighbours will be close to each other, in relative terms. Often, and in particular as discussed below, it is desirable to retrieve media units that are similar to each other but at a higher level of granularity, so that retrieval of media units does not focus on any one particular area of attribute space too rapidly. To this end, depth levels are defined, so that, in effect, at each depth level the granularity is increased and direct neighbour units are, on average, further away from each other than at a depth level where granularity is finer. Figuratively speaking, media units are pruned from depth levels from high to low depth (low or fine to high or coarse granularity). This is done based on a quantity referred to herein as "pruning priority" calculated at step 606, with the attribution of depth levels being done by an algorithm referred to herein as "powers of two" at step 607. The latter involves, for each depth level, recalculating neighbourhood lists taking account only of units at that depth level as part of step 607, as will be discussed below.

5.6. Pruning Priority

Figure 14:
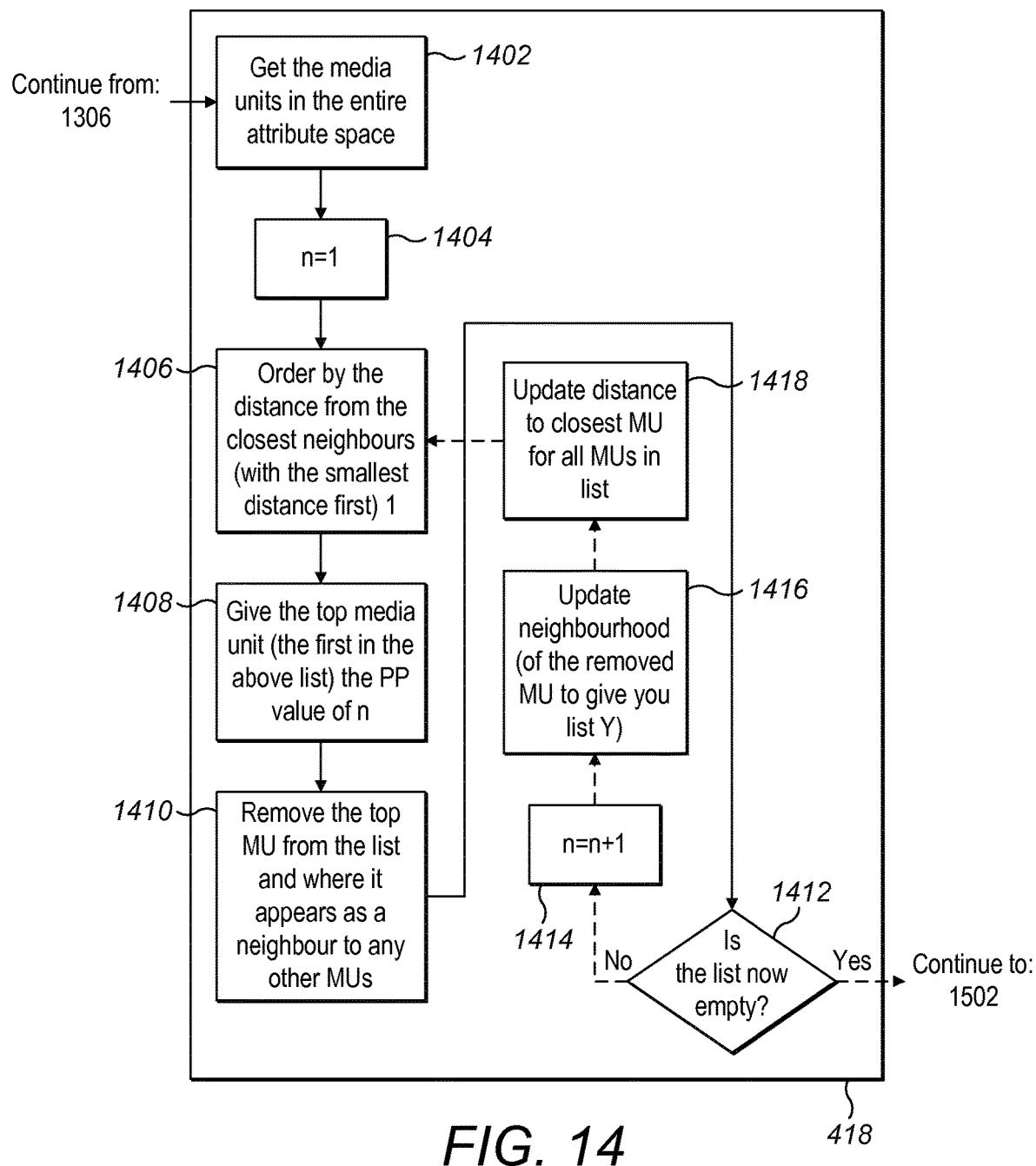
FIG. 14 illustrates a process for determining pruning priorities.

Turning in detail to step 606, with reference to FIG. 14, some implementations of the calculation of the pruning priority quantity used as a basis for the assignment of depth levels to media units are now discussed. At step 1402 the media units of the entire attribute space to be treated, together with, for each media unit, the distance from its closest neighbour (that is its closest neighbours are stored in a list). At step 1404 a counter n is initialised to n=1. The list is sorted by the distance from the respective closest neighbour at step 1406, and at step 1408 the media unit with the smallest distance is given a pruning priority value PP=n. At step 1410 that media unit is removed from the list and also where it appears in the neighbourhood lists of any other media units. Step 1412 checks if the list is empty and, if it is not, the process increments the counter n by one at step 1414, updates the neighbourhood of the removed media unit at step 1416. The neighbourhood is updated by identifying all MUs that are direct neighbours of the removed MU. Each identified MU is then effectively treated as a new MU, recalculating the direct neighbours of one of the identified MU in accordance with step 604 described above in detail with reference to FIG. 10 and then passing that identified MU as target unit to step 605 described above with reference to FIG. 13. This is repeated for each of the identified MUs until they all have had the direct neighbours and neighbourhood updated. Subsequent to updating the neighbourhoods, the distance to the respective closest media unit for all remaining media units in the list is updated at step 1418. The process then loops back to step 1406, where the updated list of the remaining media units is ordered again and so on, until it is determined at step 1412 that the list is now empty and the algorithm proceeds to step 607. As a result of step 606, the media units in the attribute space are each associated with a corresponding pruning priority value PP that indicates how early in the process of step 606 the media unit was removed, or in other words how far away it was from its closest neighbour.

A programmatic description of the process, taking account of "tied" distance values, is as follows:

For each attribute A, do:
In a temporary copy of the database do:
List the media units in order of distance D1 to their closest neighbour in attribute A, smallest first. In case of a tie, order the tied units in order of distance D2 to their second closest neighbour in attribute A, smallest first. In case of there is still tie, repeat the process for D3, D4 and so on, one at a time, until all ties are dealt with.

If two media units are tied for the N closest direct neighbour distances (D1 to DN), the media unit with more direct neighbours (D1 to DN+1 or more), will be ahead of the one being compared with fewer direct neighbours (D1 to DN).

Should this procedure still end in a tie, this procedure continues by taking the direct neighbours' direct neighbours into account as well.

In the unlikely event that this procedure still does not break the tie, in some implementations an order is then established by random choice or, in other implementations of this process aiming at being reproducible, an additional piece of meta data information is used to break the tie. For example, in some implementations the time the media unit was added to the MUM database 222 is used.

All of this occurs on the temporary copy of the database with the sole purpose of creating a pruning priority list for each attribute, so the direct neighbour list now becomes a list of media units to update when removing units from the list of media units in order of distance. Take the first media unit in the list and assign its "pruning priority for attribute A" (an integer) a value of 1. Remove the first media unit in the list and update the position in the list of all its closest neighbours. Also update the direct neighbour list of the direct neighbours of the removed unit. Repeat for the new first media unit in the list. Repeat the process until there are no more media units in the list, incrementing the processing priority on each iteration.

As a result, a high PP value indicates that the relevant media unit is representative of a coarser level of granularity and a low PP value indicates that the relevant media unit is representative of a finer level of granularity more suitable for a detailed view. A high PP indicates that the value for a media unit in this attribute represents a particularly different value from the others, and therefore will provide a better indication of the location users wish to be within an attribute in contrast to those values that have low PP.

5.7. Depth Levels of Granularity

Figure 15:
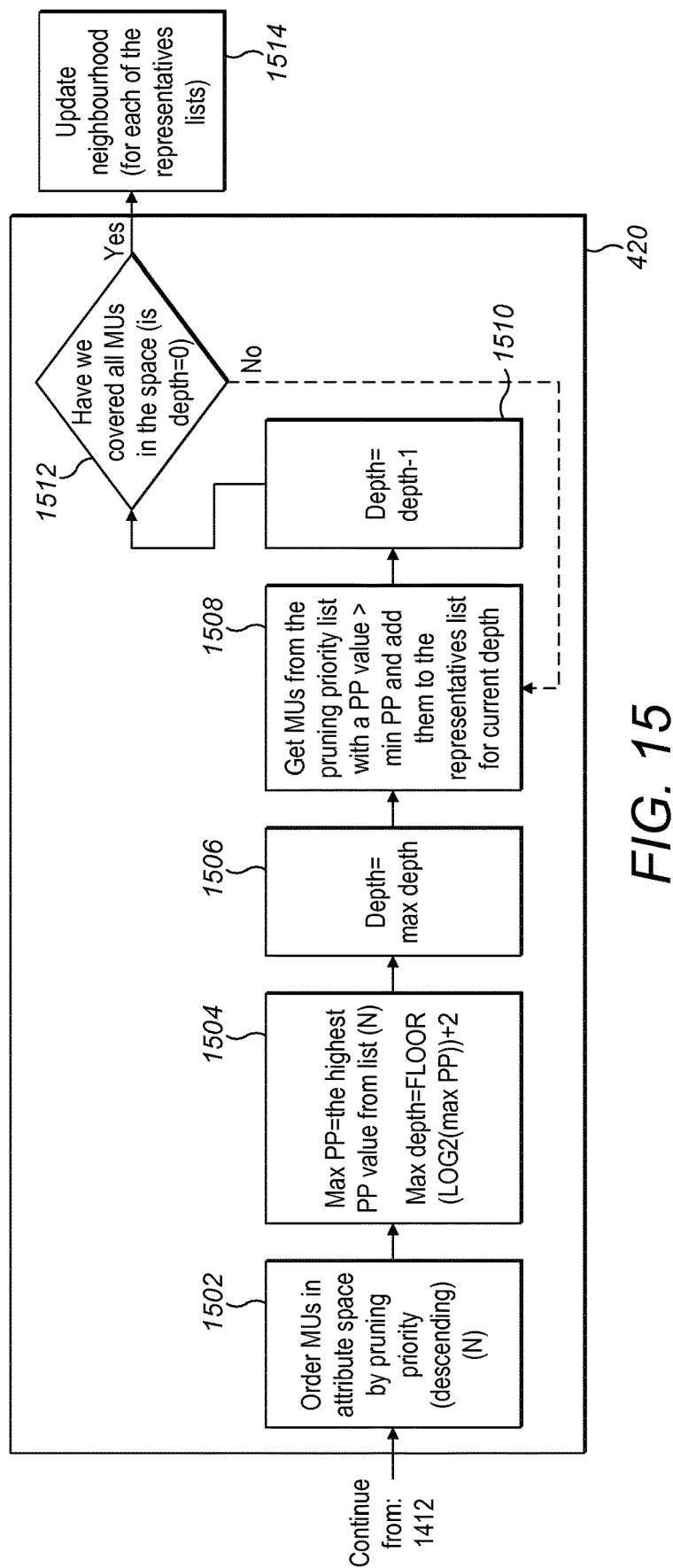
FIG. 15 illustrates a process for assigning a depth level of granularity based on pruning priority.

With reference to FIG. 15, step 607 above, which sets depth levels for the media units, is now described. At step 1502 the media units in the attribute space being processed are ordered by the pruning priority PP in a list. Step 1504 calculates a parameter Max PP as the highest PP value from the list and a parameter Max Depth as FLOOR (LOG 2 (Max PP))+2. At step 1506 a counter variable Depth, which indexes the depth levels, is initialised as Depth=Max Depth.

At step 1508, media units from the list that have a value of PP>min PP=Max PP$-2^{(Depth-1)}$ are added to a list of representative media units for the depth level indexed by Depth (that is in the highest depth level indexed by the largest value of Depth, which has all media unit for the attribute and is therefore the most detailed level with the finest granularity for the first pass of step 1308 of the process, when Depth=Max Depth).

At step 1510, the counter Depth is decremented (Depth=Depth−1) and at step 1512, it is checked whether all media units in the attribute space have been covered (that is Depth=0). If not, the process loops back to step 1508 to add media units to the next depth level at the next smaller value of Depth. In some embodiments, the process stops before Depth=0, for example at Depth=2, 3, 4 or 5, so that levels with less units than needed (individually for the attribute in question or across all attributes) to fill the screen can be discarded.

The set formed of the list of representative media units for a given numerical depth level will be referred to as media units of that depth level in the remainder of this document. The term "media units at a given depth level" will refer to the same set and the terms "a media unit is represented at a given depth level" or "a media unit is present at a given depth level" will mean that that media unit is a member of that set formed of the list of representatives of that given depth level.

If all levels have been covered (Depth=0, or as discussed above), the direct neighbours and neighbourhoods are updated for each representative list at step 1514. Each representative list (Depth=1, 2, 3 . . . ) is processed separately to create a neighbourhood list for each depth level or depth a media unit is associated with, that is a neighbourhood list for each unit at each level in which only media units at the same level are considered for listing in the neighbourhood list. In detail, for one Depth, one of the media units is passed to step 604 described above to calculate its direct neighbours and then to step 605 (as "target" unit) to update its neighbourhood. This is repeated until all media units at that depth have been processed in this way. This is then repeated for each Depth until all depths (being used) have been processed in this way. Thus, updating each depth level is done as described above by updating the direct neighbours for one of the MU in the table (step 604 described above), updating the neighbourhood for that MU (step 605 above) and repeating this until all MUs in the table have been updated this way.

An example of how the calculations described above with reference to FIG. 15 are run, for the purpose of illustration, is presented in FIG. 16 for an exemplary data set of 735 media units.

As a result of this process, each media unit at depth level Depth=Max Depth (all media units associated with the attribute) has a neighbourhood list listing its direct neighbours that are also associated with depth level Depth=Max Depth. Each media unit that is also on depth level Depth=n has a corresponding neighbourhood list listing direct neighbours which are all on depth level Depth=n. In other words, a media unit of minimum depth level Depth=1 has Max Depth-1 neighbourhood lists, one for each depth level and a media unit associated with a minimum depth level of Depth=n has Max depth-n neighbourhood lists associated with it. In some implementations, each depth level is stored as a separate table in the database. Storing the levels in this way means that a new table is created for each depth. Upon a request from the back-end component 238, a media unit within a given depth table corresponding to the current or desired depth level is retrieved. This may improve performance where the number of depth levels can vary.

Updating each depth table is done as described above by updating the direct neighbours for one of the MU in the table (step 604 described above), updating the neighbourhood for that MU (step 605 above) and repeating this until all MUs in the table have been updated this way.

The above description sets out an exemplary implementation of processes 230 for creating a search collection for one attribute where the media unit provides individual attribute values (as opposed to a probability distribution for the attribute value), and it will be understood that the processes are repeated for each attribute to fully store the media unit in the respective attribute spaces. While these processes have been described above for a single media unit being added to an existing database, that is the processes are described as being done on the fly, they can equally be done by way of batch processing once a certain number of media units needing to be added has been accumulated or at certain pre-set times, for example for load balancing when other traffic with the system is low. It is generally preferred to add new media units in batches. It may take less computing time if the system adds multiple media units to their attribute spaces (with no direct neighbours) and then updates the surrounding media units, rather than add one MU at a time.

In the instance of a new Search Collection 233 being populated via step 230, the first media unit is given no direct neighbours, and the next one will be linked with the existing one as a direct neighbour, the algorithm then proceeding as described above.

The description above describes step 230 for some implementations and, therefore, also describes the precise structure of the Search Collection 233 for these implementations.

With reference to these implementations of the Search Collection 233, a corresponding back-end component 238 is now described. This back-end component 238 assumes certain further restrictions on the framework described in FIG. 5*a*. Firstly, as mentioned above, it assumes that the user input consists of precisely one selected media unit.

5.8. Depth Levels and Media Unit Retrieval

Figure 17:
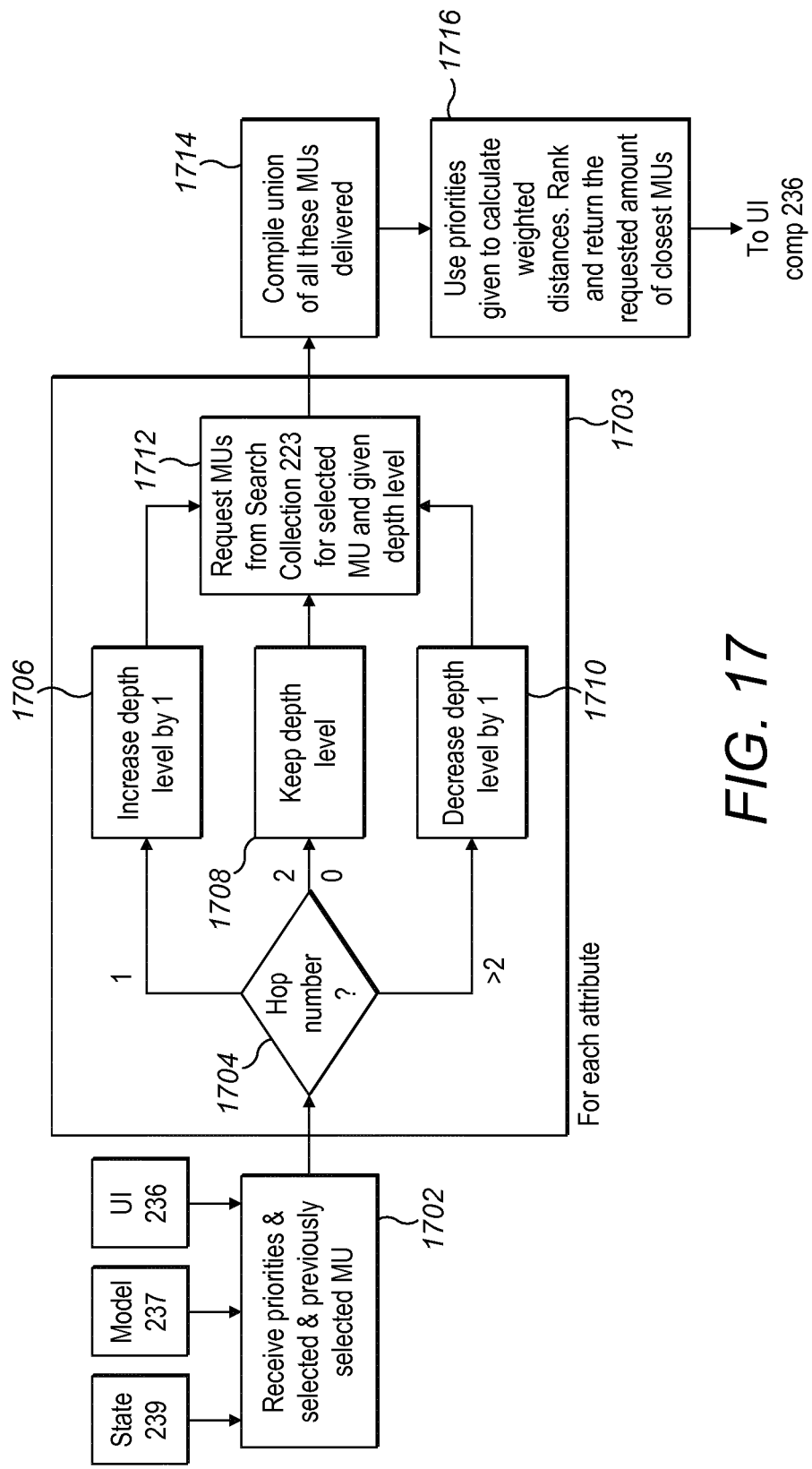
FIG. 17 illustrates the use of depth levels to change the granularity of media units presented from one iteration to do next.

The first task of the back-end component 238 is to interface with the Search Collection 233 and produce, upon receipt of information from other components as described below, a pre-set number of media units to be delivered to the UI component 236. These media units are then shown to the user and the next selected media unit is amongst these. With reference to FIG. 17 an implementation of this first task is described. In step 1702 the back-end component 238 receives the latest user selected media unit from the UI component 236 or the model component 237. Moreover, in case this is not the zeroth step, it receives the Priority Weights, i.e. one numerical value per attribute, from the model component and, if this is not the first step, it also receives the previously user selected media unit from the State Memory 239. The zeroth step is treated below separately.

Then process 1703 is performed for each attribute of the media units in 233 (noting that all media units in a Search Collection are annotated for precisely the same attributes, see process 230 above). At step 1704 a "hop" number of the currently selected media unit is calculated. If a previously selected media unit is not available, the hop number is set to be zero. Should a previously selected media unit be present, the hop number is set to 1 if the latest selected media unit is a direct neighbour of the previously selected media unit at the current depth level. If the hop number is not 1, then process 1703 checks whether the currently selected media unit is part of the union of the direct neighbours of the previously selected media unit's direct neighbours. If that is the case, the hop number is set to 2, otherwise it should be set to 3. If the hop number is 1, step 1706 will increase the current depth level number if possible. If the hop number is either zero or two, the depth level is not changed (step 1708) and will be decreased by 1 if possible should the hop number be larger than 2 in step 1710. In step 1712, the back-end component 238 now interfaces with the Search Collection 233 described above and requests the direct neighbours of the currently selected media unit at the given depth level to be delivered.

In more general terms, if the selected media unit is "very similar" to i.e. within a first similarity band of, the previously selected media unit, the depth level is increased, decreasing the spacing of the next set of MUs. If the selected media unit is "moderately similar" i.e. within a second similarity band of MUs that are less similar than those in the first band, the depth level is not changed. Finally, if the selected MU is "less than moderately similar", i.e. not within the first or second similarity bands, the depth level is decreased to return a more widely spaced selection of MUs at the next iteration.

Membership of a selected MU in one of the similarity bands relative to previously selected MU can be evaluated based on the neighbourhood list as described above in the context of the hop number, or in other implementations based on respective ranges for a distance between the two selected MUs, for example.

Given that the latest selected media unit was part of the media units the back end component 238 originally provided to the UI component 236 in the previous step (apart from the zeroth step treated separately below), it is clear the currently selected media unit is represented at that depth level and hence the requests can be undertaken if no change has been made to the depth level in step 1704. Should it not be possible to increase the depth level or should the currently selected media unit not be present in the depth level decreased by 1, the request is executed with the depth level unchanged in step 1704. Thus in either case results are received. The union of all the media units received as a result of repeated calls, one such request per attribute as shown in step 1703, to the semantic Search Collection 233 in step 1712 is formed in step 1714.

The Priority Weights, a numerical value for each attribute, are then used to form a weighted distance metric on attribute space. Concretely, if $d_1 \ldots, d_A$ denote distance measures (metrics) between media units for the attributes $1, \ldots, A$, respectively, and if $w_1, \ldots, w_A$ denote the associated Priority weights for the attributes $1, \ldots, A$, respectively, then, given two points x, y in attribute space, the weighted distance in attribute space between these two points is defined to be $$\sum_{j=1}^{A} w_j d(x, y)$$

This weighted sum is the sum of the distances in each attribute, each multiplied with the corresponding Priority Weight value. This results in a distance metric for the entire attribute space. All the media units collected in steps 1712 and 1714 are ordered in order of distance to the currently selected media unit and the pre-determined number of units are then provided to the UI component in step 1716 for presentation to the user.

This leaves the case that not enough media units are compiled as a result of step 1714 (i.e. that number being less than the given required number to be returned). This case is rare and can only happen if the Search Collection 233 is "sparse" in certain regions. In some implementations this case is addressed by modifying step 1712 in the following way. A minimum target number of units that should be retrieved as a result of each execution of step 1712 is set and, should step 1712 fail to deliver the relevant amount of media units, the request is repeated to return the direct neighbours of all the direct neighbours of the media unit in the original request. Should the union of the result still not satisfy the numerical threshold set, the direct neighbours of all the media units of the last requests are taken and then a request is launched for direct neighbours for each of these. This process is repeated until the target number of media units is retrieved.

5.9. Most Dissimilar Media Units

Returning to FIG. 17, a variant of process 1703 described above is now described. This alternative mechanism for selecting media units for display, having different implementations of steps 1712, 1714 and 1716 described above, is to return units from a neighbourhood related to the selected media unit in such a way that the referenced units are, within the neighbourhood, the most dissimilar to the selected media units. This can be useful when insufficient data to calculate any measure of similarity is available at a specific stage of the process (for example where several selections are needed to determine attribute priorities as described in detail below), or to confirm periodically what the user is looking for and allowing the user to change direction in the search more readily.

In this variant of process 1703, at step 1712, the neighbourhood (direct neighbours) is retrieved for each attribute with the selected media unit and stored in a table with one column for each attribute, listing the ASVs of the retrieved media units. At the same step, the direct neighbours of the media units in the table are retrieved and, potentially, their direct neighbours, and so on until enough results have been collected, for example a pre-set number for a given display size/number of units to display. All these tables are combined in step 1714 into a large table, removing duplicates. At step 1716 the columns in that table are ordered by the distance of the ASV associated with the listed media units from the ASV of the selected media unit, such that the media units having ASVs furthest away from the ASV of the selected media unit are listed at the top (although the sort order is of course not of importance and in the process works equally with the reverse sort order). The distance is defined to be the weighted sum of distances for each attribute, weighted by the priority values given (as described in detail below). The table now contains those of the retrieved media units that are furthest away from the selected media unit (most different or diverse) at the top and those that are closest or more similar to the selected media unit at the bottom.

Step 1716 is now performed on this inversely ordered table in a manner that differs from the one described above; in which MUs are ranked by a weighted sum of attribute distances. Here, at step 1716, the table is traversed column by column, picking at each time the top media unit and, once all columns have been traversed starting again with the next row until a sufficient number of media units have been picked to fill the next screen of results. The set of media units that have been picked are then returned for display on the results screen as described above. In this way, the media units which are most different in each attribute from the selected media unit are picked for display, then the next different ones, and so on until enough media units have been picked for display.

5.10. Initial Display Screen

The action of the back-end component 238 at the zeroth step in a search, i.e. the step where no selection has so far been made and the back-end component is tasked with supplying a given number of media units to the UI component 236 as a first selection to be shown to the user, is now described.

In some embodiments, the initial screen may be populated with media units from different depths, for example comprising depths that each have an insufficient number of media units to fill the screen, or add media units from a lower depth to a Depth that could by itself fill the screen. The discussion above is focused on filling an initial screen with media units from a single attribute space. Similar considerations apply when considering multiple attribute spaces. For example, media units can be sampled from a combined pool of units from a depth which does not have enough units in a single attribute space to fill the initial screen, but the combined set of units does. In some embodiments, units are sampled from a depth where each attributed space has sufficient units to fill a screen. The proportion of units from each attribute space may be determined by attribute specific sampling probabilities or fixed proportions or other rules. For example combinations of the above approaches are also possible, for example sampling most units from an attribute space considered to be most important at a depth that fill at least most of the screen (e.g. depth 6) and sampling the rest from a lower depth (e.g. 4), one or a few units per attribute.

6. Model Component

In order to complete the description of media unit search and display 204 under the assumptions described above and in FIG. 5a, a description of the model component 237 is required. Two distinct classes of such implementations are described below.

The first one has a predominantly geometric approach whereas the second is based in addition on a probabilistic/information theoretic framework as described below. Within each of these classes of implementations further variants are also discussed.

6.1. Predominantly Geometric Framework

The first framework places the following further restrictions on the setup described in FIG. 5a. This framework is applicable the number of media units the UI component presents to the user are a given pre-determined constant for each step. Secondly, the user input consists of at least one selected and at least one unselected media unit and that the user selected media units are presented to the user again at the next step, i.e. that they are included in the output of the model component 237 and then, in turn, in the output of the back-end component 238 to the UI component 236 for the users attention at the next step. Thirdly, the feature sets describing media units are sets of attribute values rather than probability distributions.

This framework is now described in two stages: first an implementation of the model component 237 to be used when there is precisely one selected media unit as user input is provided. Then a implementation where the user input consists of more than one selected media unit is provided. Finally, an implementation is described that can be employed if the feature sets are in fact descriptions of probability distributions rather than just sets of attribute values.

6.1.1. One Selected Media Unit

Figure 18:
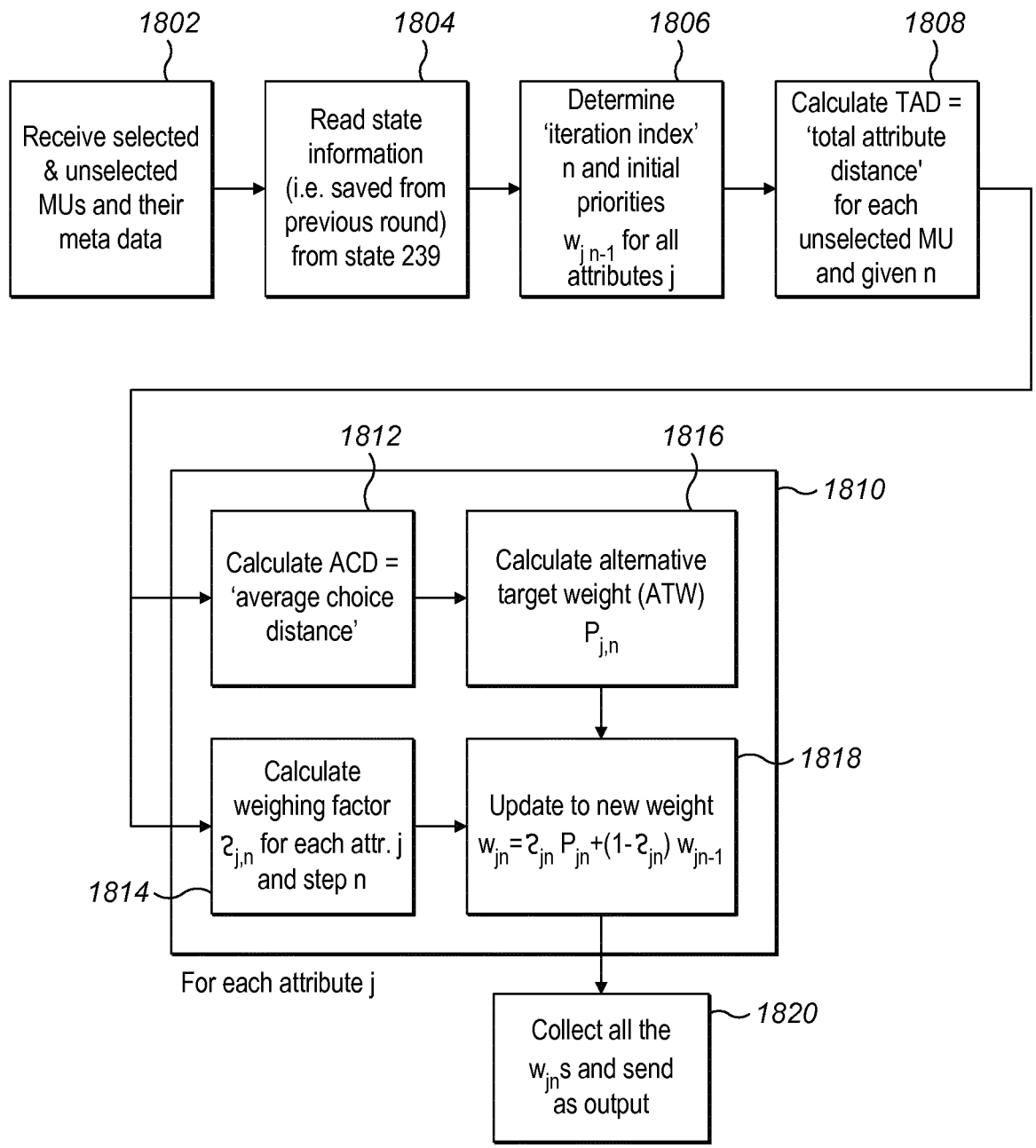
FIG. 18 illustrates a process for calculating priority weights for use in a weighted measure of similarity.

FIG. 18 is a flow diagram describing a first implementation with the three assumptions above. At step 1802 and step 1804 all the inputs for this implementation of model component 237 are gathered: From the UI component 236 the currently selected and unselected media units is received together with meta data for all these media units (step 1802).

Moreover, information from State Memory 239 is read in step 1804. The State Memory information is stored by previous passes of component 237 (if any). Several embodiments are outlined below that each require different pieces of information in State Memory 239 as described below. One piece of information that is always stored in State Memory and read in step 1804 is the number of times this step has previously been executed.

In step 1806 a current iteration index n is set to n=1 if step 1806 is executed for the first time, otherwise n from the previous round is incremented by 1. Thus, the iteration index counts how many single media unit selections the user has so far made from the screens displayed by the UI component 236. If n is not equal to 1 then the State Memory 239 is expected to contain the Priority Weights calculated as the previous output, $w_{j,n-1}$, for each attribute label j. If n=1 then set $w_{j,1}=w_0$ for some non-zero pre-determined value $w_0$. In some implementations this value is equal to 1. It is noted though that any suitable constant can be used instead. The way these attribute priorities are used in the back-end component 238, as outlined above, is as a weighting factor for attribute wise distances in order to define a similarity measure on the combined space. Since MU selection by the back-end component 238 is based on relative distances, this implies that multiplying these Priority Weight values with a positive constant will not change the output of the back-end component 238.

At step 1808 a total attribute distance (TAD) is calculated for each unselected media unit at the current step. TAD is a measure of how close any unselected media unit is to the selected media unit across all attributes where the weighted measure used for this calculation is based on the previously calculated set of Priority Weights $w_{j,n-1}$ for all attributes j:

$$TAD_{i,n} = f\left(\sum_{j=1}^{M} w_{j,n-1} d_j(U_{ijn}, S_{jn})\right)$$

where n, i and j respectively index display iterations, unselected media units and the attribute space.

$U_{ijn}$ is the ASV of unselected media unit i in the attribute space j at iteration index n.

$S_{jn}$, is the ASV of the selected media unit in the attribute space j at iteration index n.

$d_j(U_{ijn}, S_{jn})$ is the distance between $U_{ijn}$ and $S_{jn}$ with respect to the distance measure (metric) in attribute space j.

$w_{j,n-1}$ is the Priority Weight given attribute j for selection of media units for the previous screen (i.e. iteration index n−1).

M is the number of attributes and $f$ is a convex function. In some implementations f is the identity function, i.e. f(x)=x.

In some implementations distance measures $d_j(x, y)$ which can handle distance calculations between the ASVs of media units in attribute j are amongst the following.

$$d_j(x, y) = \sum_{i=1}^{K} |x_i - y_i|$$

$$d_j(x, y) = \left\{\sum_{i=1}^{K} (x_i - y_i)^p\right\}^{\frac{1}{p}}.$$

for p>1 and where $x=(x_1, \ldots, x_K)$ and $y=(y_1, \ldots, y_K)$.

Subsequent to step 1808 a process 1810 executes the following steps for each attribute j.

At step 1812, a quantity is determined that provides a measure of how intentional the selection of the selected media unit was in respect of each attribute, or, in other words, whether the selection of the selected media unit was, from the user's perspective, driven by a given attribute or not (for example being random or driven by other attributes).

In some implementations, regardless of the information received from state in step 1804, this quantity is based on a comparison of all the choices that could have been made by the user (the unselected media units) with the selection that was made, averaged over the choices that could have been made. The reason behind this approach is that, for any one unselected media unit, if the distance between the unselected and selected media unit is large, it is more likely that the choice was intentional then if the distance is small. If the unselected media unit is close to the selected media unit in a given attribute, this indicates that the selection of the selected media unit over the unselected media unit in that attribute may have been random or driven by other attributes rather than intentional. However, since even a completely random selection of the selected media unit (selection of the "average" of the displayed media units or the centre of mass) would result in a non-zero value for this measure, the distance from the unselected media unit to the centre of mass of the displayed MU, is subtracted to account for the choice distance associated with a random selection. Finally, the total attribute distance TAD is used to weigh the contribution to this measure from each unselected media unit, on the basis that if a unselected media unit is far from the selected media units, on average, across all attributes, this increases the likelihood that the choice between the unselected and selected media unit was intentional because the choice is not explained (or explained to a lesser extent) by an interest in other attributes (which is believed to be more likely if TAD is small).

Putting this together, the following expression is used for this measure of intentionally, also referred to below as average choice distance (ACD):

$$ACD_{jn} = \frac{1}{N} \sum_{i=1}^{N} [d_j(U_{ijn}, S_{jn}) - d_j(U_{ijn}, CM_{jn})] \cdot TAD_{in}$$

where:
$CM_{jn}$ is the centroid of the ASVs of the displayed media units in the attribute space j at iteration index n.
N is the number of unselected media units in a given screen.

Using the quantities defined above, a suitable calculation to calculate the centroid or centre of mass is as follows:

$$CM_{jn} = \frac{1}{N+1}\left(S_{jn} + \sum_{i=1}^{N} U_{ijn}\right)$$

In step 1814 a weighing factor $n_{jn}$ is defined for a given attribute j at step n. This factor plays a role in combination with steps 1816 and 1818. In step 1816 a potential new best value of the Priority Weight, $w_{jn}$ the alternative target weight (ATW) is derived and in step 1818 new Priority Weight $w_{jn}$ is determined as a linear combination of $1-\eta_{jn}$ times the previous Priority Weight $w_{j,n-1}$ and $\eta_{jn}$ times the alternative target weight. Thus the weighing factor $\eta_{jn}$ should be regarded as how much of the previous Priority Weight will survive and how much will be replaced by the weight defined in step 1816.

In some implementations of step 1814 it is assumed that the state information retrieved from State Memory 239 in step 1804 contains both the previously selected and previously unselected media units. In this setting, for n>1 $\eta_{jn}$ can be defined as:

$$\eta_{jn} = \frac{1}{N}\left|\sum_{i=1}^{N} [d_j(U_{ijn}, S_{jn}) - d_j(U_{ijn}, CM_{jn})] - \sum_{i=1}^{N} [d_j(U_{ij,n-1}, S_{j,n-1}) - d_j(U_{ij,n-1}, CM_{j,n-1})]\right|$$

where the symbols are defined as described above. For the case n=0 this quantity is set to be zero. The update rate or weighing factor $\eta_{jn}$ is thus based on the magnitude of the change between the current and previous iteration of a quantity related to ACD, although not weighted by TAD, to provide an indication of the average difference of the choices made between the last two iterations. Before providing a more intuitive explanation of this definition of $\eta_{jn}$ it can be seen that the above formula immediately implies that $$0 \le \eta_{jn} \le \frac{2T}{N}$$

where $T_j$ denotes the maximum distance two points in ASV of the Search Collection 233 can have for the attribute j in question. T thus depends on both the ASV value range (between −1 to 1 for each coordinate value in some implementations), as well as the distance measure used. In some implementations these choices are such that $$\frac{2T}{N}$$

is less than or equal to 1.

One way to view the above definition of $\eta_{jn}$ is as follows. If one equates the sum of the differences of distance between the most recently unselected media units to the most recently selected one and the distances from the most recently unselected media units to the most recent centroid as a proxy of gauging how much the user selection has moved in respect of this attribute in the last step then the formula for $\eta_{jn}$ means that if the user selection has moved further in the current step than before, the ATW computed in step 1816 is allowed to continue updating the weight factors in step 1818.

An update weight quantity $p_{jn}$ is then calculated in step 1816 using the average choice distance computed in step 1812:

$$p_{jn} = \frac{1}{M \cdot (1 + c^{-ACD_{jn}})} = \frac{1}{M}\text{sigmoid}(-\log(c) \cdot ACD_{jn})$$

where the sigmoid function is defined as usual as $$\text{sigmoid}(t) = \frac{1}{1+e^{-t}}$$

and where c is a constant that is determined experimentally in relation to the dataset given and where M denotes its number of attributes. In some implementations this constant is 0.1. The intuition behind using the sigmoid function is the following. It should be noted first that the sigmoid function's range lies between 0 and 1, that it is symmetric about the point (0,0.5) and that it has a single inflection point at this symmetry point. Given the intuitive meaning of the average choice distance above, a small value for $p_{jn}$ is chosen if $ACD_{jn}$ is negative, i.e. if the inference is that the attribute j plays a small role in the users last choice. Inversely, if the inference is that attribute j was important to the users intention in the last step, then ACD will be large and hence $p_{jn}$ will be close to 1. The role of the sigmoid function is to focus the value range at which $p_{jn}$ changes most to a value range of the $ACD_{jn}$ close to the origin.

As indicated above, step 1818 defines an update equation for the Priority Weights $w_{jn}$ as:

$$w_{jn} = \eta_{jn} \cdot p_{jn} + (1-\eta_{jn}) \cdot w_{j,n-1}$$

using the notation defined above.

In step 1820 the Priority Weights $w_{jn}$ are collected for each attribute j and the resulting set is passed as output of the model component 237 to the back-end component 238 as shown in FIG. 5*a*.

6.1.2. More than One Selected Media Unit

A description is now provided of an implementation using the model component 237 and back-end component 238 described above that implements the media unit search and display 204 such that it can handle user input of more than one selected and at least one unselected media unit. The model component 237 and back-end component 238 as described above are called for each selected media unit successively and the successive back-end components outputs are then further processed further as described below. Moreover, the step of saving the previously selected media unit in the model component 237 to the State Memory 239 is done by appending the currently treated selected media unit to a list of media units for the same step. When reading out the previously selected media unit, the provided list in State Memory 239 can either be altered or left unaltered for the next iteration dealing with another selected media unit in the same step. In some implementations, when reading a previously selected media unit, it is removed from the list unless the list would be empty. In this way, the media units are paired off in order, i.e. the model component 237 is run with first selected media unit of the current step using the first selected media unit of the previous step as the previously selected media unit. If the number of selected media units in the current step exceeds those in the previous step, the last media units all use the last selected one in the previous step as the previously selected one. Similarly, if the number of media units in the current step is less than in the previous step, the excess number of media units in the previous step are not regarded.

In another implementation, when reading the list of selected media units from the last step, a random one is chosen as the previously selected media unit in the model component 237.

After calling the model component 237 followed by the back-end component 238 for each selected media unit provided by the user yields a collection of lists of media units, one associated with each selected media unit. These lists are then spliced together to form a list which the output to the UI component 236 is derived.

In some implementations, this is done using the Priority Weighted distance of the underlying attribute space in the following way. For each media unit in each list a score is calculated that is composed of the weighted sum of the Priority Weight distances of the media unit in question to each of the selected media units. The weights in this sum have two values α and β. The summand is weighted by the weight α>0 if and only if the media unit in question is contained in the list of the selected media unit in question and is β otherwise. All media units are then ranked by their score in descending order and the top number of media units that are handed to the UI component 236 are then chosen where ties are broken with an arbitrary choice. In some implementations α=β. In other implementations α=2 and β=1.

Concretely, if $d_1, d_2, \ldots, d_A$ denote distance measures (metrics) on each of the attributes labelled $1, \ldots, A$, respectively, then the score of a media unit X in the union of all lists for each of the m selected media unit $S_1, \ldots S_m$ is calculated as follows.

$$\text{Score}(X) = \sum_{k=1}^{A} w_k \sum_{j=1}^{m} \Delta(X, S_j) d_k(X, S_j)$$

where $\Delta(X, S_j)$ is equal to a if X is part of the list associated from $S_j$ and β otherwise.

6.1.3. Feature Sets Representing Probability Distributions

Other implementations are now described that removes the assumption in the implementations of the model component 237 and back-end component 238 described so far in the setting of the geometric framework that feature sets describing media units consist of sets of attribute values as such. If media units in the Search Collection 233 are described by feature sets comprising parameters describing probability distributions, the above implementation is adapted by re-interpreting these parameter sets as attribute values themselves. An adapted similarity measure is defined and the above implementations of the model component 237 and back-end component 238 are otherwise applied directly. As an example, in some implementations, if each attribute media unit is described by a normal distribution over attribute values then the feature sets consist of a collection of numerical values representing the mean vector and covariance matrix for each attribute, then a similarity measure over these values can be defined, for example, by, taking the measure to be the sum of the Euclidean distance between the mean vectors in each attribute while ignoring the covariance matrices entirely. In other implementations, similarity measures between the respective probability distributions (rather than between points) are employed, for example the Hellinger distance [http://en.wikipedia.org/wiki/Hellinger distance] or the L2-norm [https://en.wikipedia.org/wiki/Lp_space].

6.1.4. Generalised Search Collections

The above description of the media units search and display 204 assumes that all the media units in the Search Collection 233 have feature sets describing the same attributes. Implementations of the back-end component 238 and a change in the work-flow in FIG. 5*a* which makes it possible to drop that assumption is now described.

In all Search Collections 233 described above, i.e. the output of the Power of 2 embodiment and the storing values in RAM embodiment, media unit attribute values are stored on a per attribute basis. In fact, the model component 237 described above deals with semantic ASVs on a per attribute basis and back-end component 236 carries out step 1703 for each attribute. Any time the model component 237 returns Priority Weights, the above implementations can rank all attributes. In some implementations this ranking is performed purely on the basis of these Priority Weights (i.e. highest first), but in other implementations other static parameters calculated from the data in each attribute contained in the attribute space (such as the variance of all the values of all ASVs in that attribute) are also taken into consideration. In some implementations, for example, the Priority Weight is multiplied with the variance of the coordinate values of all media units in that attribute (using the distance metric defined above for each attribute). The back-end component 238 then returns a given set of media units per attribute as before. The difference though is that these media units returned might only be annotated for the attribute in question and not for the other ones. The back-end component 238 then selects the media units to present to the UI component 236 according to a pre-set recipe: in some implementations a certain number of units are reserved for the top ranked attribute, another for the second ranked one and so on. Some implementations only present units based on the highest ranked attribute.

6.2. Probabilistic Model Component Implementations

A second group of implementations of the model component 237, based on a probabilistic approach, with reference to FIG. 5a is now described. This probabilistic approach to the model component 237 is more general than the implementation above. Initially, it is assumed that there is at least one selected media unit. This assumption is necessary only in order to be able to use the same back-end component 238 described above, but will be dropped later on when another such back-end component is presented, as described below.

This means that this model component 237 receives both the selected and unselected media units from the UI component 236 and the corresponding meta data and information stored in the State Memory 239 from previous calls to the model component 237. The model component returns a set of Priority Weights, i.e. a numerical value for each attribute of the media units. The starting point of this implementation of the model component 237 is given by the following fundamental design decisions:

1. The purpose of the model component 237 is to model the users intended search target with a sequence of random variables at each pass, one for each attribute, each taking values in one attribute space.
2. The model is Markovian, i.e. in each call to the model component 237, the model is provided with the previous step's output of the model component 237 in the form of those random variables described in 1 (through the State Memory 239) above and will return another set of random variable having taken into account information obtained from the most recent user input.

The following notation is useful. For a given attribute labelled j, the random variables at step n are denoted by $X_j^{(n)}$ where n ranges over the non-negative integers (i.e. n=0, 1, 2, 3, ... ). The idea is that $X_j^{(n)}$ describes the users intended search target in terms of a target ASV in attribute j after the user has made his nth choice via the UI component 236. By definition, $X_j^{(0)}$ is an initial prior distribution for each attribute which is given at the start of the search process. In some implementations the initial prior will encode information available prior to a user making any selection. This could include knowledge about the search environment the user faces and associated preferences that environment might entail. For instance, for a media unit search and display 204 in relation to a collection of shoes that has been annotated (FIG. 3) and stored in a Search Collection 233 and it is known that there is a general customer focus on one of the attributes, e.g. shoe colour, then $X_j^{(0)}$ will be set accordingly as described in detail below. The ordered collection (or vector) of random variables $X_1^{(n)}$, $X_2^{(n)}$, ..., $X_A^{(n)}$ is denoted by $X^{(n)}$ where 1, 2, ... A denote the attributes. The random variables are taken to be independent, i.e. that the belief about the users intent modelled for one attribute does not affect any of the other modelled believes for the other attributes. Each of these random variables $X_j^{(n)}$ as well as the collection of these $X^{(n)}$ are defined by a distribution which will be described in detail below. In some implementations each $X_j^{(n)}$ is a (multivariate) normal distribution. More specifically, in some implementations the corresponding covariance matrix is a diagonal matrix. This makes $X^{(n)}$ a multivariate normal distribution of this particular form as well. The corresponding distribution is described entirely by a small set of numerical values. For instance, a one-dimensional multivariate normal distribution is uniquely defined by both its mean and variance, i.e. two numerical values.

Figure 19:
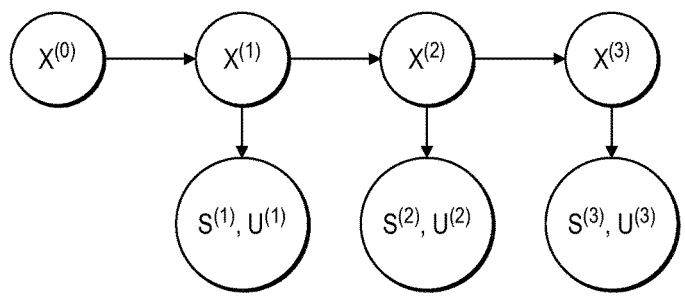
FIG. 19 illustrates a Markov process model and corresponding random variables used in determining probability distributions over a user's target attributes.

FIG. 19 shows the progression of the modelled users intent over iterations, described now with reference to FIG. 5a.

The ASV of users selected and unselected media units at step n obtained by the UI component 236 and supplied as input to the model component 237 are denoted by $$S_1^{(n)} = (S_{11}^{(n)}, \ldots, S_{1A}^{(n)}), \ldots, S_Q^{(n)} = (S_{Q1}^{(n)}, \ldots, S_{QA}^{(n)}), U_1^{(n)} = (U_{11}^{(n)}, \ldots, U_{1A}^{(n)}), \ldots, U_M^{(n)} = (U_{M1}^{(n)}, \ldots, U_{MA}^{(n)})$$

where 1, 2, ... , A indexes the attributes of the media units and where 1, ... , Q denotes the number of selected media units and 1, 2, ... , A1 indexes the unselected media units. Moreover, $U^{(n)} = (U_1^{(n)}, \ldots, U_M^{(n)})$ and $S^{(n)} = (S_1^{(n)}, \ldots, S_Q^{(n)})$ are used as a shorthand. By definition $U^{(n)}$ is empty if M=0. Similarly, although it is currently assumed that there is always at least one selected media unit, it is noted for future reference that if Q=0 then $S^{(n)}$ is empty.

The workflow of the model component 237 in these implementations is as follows: Upon receipt of the ASVs of a users first selection $S^{(1)}$, $U^{(1)}$ (from UI 236) and the original prior $X^{(0)}$ (from State Memory 239), the distribution of a random variable $X^{(1)}$ is calculated, saved in State Memory 239 for the next step and, finally. Priority Weights from this information are derived. The model component sends these Priority Weights to the back-end component 238 and the back-end component 238 then proceeds to provide the UI component 236 with further selections to show to the user based on these Priority Weights as described above. The ASVs of a users selection of these $S^{(2)}$, $U^{(2)}$ is then used by the model component 237 again to calculate the distribution of $X^{(2)}$ (from the distribution of $X^{(1)}$ and a parameter λ, both obtained from State Memory 239) and, from that and from the distribution of the original prior $X^{(0)}$ (also provided in State Memory 239) the output Priority Weights that are handed to the back-end component 238 are calculated. Moreover the model component 237 saves $X^{(2)}$'s distribution as well as an updated λ parameter and $X^{(0)}$ in State Memory 239. This process continues step by step for each user input. The parameter λ affects the distribution updating process as described below and thus influences the experience of the media unit search and display 204. Between steps, the parameter λ is updated based as discussed below. The method chosen can depend on the distribution of media units in the Search Collection 233 and on experience of the media unit search and display 204 for datasets with similar user requirements. In some implementations, λ is decreased by a fixed percentage at each step. In other implementations, a fixed list of values for each step is supplied in advance. In other implementations, λ is held fixed between steps.

It is instructive to explicitly follow what data is stored in State Memory 239 in this implementation and how State Memory 239 changes with each of the steps above. To start with, State Memory contains the original $\lambda_0$ parameter as well as parameters (the mean and variance vector) describing the original prior distribution. After the model component 237 is updated for the first pair of user input $S^{(1)}$ and $U^{(1)}$ having read in the State Memory 239 data, it will save $\lambda_1$, an updated version of $\lambda_0$, the original prior distribution and the parameters calculated the new posterior distribution $X^{(1)}$. Once the model component 237 is called again to handle the next user input $S^{(2)}$, $U^{(2)}$, the data in State Memory is read in again. Again, $\lambda_1$ is modified to $\lambda_2$ by the model component 237 as outlined above and written to the State Memory 239, as are the updated parameters for the updated posterior $X^{(2)}$ and the parameters for the original prior remain untouched again. The following steps in the media unit search and display 204 are handled analogously.

In some implementations, the UI component 236 takes an additional input from the user that modifies λ. For instance, the user can press one of two buttons labelled with a plus or minus sign where a press on plus will decrease the λ used in the next step in a predefined way and a press on the button labelled minus will increase that λ. Intuitively, the plus button, in some implementations, means that the results will "home in" quicker to the most recent user information provided.

In some implementations, the probability distributions for each of the random variables $X_j^{(n)}$ is as follows. If the range of $X_j^{(n)}$ is an m-dimensional space then the probability distribution p for this random variable is given by $$p(x_1, \ldots, x_m) = Z \cdot \exp\left(-\sum_{j=1}^{m} \frac{(x_j - \mu_j)^2}{2\sigma_j^2}\right)$$

where the normalization constant Z is given by $$Z = \frac{1}{\left(\prod_{s=1}^{m} \sigma_s\right)\sqrt{(2\pi)^m}}.$$

Thus this distribution is uniquely determined by the two vectors $(\mu_1, \ldots, \mu_m)$ and $(\sigma_1^2, \ldots, \sigma_m^2)$. The first of these vectors is referred to as the mean vector while the latter is the diagonal of the diagonal covariance matrix which, in the remainder of this document, is called the variance vector. Since the covariance matrix is diagonal this form of multivariate normal distribution contains no cross terms, i.e. no summand in the exponent containing a factor of the form $x_s x_t$ for distinct values of s and t. It has the property that it factorizes into its components:

$$p(x_1, \ldots, x_m) = \prod_{j=1}^{m} \underbrace{\frac{1}{\sigma_j \sqrt{2\pi}} \exp\left\{-\frac{(x_j - \mu_j)^2}{2\sigma_j^2}\right\}}_{q_j(x_j)}$$

The factors $q_j$ are all one dimensional normal distributions with mean $\mu_j$ and variance $\sigma_j^2$.
The distribution of $$X^{(n)} = (X_1^{(n)}, \ldots, X_A^{(n)})$$

can be readily derived. If $X_j^{(n)}$ has a mean vector $(\mu_{j1}, \ldots, \mu_{js_j})$ and variance vector $(\sigma_{j1}^2, \ldots, \sigma_{js_j}^2)$ (where $s_j$ denotes the dimension of the $X_j^{(n)}$ ASVs of the jth attribute) then $X^{(n)}$ is also of the above form and its mean vector is $$\mu = (\mu_{11}, \ldots, \mu_{1s_1}, \mu_{21}, \ldots, \mu_{2s_2}, \ldots, \mu_{A1}, \ldots, \mu_{As_A})$$

and its variance vector is $$(\sigma_{11}^2, \ldots, \sigma_{1s_1}^2, \sigma_{21}^2, \ldots, \sigma_{2s_2}^2, \ldots, \sigma_{A1}^2, \ldots, \sigma_{As_A}^2)$$

Therefore, the distribution of $X^{(n)}$ is given by $$\mathbb{R}^{\left(\sum_{j=1}^{A} s_j\right)} \to [0, 1]; (x_{11}, \ldots, x_{1s_1}, x_{21}, \ldots, x_{2s_2}, \ldots, x_{A1}, \ldots, x_{As_A}) \to$$

$$K \cdot \exp\left(-\sum_{k=1}^{A} \sum_{j=1}^{s_k} \frac{(x_{kj} - \mu_{kj})^2}{2\sigma_{kj}^2}\right)$$

where $$K = \sqrt{(2\pi)^{A\left(\sum_{j=1}^{A} s_j\right)} \prod_{k=1}^{A} \prod_{j=1}^{s_j} \sigma_{kj}}$$

An example is helpful at this point. Consider a Search Collection 233 composed of three attributes, the first two each of dimension 1 and the last one 3 dimensional. Then, as a vector space, the Search Collection's ASVs live in a 5 dimensional vector space (1+1+3) and the distribution of $X^{(0)}$, say, is the product of the three distributions of $X_1^{(0)}$, $X_2^{(0)}$ and $X_3^{(0)}$ of the users intent on the given attribute which are given by the above. Explicitly if $$f_1(x_{11}) = \frac{1}{\sigma_{11}\sqrt{2\pi}} \exp\left(-\frac{(x_{11} - \mu_{11})^2}{2\sigma_{11}^2}\right)$$

$$f_2(x_{21}) = \frac{1}{\sigma_{21}\sqrt{2\pi}} \exp\left(-\frac{(x_{21} - \mu_{21})^2}{2\sigma_{21}^2}\right)$$

$$f_3(x_{31}, x_{32}, x_{33}) =$$

$$\frac{1}{\sigma_{31}\sigma_{32}\sigma_{33}\sqrt{(2\pi)^3}} \exp\left(-\frac{(x_{31} - \mu_{31})^2}{2\sigma_{31}^2} - \frac{(x_{32} - \mu_{32})^2}{2\sigma_{32}^2} - \frac{(x_{33} - \mu_{33})^2}{2\sigma_{33}^2}\right)$$

represent the distributions for $X_1^{(0)}$, $X_2^{(0)}$ and $X_3^{(0)}$, respectively, then their product is equal to $$\frac{1}{\sigma_{11}\sigma_{21}\sigma_{31}\sigma_{32}\sigma_{33}\sqrt{(2\pi)^5}} \exp\left(-\frac{(x_{11} - \mu_{11})^2}{2\sigma_{11}^2} - \right.$$

-continued $$\left.\frac{(x_{21}-\mu_{21})^2}{2\sigma_{21}^2}-\frac{(x_{31}-\mu_{31})^2}{2\sigma_{31}^2}-\frac{(x_{32}-\mu_{32})^2}{2\sigma_{32}^2}-\frac{(x_{33}-\mu_{33})^2}{2\sigma_{33}^2}\right)$$

and hence $X^{(0)}$ has mean vector $(\mu_{11},\mu_{21},\mu_{31},\mu_{32},\mu_{33})$ and variance vector $(\sigma_{11}^2,\sigma_{21}^2,\sigma_{31}^2,\sigma_{32}^2,\sigma_{33}^2)$ The following observations concerning inference and sampling of distributions such as p are important in the remainder of this document. Suppose one is given a set of numbers $\{d_1, d_2, \ldots, d_k\}$ and one would like to find "the best" one dimensional normal distribution $$q_{\mu,\sigma^2} = \frac{1}{\sigma\sqrt{2\pi}}\exp\left(-\frac{(x-\mu)^2}{2\sigma^2}\right)$$

such that these numbers could represent samples drawn from this distribution. It is noted again for convenience that the distribution $q_{\mu,\sigma^2}$ is uniquely determined by the mean $\mu$ and its variance $\sigma^2$. One approach to solving this problem is an application of Bayes' Theorem in the following way. One starts with first defining the space of all possible solutions, with a probability distribution over all possible parameters $\mu,\sigma^2$ the solution can take. This prior probability distribution is defined by further parameters. A frequent choice for this distribution is the Normal Gamma distribution and it is customary (as it renders the formulae easier) to define this distribution on the mean and the inverse of the variance $$\tau = \frac{1}{\sigma^2},$$

also called the precision. This distribution is given by $$f(\mu,\tau\mid\mu_0,\lambda_0,\alpha_0,\beta_0) = \frac{\beta_0^{\alpha_0}\sqrt{\lambda_0}}{\Gamma(\alpha_0)\sqrt{2\pi}}\tau^{\alpha_0-1}\exp\left(-\beta_0\tau-\frac{\lambda_0\tau(\mu-\mu_0)^2}{2}\right)$$

and hence is determined by the four parameters $\mu_0,\lambda_0,\alpha_0$ and $\beta_0$. The mean of $\mu$ of this distribution is $\mu_0$ and the mean of $\tau$ is known to be $$\frac{\alpha_0}{\beta_0}.$$

Moreover the mode of this distribution (i.e. its maximum value) is at $\mu=\mu_0$ and $$\tau = \frac{\alpha_0-\frac{1}{2}}{\beta_0}.$$

The initial four parameters are chosen using prior knowledge about the actual problem one faces. An application of Bayes' Theorem then reveals that the distribution of $\mu,\tau$ given that the observations $\{d_1, \ldots d_k\}$ are drawn from $q_{\mu,1/\tau}$ is again a Normal-Gamma distribution $f(\mu,\tau\mid\mu_1,\lambda_1,\alpha_1,\beta_1)$ such that $$\mu_1 = \frac{\lambda_0\mu_0+k\bar{d}}{\lambda_0+k} \quad \text{(GU)}$$

$$\lambda_1 = \lambda_0+k$$

$$\alpha_1 = \alpha_0+\frac{k}{2}$$

$$\beta_1 = \beta_0+\frac{1}{2}\left[kv+\frac{\lambda_0 k(\bar{d}-\mu_0)^2}{\lambda_0+k}\right]$$

where $$\bar{d} = \frac{1}{k}\sum_{h=1}^{k}d_h \text{ and } v = \frac{1}{k}\sum_{h=1}^{k}(d_h-\bar{d})^2.$$

As described in http://en.wikipedia.org/wiki/Normal-gamma_distribution, based on these updated equations, one can intuitively interpret the parameters as follows. The parameter $\lambda_0$ is interpreted as the number of observations one theoretically ascribes to having been used to arrive at the prior probability distribution. If this number is large compared to n, the number of sample points, then this says that one is sure about the prior and the additional data points $\{d_1, \ldots, d_k\}$ will have little impact in shifting the parameters. Similarly, one could view $2\alpha_0$ as the number of observations one used in order to derive the precision of the prior. In most implementations this number of observations should be equal to $\lambda_0$ and hence one sets $\lambda_0=2\alpha_0$. Putting all this together, in the case one is interested in, the estimate of mean and precision of the normal distribution given the values $\{d_1, \ldots, d_k\}$ (i.e. the posterior distribution) is then either $$\mu_1, \frac{\alpha_1-\frac{1}{2}}{\beta_1}, \text{ or } \mu_1, \frac{\alpha_1}{\beta_1}.$$

The former of these estimates is the mode (i.e. the point of maximum likelihood) whereas the latter estimate is at the expected value of these parameters given the normal gamma distribution described above. Some implementations use both these estimates dependent on the context. The implementation described in the remainder of this document use the latter but, of course, the former can be used instead.

Returning to the setting of a multivariate distribution with diagonal covariance matrix $$p(x_1, \ldots, x_m) = Z\exp\left(-\sum_{j=1}^{m}\frac{(x_j-\mu_j)^2}{2\sigma_j^2}\right),$$

the factorization property $$p(x_1, \ldots, x_m) = \prod_{j=1}^{m}q_j(x_j)$$

described above implies that if one is given k sample points $$D_1=(d_{11},\ldots,d_{1m}),\ldots,D_k=(d_{k1},\ldots,d_{km})$$

then one can use the mathematical fact described above to estimate the mean and variance vector of p component wise, i.e. one uses the above to infer the solution to the problem for $q_1(x_1)$ given values $(d_{11}, \ldots, d_{k1})$, for $q_2(x_2)$ given values $(d_{12}, \ldots, d_{k2})$, ..., for $q_m(x_m)$ given values $(d_{1m}, \ldots, d_{km})$ and then aggregate the inferred new means and variances of these one dimensional solutions into a mean vector and variance vector for p. Given the above description, in each of these inferences, the only parameter needed to determine in each of them is which lambda value is used. In most implementations the same lambda parameter will be used for each of these inferences.

6.2.1. Update Based on Selected Media Unit

Figure 20:
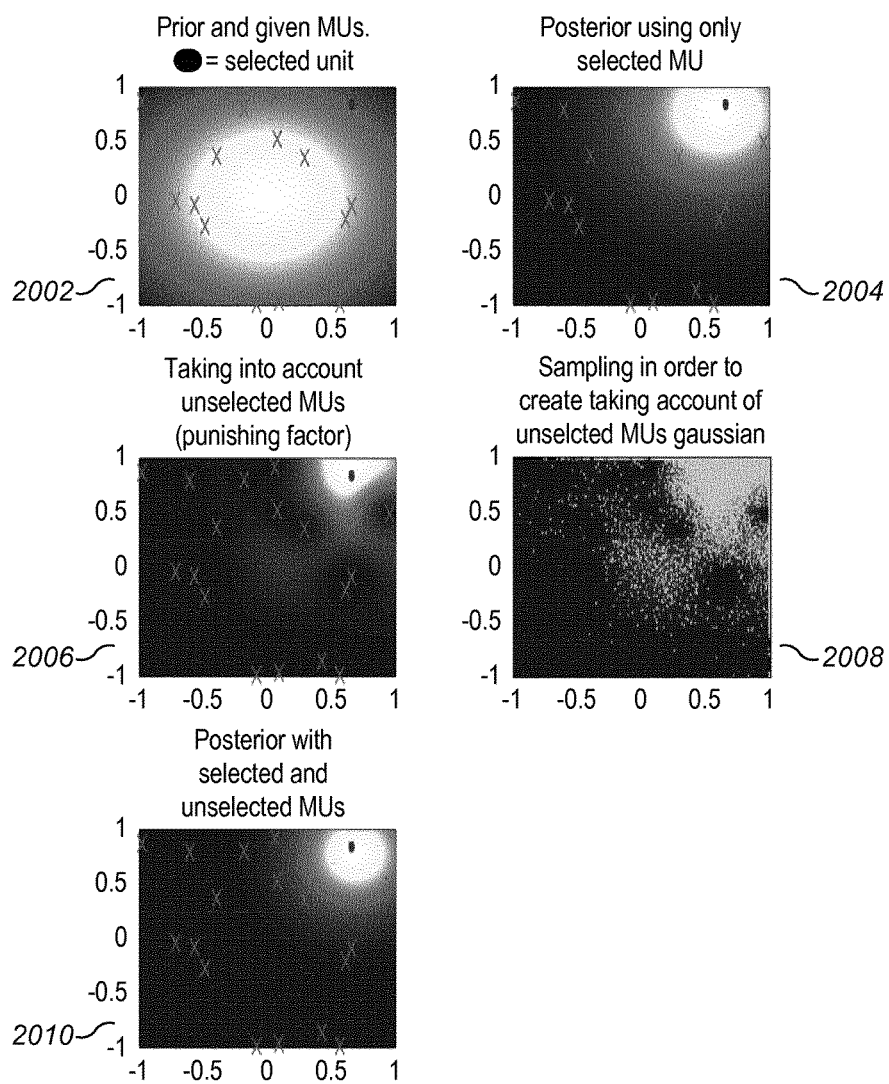
FIG. 20 illustrates a snapshot of probability distributions.
Figure 21:
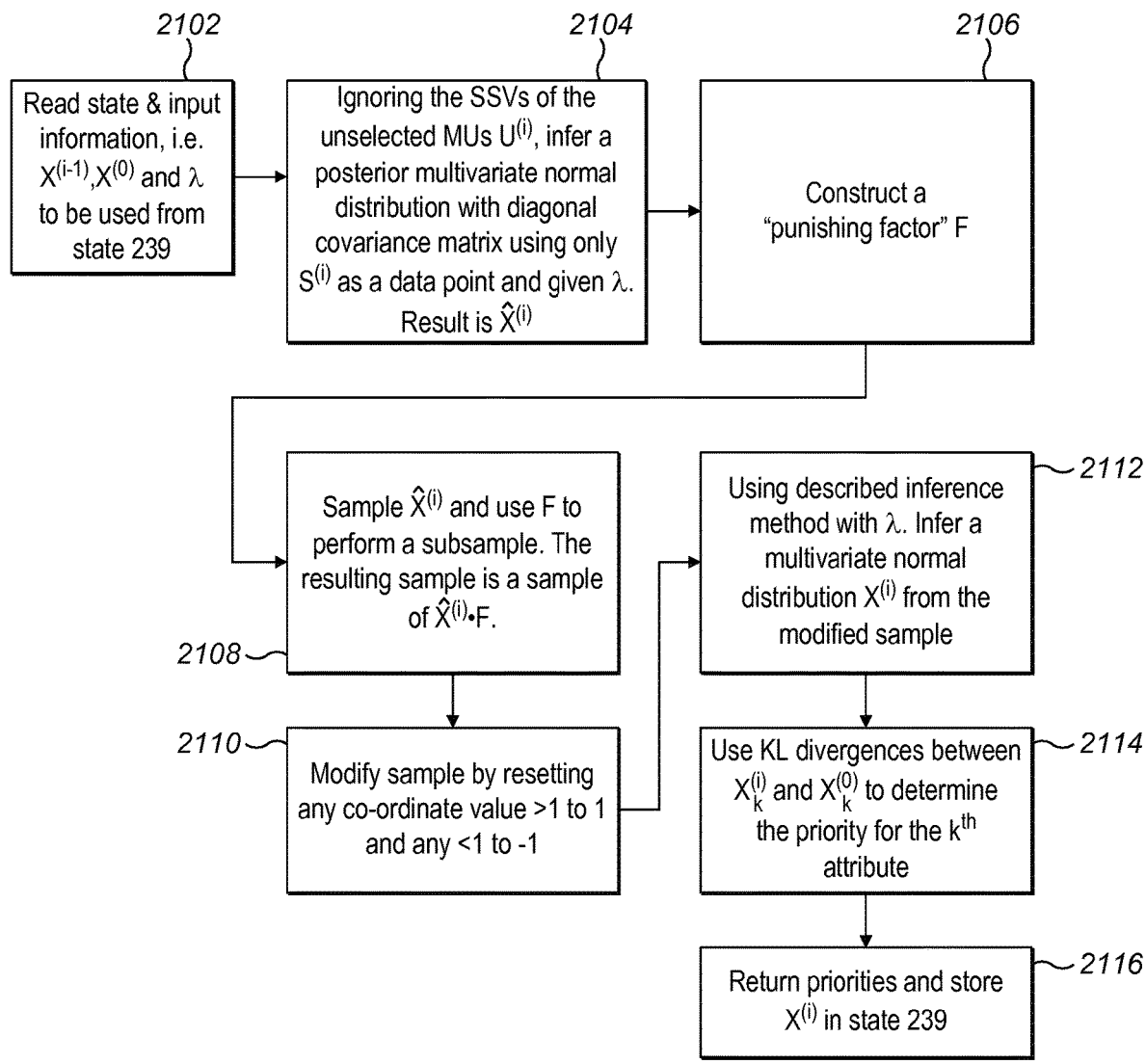
FIG. 21 illustrates a process for updating probability distributions and calculating a corresponding information gain for use in determining priority weights.

With reference to FIG. 21 and FIG. 20, the above notation and facts are used to describe an embodiment of the model component 237 at step i. At step 2102 information stored in State Memory 239 is retrieved. This information contains a parameter $\lambda_i$ which is used for inference as well as the previous step's distribution for $X^{(i-1)}$ as well as the distribution for the original prior $X^{(0)}$. As explained above both these two distributions are described by their mean vector and a variance vector each of which are composed of the mean and variance vectors of the corresponding attribute distributions. Moreover, both the ASV of the selected and unselected MUs are denoted by $$S_1^{(i)}=(S_{11}^{(n)},\ldots,S_{1A}^{(n)}),\ldots,S_Q^{(i)}=(S_{Q1}^{(n)},\ldots,S_{QA}^{(n)})$$

and $$U_1^{(i)}=(U_{11}^{(i)},\ldots,U_{1A}^{(i)}),\ldots,U_M^{(i)}=(U_{M1}^{(i)},\ldots,U_{MA}^{(u)})$$

It is convenient to recall the notation $U^{(i)}=(U_1^{(i)},\ldots,U_M^{(i)})$, $S^{(n)}=(S_1^{(n)},\ldots,S_Q^{(n)})$. $S^{(i)}, U^{(i)}$ are received from the UI component 236. FIG. 20 illustrates an example of this arrangement using one two-dimensional attribute "a". The grey scale map in image 2002 represents the prior multivariate normal distribution on this attribute. The crosses show the ASVs in this attribute of the unselected media units whereas the dot shows the ASV location of the selected media unit at step i.

In step 2104 the inference method described above is applied. A random variable $\widehat{X^{(i)}}$ is inferred in the following way. Although it is assumed here that a selected media unit exists, it is convenient to record for later that if the user input had no selected media unit then $\widehat{X^{(i)}}$ would just be set to be equal to $X^{(i-1)}$. Otherwise, it is first postulated that this random variable is a normally distributed with diagonal covariance matrix and is derived by considering $X^{(i-1)}$ its prior distribution using the ASV of the selected MU(s) $S^{(i)}$ as the only sample point or points. The value of $\lambda$ used in this inference step is $\lambda_i$ received from the State Memory 239 and can be thought of as the amount of data the prior $X^{(i-1)}$ is inferred from. A large value of $\lambda_i$ would imply that the sample point(s) $S^{(i)}$ given will have little impact on the distribution $\widehat{X^{(i)}}$ compared to the prior, i.e. $\widehat{X^{(i)}}$ is little different from $X^{(i-1)}$. Conversely, a small value of $\lambda_i$ means that the one sample point $S^{(i)}$ will influence the inference more strongly and $\widehat{X^{(i)}}$ can be very different to $X^{(i-1)}$.

Given the discussion above, this inference can be for each attribute separately, with the individual results composed to provide the overall result. Concretely, considering the attribute labelled j and suppose the distribution of $X_j^{(i)}$ is given by the mean vector $(\mu_1, \ldots, \mu_k)$ and variance vector $(\sigma_1^2, \ldots, \sigma_k^2)$ (where k is the dimension of the attribute) and that the jth attribute of $S_b^{(i)}$ is described by the vector $S_{bj}^{(i)}=(S_{bj1}^{(i)}, \ldots, S_{bjk}^{(i)})$ for $b=1, \ldots, Q$.

Then, from the above, defining $$\hat{\lambda} = \lambda_i + Q, \hat{\alpha} = \frac{\lambda_i + Q}{2}$$

and for each $s=1, 2, \ldots, k$ $$\hat{\mu}_s = \frac{\lambda_1 \mu_s + Q E_{js}}{\lambda_i + Q} \quad (U1)$$

$$\hat{\beta}_s = \frac{1}{2}\left(\lambda_i \sigma_s^2 + Q V_{js} + \frac{\lambda_i Q (E_{js} - \mu_s)^2}{\lambda_i + Q}\right)$$

where $$E_{js} = \frac{1}{Q}\sum_{b=1}^{Q} S_{bjs}^{(i)} \text{ and } V_{js} = \frac{1}{Q}\sum_{b=1}^{Q} (S_{bjs}^{(i)} - E_{js})^2$$

are the mean and variance of $S_{1,js}^{(i)}, \ldots, S_{Qjs}^{(i)}$, respectively.

In some implementations the system then estimates $$\widehat{\sigma_s^2} = \frac{\hat{\beta}_s}{\hat{\alpha}}$$

for each s. Thus, upon collecting terms, the distribution of $\widehat{X_j^{(i)}}$ is uniquely defined by the mean vector $(\widehat{\mu_1}, \ldots, \widehat{\mu_k})$ and the variance vector $(\widehat{\sigma_1^2}, \ldots, \widehat{\sigma_k^2})$. Concatenating all the mean vectors and all the variance vectors for the attributes $j=1, 2, \ldots, A$ successively then yields a mean vector and variance vector for $\widehat{X^{(i)}}$ as described above. Image 2004 shows the result of step 2104 in the concrete example described above. The grey scale map indicates the inferred distribution of $\widehat{X^{(i)}}$ for the attribute a. As before, the crosses indicate the ASV location in this attribute of the unselected media units whereas the blue dot indicates the ASV location of the selected media unit in this attribute a.

6.2.2. Update Including Unselected Media Units

In step 2106 a punishing function on the ASV representation of the Search Collection 233 underlying all media units is constructed. The purpose of this function is to take into account further information that can be derived from the selection of a MU by the user. So far, step 2104 has solely focused on modifying the users intended search target distribution $X^{(i-1)}$ to $\widehat{X^{(i)}}$ by only performing inference taking into account the selected media units and step 2106 modifies this inferred distribution according to what the user could have selected, but chose not to, i.e. the ASVs of the unselected media units. Intuitively, the punishing function does the following.

First this function is defined on the ASV representation of attribute space such that its value range is between 0 and 1. It should be thought of as a non-normalised probability distribution or belief distribution (i.e. does not integrate to 1) taking low values where the model thinks the user is unlikely to search for media units and high values where the model thinks she/he is. These values are determined based only on what the user did not click on. If this non-normalized probability distribution is denoted by f then let F be the probability distribution obtained by normalizing f (i.e. dividing by the integral of f). To take account of the information in the unselected units, the product of F with the distribution of $\widehat{X^{(i)}}$ is considered (denoted by $\widehat{X^{(i)}}$ F) and is approximated by a multivariate normal distribution of the type described above (with diagonal covariance matrix, i.e. being uniquely described by a mean and variance vector). The random variable described by this distribution is $X^{(i)}$. This is done in steps 2108, 2110 and 2112 (and shown graphically for the example above in images 2006, 2008 and 2010) by sampling the distribution $\widehat{X^{(i)}}$. F as described below and then finding the distribution of the required type (i.e. normal distribution with diagonal covariance matrix) such that it "best" approximates these sample points. There are many known techniques to perform this final step, each taking a slightly different approach as to what makes an approximation "best". Taking the sample mean and sample variance for each coordinate direction in each attribute is one of those techniques (in fact, this method defines "best" as "most likely" because it is the maximum likelihood estimate). In some implementations, the inference method described above is applied again as detailed below.

6.2.2.1. Punishing Functions

Various implementations of the punishing function are now described. Given the nature of the multivariate normal distributions described above, inference with respect to given data points can be done attribute by attribute. As described above, this implies that step 2104 can be done one attribute at a time. For implementations in which the punishing function of step 2106 is also defined on a by attribute basis, both steps can be done for each attribute at a time and the results subsequently combined. Given the short description of steps 2108, 2110 and 2112 above, described in detail below, this also holds for these steps. In implementations of the model component 237 in which the punishing function is defined on a per attribute basis, steps 2104 to 2114 are implemented for each attribute separately and the results then combined. In other implementations, i.e. where the punishing function cannot be defined on a per attribute basis, steps 2104 to 2114 are implemented as described further below.

A punishing function used in some implementations is defined for each attribute separately. For attribute j of dimension k with ASV for the n-th unselected media units $U_{jn}^{(i)} = (U_{jn1}^{(i)}, \ldots, U_{jnk}^{(i)})$, define the punishing function Q:

$$Q: \mathbb{R}^k \to \mathbb{R},$$

$$(x_1, \ldots, x_k) \to \prod_{r=1}^{M} \left(1 - \prod_{s=1}^{k} \exp\left\{-\frac{(x_s - U_{jrs}^{(i)})^2}{2\sigma_{rs}}\right\}\right)^{\frac{1}{2}}$$

where the parameters $\sigma_{rs}$ are chosen as follows and where M represents the number of unselected media units provided. In some implementations, chose $$\sigma_{rs} = \widehat{\sigma_{\cdot\cdot}} M^{-\frac{1}{k}}$$

where $\widehat{\mu_s}$ is the s-th ASV value of the variance vector of the j-th attribute of the r-th unselected media unit.

This definition can be thought of as saying that for each unselected media unit the non-normalized probability distribution of where the user could still be interested in is a constant minus a normal distribution centred at the unselected media unit such that the value of it there is zero. Moreover, the covariance matrix of this subtracted distribution is again diagonal with a variance vector that is that of $\widehat{X^{(i)}}$ scalar multiplied by M to the power of minus one over the dimension of the attribute space.

In some implementations the above definition of $\sigma_{rs}$ is modified to $\sigma_{rs} = \widehat{\sigma_{jrs}} M^{-c}$ for a given constant c. Although one loses the dependence of the attribute dimension k (and thus the volume intuition described above) this can be useful in practice.

In some implementations the following variant of the definition of a punishing function above is used which is again defined on a per attribute basis. With the notation above, Q is defined as:

$$Q(x_1, \ldots, x_k) = \prod_{r=1}^{M} \left\{ \left(1 - \prod_{s=1}^{k} \exp\left[-\frac{(x_s - U_{jrs}^{(i)})^2}{2\sigma_{rs}}\right]\right)^{1 - \prod_{s=1}^{k} \exp\left[-\frac{(x_s - U_{jrs}^{(i)})^2}{2\sigma_{rs}}\right]} \right\}$$

where the sigmas are defined as above.

The difference between this formula and the last one is that the expression in round brackets is repeated as an exponent at the end. The effect of this is to make the punished areas less pronounced or more focused on the unselected MU. This can be seen in FIG. 22, illustrating an arrangement of ASVs of unselected media units in a two dimensional attribute. Image 2202 shows the second punishing factor whereas image 2204 shows the first punishing factor described above. In both these images the ASVs of the unselected media units in this attribute are represented by crosses. As with the first punishing function the second one is defined on a per attribute basis.

An example for a punishing function that cannot be defined on a per attribute basis is the following. Suppose that the number of attributes is A and that $s_1, \ldots, S_A$ denote the dimensions of these attributes. Suppose further that a general point x in the ASV is given by the coordinates $(x_{11}, \ldots, x_{1s_1}, \ldots, x_{A1}, \ldots, x_{As_A})$, then, with the notation above, the punishing function is defined as follows $$Q(x) = \prod_{r=1}^{M} \left\{ 1 - \prod_{j=1}^{A} \prod_{t=1}^{s_j} \exp\left(-\frac{(x_{jt} - U_{jrt}^{(i)})^2}{2\sigma_{rt}}\right) \right\}^{\frac{1}{2}}$$

A second example of such a punishing function is now described. It is first described for the special case where there is precisely one selected media unit by the user (i.e. Q=1). Its intuition comes from shadows traced out by the sun in planetary motions in the solar system transferred to ASV representations of attribute space. Each unselected media unit is associated with a certain ellipsoid shape and then points in ASV that are obscured from the last selected ASV by these shapes are deemed to be punished by the function with a value zero. Any other point is not punished, i.e. the punishing function is 1. In this way, assuming that the attribute dimensions are ordered and that the users perception acknowledges this order, the excluded regions can be interpreted as areas the system would not expect the user to want to continue searching given the choice made in the last selection.

Concretely, with the notation above, given a point $x=(x_{11}, \ldots, x_{As_A})$ in ASV then for each unselected media unit $U_k^{(i)}$ ($k=1, \ldots, M$)) the quantity $$q_k = \frac{\langle U_k^{(i)} - S_1^{(i)}, x - S_1^{(i)} \rangle}{\langle x - S_1^{(i)}, x - S_1^{(i)} \rangle}$$

is defined, where $\langle, \rangle$ denotes the Euclidean inner product on the vector space holding theoretic ASV coordinates. By definition $q_k$ is such that the point $V_k = S^{(i)} + q(x - S_1^{(i)}) - U_k^{(i)}$ is perpendicular to $x - S_1^{(i)}$. Thus if $q_k$ is greater than 1 and smaller than 0 then the closest point on the ray through $S_1^{(i)}$ and x does not lie between x and $S_1^{(i)}$ on that ray. Thus define the value $Q_k(x)=0$. Moreover, if $q_k$ is larger than 0 and less than or equal to 1, then $Q_k(x)$ is 1 if and only if the distance from $V_k$ to $U_k^{(i)}$ is less than or equal to a given quantity $\in_k$ for each k.

In some implementations this quantity is chosen as the average of the entries $\sigma_{kt}$ given above multiplied by a small constant (usually 0.1). The value of the punishing function returned is then the product of all the $Q_k$ s for $k=1, \ldots, M$. In some implementations the value of $Q_k$ as defined above is not set to zero as defined above but to a constant less than 1 (say ½). If the number of selected media units provided is larger than one, then the system calculates the punishing functions for each selected media unit in turn and the product of all these is an example of a punishing function for this more general case.

6.2.2.2. Sampling the Punished Distribution

In step 2108 the distribution $\widehat{X^{(i)}}.F$ is sampled, i.e. random points are chosen in the ASV of the Search Collection 233 which are distributed according to this distribution. FIG. 20 illustrates this in the example described above. Image 2006 shows the distribution $\widehat{X^{(i)}}.F$ for this two-dimensional attribute which is labelled j and image 2008 show sampled points obtained in step 2108. Step 2108 is performed in two sub-steps. First sample points are obtained by sampling from $\widehat{X_j^{(i)}}$. Given the multivariate normal, form of this distribution with diagonal covariance matrix, as described above) the sampling can be done for each coordinate axes separately. Any suitable algorithm, for example the Box-Mueller algorithm is used to generate one-dimensional samples of this normal distribution and their aggregation yields a set of sample points of the distribution of $\widehat{X_j^{(i)}}$. The number of samples required varies with the specific implementation but usually of the order of 30,000 samples are used. For each such sample point a second sub-step of step 2108 is then performed by evaluating the value of this sample point on the given punishing function. A uniform random variable with value between 0 and 1 is drawn. If this variable is drawn with a value greater than the value of the punishing function at the sample point, the sample point is accepted as an output sample point of step 2108, otherwise it is rejected.

In some implementations, the punishing function is scaled so that its values are not too small. Specifically, the punishing function is scaled such that the sample point with the largest value of the punishing function should have a high (for example 98%) probability step of being accepted. For example, the punishing function is evaluated for all the sample points from the first sub-step. The entire set of evaluated function values is then scaled so that that the largest value is p (0.98, for example). Subsequently, the random selection procedure is carried out with the scaled function values, in the manner described above.

In step 2110 the resulting sample points that lie outside the value range of the attribute are modified so that they just lie on the border of a predetermined range of coordinate values. For example, in implementations on which each ASV coordinate in each attribute has a value between -1 and 1, any coordinate of a sample point in any attribute larger than 1 is replaced by 1. Similarly, should any such value be smaller than 1, then that value is replaced by -1. Other coordinate limit values are of course equally possible for each attribute.

In step 2112 the random variable $\widehat{X^{(i)}}$ is inferred as an approximation to the sample points of $\widehat{X^{(i)}}$ constructed in step 2110 given the constraint that its distribution be normal with diagonal covariance matrix. There are many known techniques that could be used to perform this step (not least of which using simple sample mean and sample variance estimators for each dimension in each attribute). In some implementations, the inference method described in formula (GU) in detail above is used with the parameter $\lambda$ being taken to be 1. Image 2010 shows the result for the example above where the resulting distribution is represented by a grey-scale map. The ASV of the selected media unit in this two-dimensional attribute is represented by a dot and those of the unselected units by a crosses. Concretely, if the sample points obtained from step 2110 in the $j^{th}$ attribute are given by $(d_{j1}, \ldots, d_{jT})$ (i.e. T samples) and if the ASV values of the m-th point received are given by $\widehat{X^{(i)}}$ (so the j-th attribute is of dimension k), then the distribution of $X^{(i)}$ is uniquely defined as follows. The parameter $\lambda$ in (GU) is defined to be 1, $$\overline{\alpha} = \frac{T+1}{2}$$

and for $s=1, \ldots, k$ $$\overline{\mu_s} = \frac{\widehat{\mu_s} + T\overline{d}}{1+T} \qquad (U2)$$

$$\overline{\beta_s} = \frac{1}{2}\left(\sigma_s^2 + Tv + \frac{T(\overline{d} - \widehat{\mu_s})^2}{1+T}\right)$$

where $$\bar{d} = \frac{1}{k}\sum_{h=1}^{T} d_{jhs} \text{ and } v = \frac{1}{k}\sum_{h=1}^{T} (d_{jhs} - \bar{d})^2.$$

The distribution $X^{(i)}$ is then uniquely defined by the mean vector $(\overline{\mu_1}, \ldots, \overline{\mu_k})$ and variance vector $$\left(\frac{\overline{\beta_1}}{\alpha}, \ldots, \frac{\overline{\beta_k}}{\alpha}\right).$$

6.2.3. Multivariate Concatenating

The above description has been made in terms a single attribute. As described above, the dimension of the attributes are treated independently and step 2112 therefore forms the mean and variance vectors for the distribution over all attributes by running the index over all dimensions of the attributes in question, in effect concatenating the mean and variance vectors for each attribute. The is a mean and variance vector that uniquely describes the distribution of $\lambda^{(i)}$. The model component 237 then writes these vectors into the State Memory 239 for them to be read at step i+1.

6.2.4. Information Theoretic Priority Weights

In step 2114 the Priority Weights, one for each attribute, are determined. These values are the output of the model component 237 and are provided to the back-end component 238. As described above, they can intuitively be interpreted as the importance the user is inferred to place in a given attribute. In some implementations of step 2114, a measure from information theory is used to make the intuition concrete. In fact this implementation can be thought of as measuring how much information the model has gained from the process that has led to the distribution $X^{(i)}$ of since inception, i.e. since starting with the original prior distribution of $X^{(0)}$. This implementation thus equates information gained since inception to current belief about the user to users inferred importance.

Concretely, in some implementations, the Priority Weight for attribute j is defined to be $D_{KL}(X_j^{(i)}|X_j^{(0)})$, i.e. the Kullback-Leibler divergence between the distribution of $X_j^{(i)}$ and $X_j^{(0)}$. Explicitly, if the distribution $X_j^{(i)}$ has mean vector $(\mu_1^{(i)}, \ldots, \mu_k^{(i)})$ and variance vector $([\sigma_1^{(i)}]^2, \ldots, [\sigma_k^{(i)}]^2)$, if $X^{(0)}$ has mean vector $(\mu_1^{(0)}, \ldots, \mu_k^{(0)})$ and variance vector $([\sigma_1^{(0)}]^2, \ldots, [\sigma_k^{(0)}]^2)$ then this Priority Weight is equal to $$w_{ji} = \frac{1}{2}\left[\log\left(\frac{\prod_{s=1}^{k}[\sigma_s^{(0)}]^2}{\prod_{s=1}^{k}[\sigma_s^{(i)}]^2}\right) + \sum_{s=1}^{k}\frac{[\sigma_s^{(i)}]^2}{[\sigma_s^{(0)}]^2} + \sum_{s=1}^{k}\frac{(\mu_s^{(0)} - \mu_s^{(i)})^2}{[\sigma_s^{(0)}]^2} - k\right] \quad (U3)$$

See [http://en.wikipedia.org/wiki/Multivariate normal distribution].

In some implementations, other information measures are used. In some implementations a variant of the Kullback-Leibler divergence that ignores the mean shift is used. With the same notation as above, the Priority Weight is given by $$w_{ji} = \frac{1}{2}\left[\log\left(\frac{\prod_{s=1}^{k}[\sigma_s^{(0)}]^2}{\prod_{s=1}^{k}[\sigma_s^{(i)}]^2}\right) + \sum_{s=1}^{k}\frac{[\sigma_s^{(i)}]^2}{[\sigma_s^{(0)}]^2} - k\right]$$

In some implementations one of these information measures is passed through a sigmoid function to compute Priority Weights. Not unlike the geometric implementation described above this results in the Priority Weights changing largely over a small domain interval. The Priority Weights are thus given by $$\frac{1}{1 + \exp(-t + c)}$$

Where t is one of the two measures above and c is a constant, for example c=3 in some implementations.

In other implementations of step 2114 the Kullback-Leibler information measure as described above is used in order to generate the Priority Weights, but the Kullback-Leibler divergence not between $X^{(i)}$ and $X^{(0)}$ but between successive steps $X^{(i)}$ and $X^{(i-1)}$ is used.

Finally, at step 2116, the Priority Weights calculated in step 2114 are provided to the back-end component 238 as output and the distribution of the random variable $X^{(i)}$ calculated in step 2112 above is stored in the State Memory 239. The back end component 260 provides media units to the UI component 236, for example as described above with reference to FIG. 5*a* (see section 5).

6.3. Media Units Represented by Probability Distributions

Further implementations of the media unit search and display 204 are now described again with reference to both FIG. 5*a*. This part of the description also relevant to implementations described below with reference to FIG. 5*b* as described in section 7.3. below. A difference between these implementations and the probabilistic ones described above is that the Search Collection 233 represents media units by feature sets defining distributions and not sets of attribute values. In fact, the process outlined in FIG. 3 and the description of step 311 above means that, using one of the algorithms discussed above (such as ELO or Glicko), a (multivariate) normal distribution of the kind described in detail above and representing the inferred score is directly obtained as output of the ranking algorithms. The covariance matrix is diagonal and therefore the distribution is uniquely defined by both a mean and variance vector, with each entry representing the inferred mean and variance of the ranking of a respective attribute. The implementation discussed now replace the ASV points of the representation discussed initially with corresponding distributions, in some specific implementations defined by a scoring mean and variance for each attribute obtained as a result of step 311.

With reference to FIG. 5*a* (and FIG. 5*b*), the UI component 236 needs no modification in this framework other than that it receives as part of the meta data both the mean and variance vector instead of only attribute vector of points and outputs that same data to the model component 237.

In order to work with this ASV representation, the process of FIG. 21 is adapted as follows. Step 2102 remains unchanged. In step 2104, instead of $S^{(i)}$ being a vector of points representing the ASV of the selected media units in the Search Collection 233, these quantities are now given by two vectors the mean vector and variance vector each, respectively. It is noted that if the user input does not contain a selected media unit this vector is empty.

As described in detail above, if there is at least one selected media unit as a user input, the inference update in step 2104 is performed on each attribute distribution $X_j^{(i-1)}$. The change from a point to a distribution for each MU is handled by taking for each b=1, . . . , Q a sample of size T of the distribution representing $S_{bj}^{(i)}$ via for example T=30,000 points. Given these QT sample points $d_1=(d_{11}, \ldots, d_{1k}), \ldots, d_{QT}=(d_{QT,1}, \ldots, d_{QT,k})$ in the k dimensional vector space from the Q selected media units, the Bayesian method of inference using a normal gamma prior distribution described in detail above is used again to find the mean $\widehat{\mu}_s$ and variance $\widehat{\sigma}_s^2$ for each s=1, 2, . . . , k of $\widehat{X^{(i)}}_j$ using the numerical values $(d_{1s}, \ldots, d_{QT,s})$ as data points. Concretely, one replaces the equation (U1) above is replaced by the following: let $\hat{\alpha}=\lambda_i+QT$ and, for s=1, . . . , k $$\overline{\mu}_s = \frac{\lambda u_s + QT\overline{d}}{\lambda + QT} \tag{U1-2}$$

$$\overline{\beta}_s = \frac{1}{2}\left(\lambda\sigma_s^2 + QTv + \frac{\lambda QT(\overline{d}-u_s)^2}{\lambda + QT}\right)$$

where $$\overline{d} = (QT)^{-1}\sum_{i=1}^{QT} d_{is} \text{ and } v = (QT)^{-1}\sum_{i=1}^{QT} (d_{is}-\overline{d})^2$$

are the data sample mean and data sample variance respectively. In some implementations $\lambda_i$ above is replaced by $\lambda_i$. QT so as to preserve lambda's intuitive role of providing a measure as to how heavily the prior should be weight when updating it to the posterior. Again, the estimate of the mean and variance of the s-th coordinate of the distribution of $\widehat{X^{(i)}}_j$ used in most implementations is $\widehat{\mu}_s$ and $$\frac{\beta_s}{\hat{\alpha}},$$

respectively, for all s.

Concatenating the means and variances thus defined for these s the mean and variance vector $(\widehat{\mu}_1, \ldots, \widehat{\mu}_k)$ and $(\widehat{\sigma}_1^2, \ldots, \widehat{\sigma}_k^2)$ describing the distribution of $\widehat{X^{(i)}}_j$ are obtained by step 2104. Concatenating these vectors again for all j results in the mean and variance vectors of $\widehat{X^{(i)}}$ as described above.

In the case where there is no selected media unit, as described above, $\widehat{X^{(i)}}_j$ is defined to be equal to $X_j^{(i-1)}$ and so $\widehat{\mu}_s = \mu_s$ and $\widehat{\sigma}_s^2 = \sigma_s^2$ for all s=1, . . . , k.

The punishing functions then used in step 2106 only change in two minor details: Firstly, punishing functions that require at least one selected media unit as user input are only valid for the same amount of selected media units in the current case. Secondly, the expression of all formulae are the same but the quantities $\sigma_{rs}^2$ are now the variances coming directly from the media unit in question rather than derived entities.

The remainder of the steps in FIG. 21 remain the same. In particular, in step 2108 the product of the distribution of $\widehat{X^{(i)}}$ multiplied with the punishing function as defined above is sampled in the same manner as described above with reference to step 2110 and sample output values are modified as described above. The inference of the distribution of $X^{(i)}$ using these sample points using the Bayesian gamma-normal prior method as in equation (U2) with parameter $\lambda=1$ is unchanged relative the description above, as is the formula (U3) in step 2114 which uses one of the information measures described in detail above in the same way. The mean and variance vector of the inferred distribution $X^{(i)}$ are then written to State Memory 239 and the Priority Weights calculated in step 2114 are handed to the back-end component 238.

This completes the description of the implementation with reference to FIG. 5a, i.e. the probabilistic framework in which the model component 237 only outputs Priority Weights.

Figure 5B:
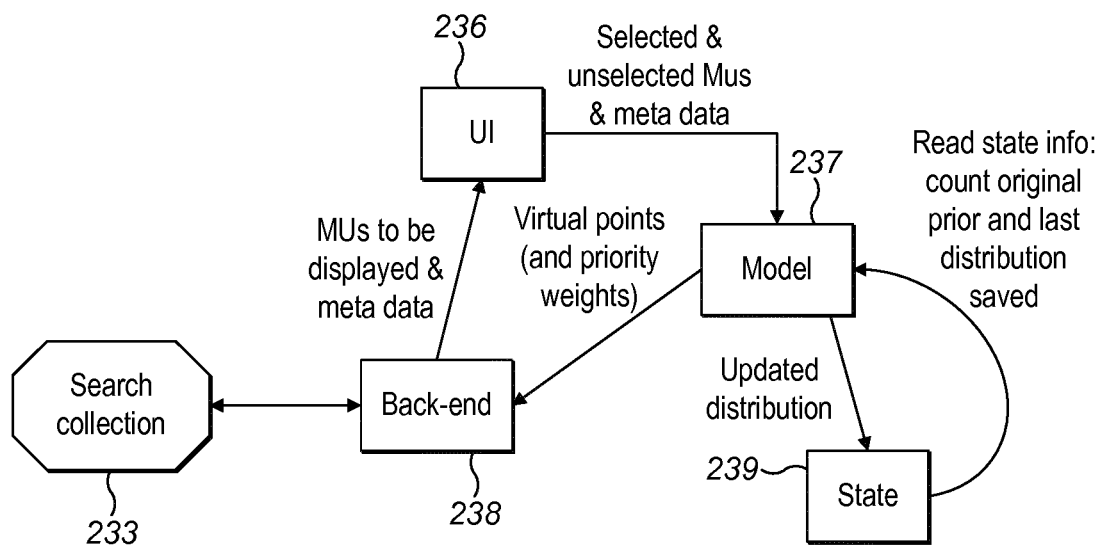
FIG. 5B illustrates a system overview in terms of logical organisation of a media unit search and display process based on sampling a probability distribution.

It is noted that the description above also describes an implementation of the model component 237 with reference to FIG. 5b by adding to the output Priority Weights a subsample of sample points generated in step 2110.

6.4. Axes Based Media Unit Display

Having described several implementations of the media unit search and display 204 above with reference to FIG. 5a, a different search methodology is described that can be embodied by all the above implementations with few modifications.

This methodology can be implemented by all embodiments described above satisfying the following conditions: The user input comprises only one selected media unit and at least one unselected media unit, the model component 237 output contains Priority Weights for attributes and whose Search Collection 233 contains at least two attributes. The only component that will act differently to the implementations described above is the back-end component 238 and, potentially, the UI component.

Given the Priority Weights and other values derived from the static Search Collection 233 data for a given attribute, at a given step in the media unit search and display 204, the system can rank all the attributes and select the top two ranked. In some implementations this step is the first step in the search algorithm, but in other implementations the user can be given the choice to activate this feature by being provided with an option to do so by the UI component. In some implementations, which is referred to here as the most diverse media unit representation, this ranking is done by using the Priority Weights of any given attribute and a measure of diversity defined by the variance of the coordinate values of the media units in ASV for the given attribute. The product of the Priority Weight and that variance are then taken. All attributes are then ranked in decreasing order of this quantity.

Given that the retrieval process in all Search Collections 233 are on a per attribute basis, the back end component 238 now retrieves media units as before but only considering these two selected attributes. These MUs are then processed as described above and handed to the UI component 236. The UI component can then represent these media units as is, or, it can present the two chosen axes and the media units alongside them.

In some implementations, the UI component obtains further simple pieces of information from the back-end component 238: which MU icon 206 belong to which axis and the order along each axis in which the media unit icon 206 should be arranged. In other implementations, if the attributes selected are of dimension one, relative coordinate values are supplied by the back-end component 238 so that the UI component 236 represents these media unit icons 206 at a position which corresponds to a projection onto these attributes.

In addition to the alternative media unit search and display 204 described above (such as the most diverse media unit process), in many implementations of this search methodology the UI component 236 and the back-end component 238 are modified further to provide the infinite scroll feature along one axis. This is established as follows. Should the user of the UI component 236, before providing a selection input, scroll the screen through a scroll action (such as a sliding movement on a tablet computer, pressing the arrow keys on a keyboard, using a scroll bar, etc.) in the direction of one of these attribute axes, in some implementations, the UI component will contact the back-end component 238 and request further media units. In some implementations the UI component, which has preserved both the depth level since the last model component 237 call as well as the Priority Weights, executes a media unit retrieval request from the Search Collection 233, as it would do as described above for all the implementations with reference to FIG. 5a, using as input one of the furthest media units with respect of the attributes the user scrolls along that was displayed. The returned units will again be filtered for the two attributes previously selected and the result will be handed to the UI component 236. These newly received media units can now be used to fill the scrolling space the user requested. This process will continue until the user makes a selection.

7. Sampling-Based Probabilistic Implementation

With reference to FIG. 5b, a different group of implementations of the media unit search and display 204 is described. These implementations are able to handle more general user input: it can consist of any number of selected media units including the empty selection (i.e. none selected) and places no restrictions on the number of unselected media units. Also, no assumptions are placed on the number of media units the UI component 236 hands to the model component 237 in successive steps. Considering the punished distribution in Image 2006 which is then sampled in step 2108 as described above, the question arises why not to take this non-normalized complicated sampled probability distribution as a way to enable the back-end component 238 to find new media units for the UI component 236. More precisely, this implementation returns, along with the Priority Weights, a set of ASVs sampled in step 2108 and 2110. The back-end component 238 then converts these ASVs referred to here as virtual points, into actual media units in the MUM that can be shown to the user. The UI component is as described above, apart from the fact that it does not provide its output (the user input of the selected and unselected media units and their meta data) to the back-end component 238 but solely to the model component 237. Thus, in these implementations, the selection of MU to present based on a distance from all selected MUs, including the neighbourhood lists encoding distance relationships, is replaced by, in effect, sampling MUs to present based on the model of a user's intention regarding the search target.

7.1. Model Component 237

The changes in the implementation of the model component 237 relative to that described with reference to FIG. 21 above are now described. In a first implementation, the feature sets describing the media units are taken to be sets of attribute values rather than probability distributions. The input values are the same and steps 2102 to 2114 described in detail above proceed without change. In addition, step 2114 in the implementations described here select a predetermined number of sample points that were the output of step 2110 (in some implementations this number is 100) and supplies them as output to the back-end component in addition to the Priority Weights. To ensure that this additional step is possible, a sufficient number of sample points must pass step 2108 (and hence also step 2110). The sampling technique described above nearly guarantees this for most scenarios and reasonably small number of virtual points required compared to the samples taken in the first step in step 2108 as described above. Nevertheless, to make sure in some implementations, the first step in step 2108 is repeated until the output of step 2110 provides a sufficient number of virtual points (i.e. equal to or greater than the above number).

7.2. Back-End Component 238

Figure 23:
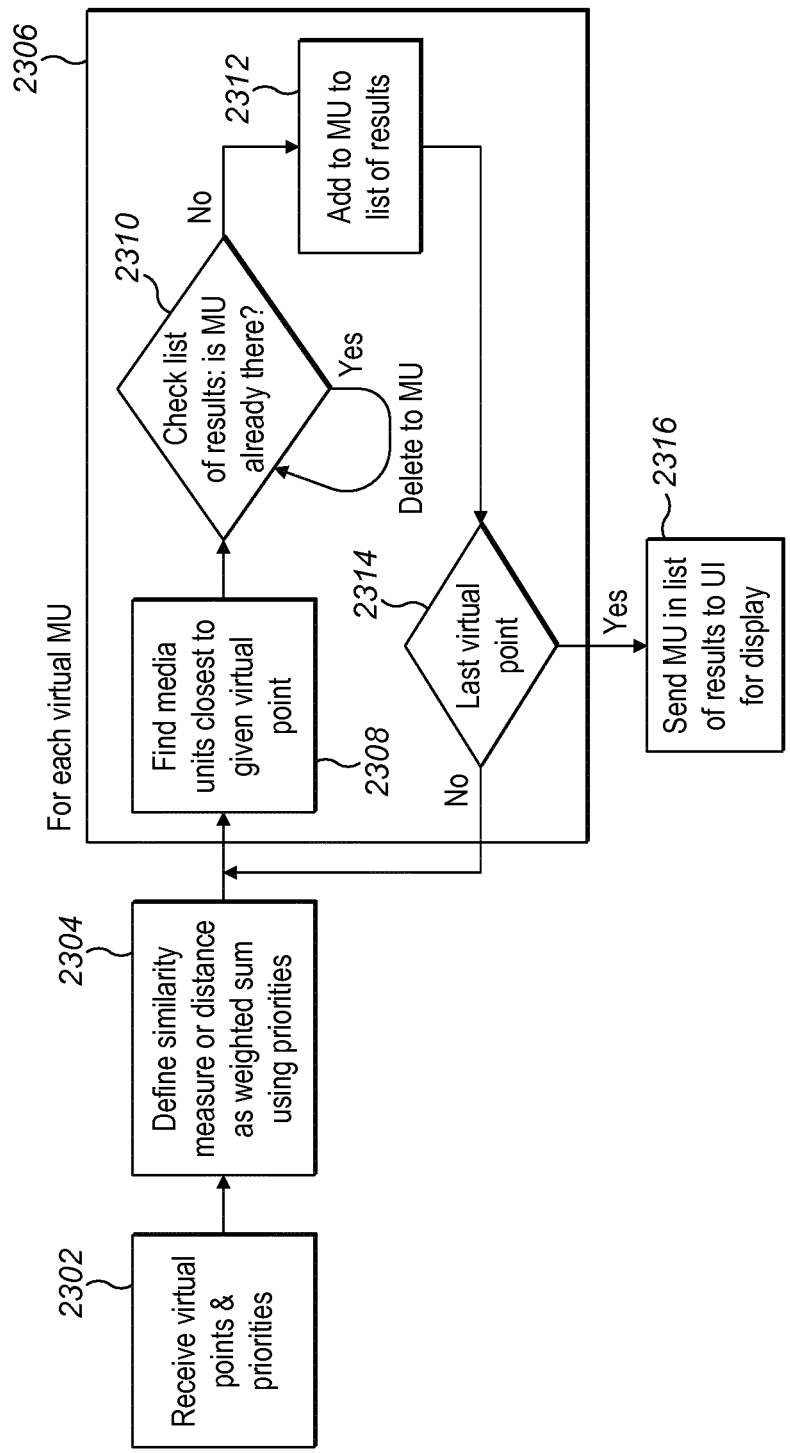
FIG. 23 illustrates a process for resolving sampled (virtual) attribute points into respective media units.

In addition to the above changes to the processes associated with the model component 237, the back-end component 238 is modified as follows. The model component 237 provides the back-end component 238 with both Priority Weights for each attribute and the virtual points. The back-end component 238 uses these to find MUs to send to the UI component 236. With reference to FIG. 23, at step 2302, the back-end component 238 receives the virtual points and Priority Weights. At step 2304, using the Priority Weights, a new distance measure (i.e. measure of similarity) is defined as a sum of the distances in each attribute ASV weighted by the corresponding Priority Weights for each pair of virtual points and (possibly nearby) MUs as explained below. Concretely, if x, y denote two virtual points, if $d_j(x, y)$ denotes the distance of the components of x and y in attribute space j with respect to a distance measure on that attribute and if $w_1, \ldots, w_A$ denote the Priority Weights for attribute spaces $1, \ldots, A$, respectively, then the weighted distance measure is defined by $$\sum_{j=1}^{A} w_j d_j(x, y).$$

Process 2306 then finds the closest media unit for each virtual point with respect to the weighted distance measure in the ASV representation of the Search Collection 233.

7.2.2. Virtual Point Resolution Ranked List

In detail, in a first implementation, the process 2306 does the Following for Each Virtual Point. All ASVs of media units in the given Search Collection 233 are held in random access memory and at step 2308, the MU having a ASV closest to the given virtual point is found. For example for a given virtual point, the distance of it to each of these ASVs is determined, a ranked list is produced and the closest picked from the list. Step 2310 checks if the closest MU has previously been added to a list of results. If so, the MU is discarded and the next closest is checked (e.g. the next in the ranked list). If the checked MU is not yet in the results list, it is added at step 2312. Step 2314 checks if the given virtual point was the last one received at step 2302 and, if so, the MU in the results list or a subset of them are sent to the UI component 236 for display at step 2316. The MUs to be sent are selected for sending to the UI component 236 as described above for other implementations. Otherwise, the process loops back to step 2308 to find the closest MU for the next virtual point.

7.2.3. Virtual Point Resolution Relational Database

Figure 25:
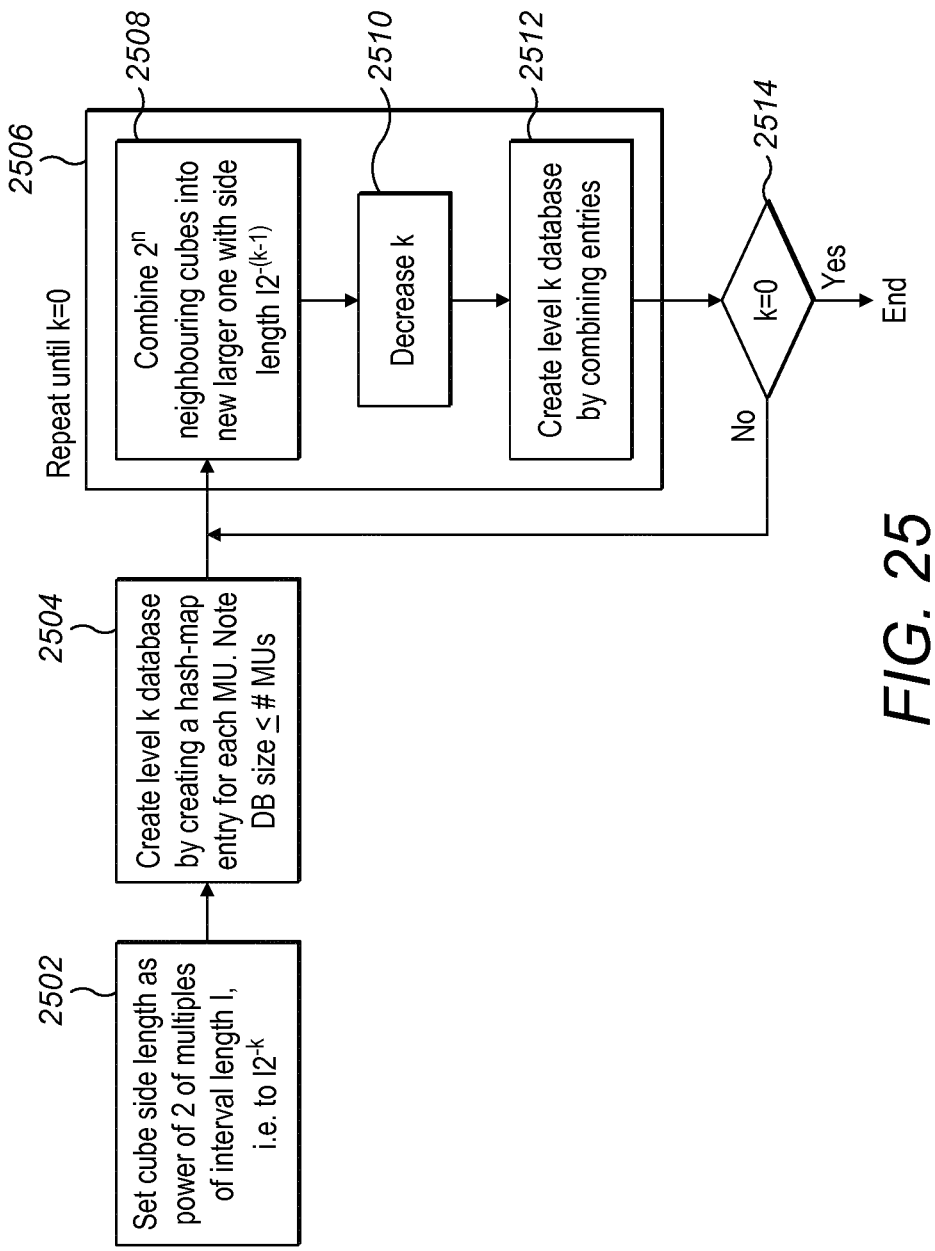
FIG. 25 illustrates a process for generating the data structure FIG. 24.
Figure 26:
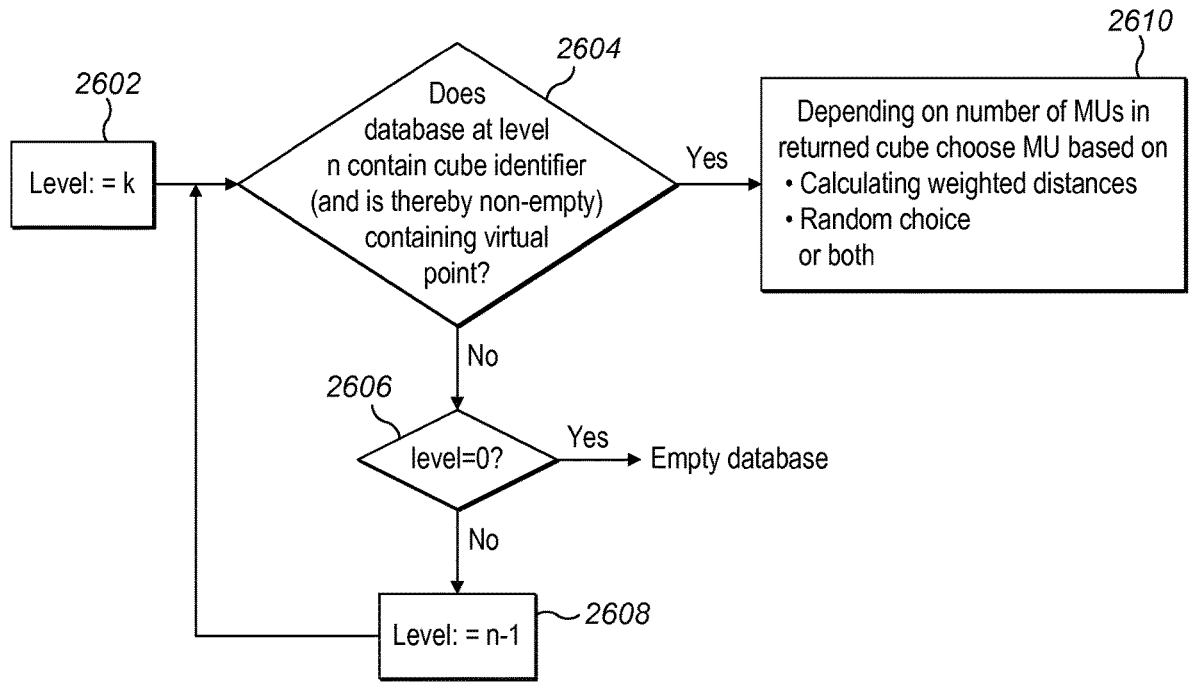
FIG. 26 illustrates a process for using the data structure of FIG. 24 to find media units.

With reference to FIGS. 24 to 26, different implementations of the back-end component 238 related to FIG. 5b for converting virtual points to media units are now described. While the ranking implementation described above with reference to FIG. 23 will find the media unit closest to a virtual point in question, it is computationally resource intensive for large data sets. To address this issue, the following implementations in effect discretises the Search Collection 233 into finitely many volumes (intervals for one dimensional attributes, areas for two-dimensional attributes, volumes for three dimensional attributes, hyper volumes for larger dimensional attributes, . . . ). A data structure is defined with a number of levels corresponding to levels of granularity of discretisation, as will now be described. While these implementations require less computational resources, they return media units that are near to a given virtual point but cannot be guaranteed to be the closest to that point.

With reference to FIG. 24, these implementations are based on a relational database structure comprising a relational database for each level of granularity (k) with keys identifying the volume (interval, area, volume, hyper volume, . . . ) referred to here as a cube for ease of presentation, as well as the location of the cube within the Search Collection 233. Thus, the keys of these relational databases are cube identifiers and the values are the media units that each cube contains. Instead of using separate relational databases, each cube could be referenced by a key comprising an identifier of the level the cube is in and the cube ID (or separate corresponding keys). The cube at level 0 comprises the entire Search Collection 233, that is all media units. At level 1, there are $2^n$ cubes, where n is number of dimensions of the attribute in question. At level 2, there are $4^n$ cubes, and so on such that in each consecutive level each cube is split into smaller and smaller cubes. Thus, for level k there are $n_k = (2^k)^n$ cubes. At each level, the cubes are subdivided into equal sized cubes, so that the side length of each cube is $2^{-k}$ times the range of coordinate values L, for example L=2 in implementations where the coordinate values are between −1 and 1.

A process for building the database structure described above is now described with reference to FIG. 25. At step 2502 the cube side length for level k is set to $L(2^{-k})$. At step 2504 the level k database is created by creating a hash map entry for each media unit, that is associating each media unit with the cube identifier of the cube in which it is located. Step 2506 is then iterated to create successively coarser levels of decreasing k. At step 2508, $2^n$ neighbouring cubes are combined into a new larger cube with side lengths $L(2^{-(k-1)})$ to provide level k−1. K is decreased by one at step 2510 to index the next level and the database for level k is created by associating the entries (media units) associated with the constituent cubes of level k+1 that were combined at step 2508 with the respective new larger cube at level k, at step 2512. Finally, step 2514 checks if the k=0 level has been reached and terminates the process if so. If not, the process loops back to step 2508. In some implementations, to save memory space, cube IDs against which no media unit is stored are removed from each level, for example removed from level k prior to the first merging operation.

7.2.4. Virtual Point Retrieval Relational Database

With reference to FIG. 26, a method for retrieving a media unit for a given virtual point from a Search Collection 233 arranged as in FIG. 24, is described. A retrieval process starts at step 2602 in which a level to be processed is set to level k. At step 2604 the database at this level is accessed to determine whether it contains a cube identifier for a cube containing the virtual point. In implementations where empty cubes are not removed, this check is changed to look for a cube identifier for a non-empty cube containing the virtual point. In some implementation, this is done by rounding the actual coordinate values of the virtual point to the nearest $2^{-k}$ multiple of the coordinate value range L to work out a corresponding cube location.

If no matching (non-empty) cube is found, step 2604 tests whether k=0 (a single cube) has been reached and if so returns an error message indicating that the database is empty. Otherwise, the k is decremented by one at step 2608 and the process loops back to step 2604.

If, on the other hand, a (non-empty) cube containing the virtual point is found, some or all of the media units in that cube are returned for further processing to determine a number of media units to be sent to the UI component 236 for presentation to the user.

Depending on the number of media units in the identified cube, alternative processes for selecting the media unit to be returned for the virtual point in question are employed at step 2610. In the event that number of media units of the cube in question is below a threshold level determined by the computational resources to be dedicated to this step, the media units are ranked based on their distance (for example using the weighted sum distance measure discussed above) from the virtual point and the media unit closest to the virtual point (or another media unit close to the virtual point) is returned. If the number of media units in the cube is above this threshold number, the media units are subsampled, for example randomly, to obtain a smaller number of media units, for example below the above number, and the ranking and selection process is then applied in the same way. In other implementations, a media unit to be returned is picked at random from the media units within the cube identified at step 2604. In any of these cases, the identified media unit from step 2610 is then used as the output of step 2308 discussed above in relation to FIG. 23. In yet further implementations, an unranked list of all or some of the media units in the identified cube are used in step 2308 instead of the one closest media unit and the remainder of step 2306 is adapted accordingly.

7.3. Media Units Represented by Probability Distributions

For implementations of the media units search and display 204 described above with reference to FIG. 5b, it can be noted that the implementation described in section 6.3. can be applied to FIG. 5b as well and fully describes the adaptation of the UI component 236 and model component 237 to the case of media units being represented by probability distributions over ASV rather than just points in ASV. The back-end component 238 needs to change accordingly and is implemented by replacing the Euclidean measure of similarity with respect to the virtual points received from the model component 237 by a measure based on the virtual points and the probability distribution for each media unit in order to select media units to present to the UI component 236.

Figure 27:
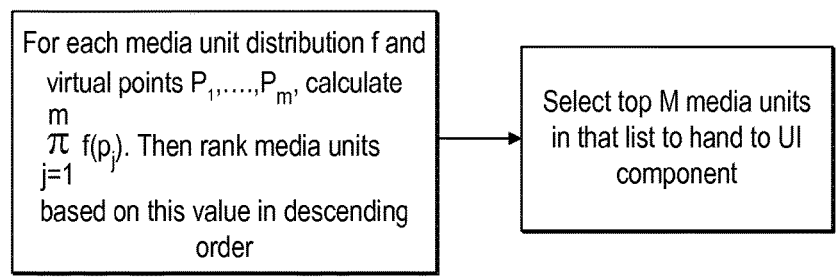
FIG. 27 illustrates a process for use in the process of FIG. 26 to determine media units to associate with a virtual attribute point where the media units represent attributes by means of a probability distributions.

With reference to FIG. 27, in some implementations, for each media unit the product of all distribution values at each of the given virtual points is calculated. More precisely, if a given media unit M has a distribution $f_M$ and if the virtual points provided by the model component 237 are labelled by $p_1, \ldots, p_Z$, then the product $$\prod_{j=1}^{Z} f_M(p_j)$$

is calculated for each media unit and all media units are ranked in decreasing order based on the value of the product. Concretely, if for media unit M the distribution $f_M$ is given by a mean vector $(\mu_{M1}, \ldots, \mu_{Mn})$ and a variance vector $(\sigma_{M1}^2, \ldots, \sigma_{Mn}^2)$ and if $p_i = (p_{i1}, \ldots, p_{in})$ for each $i=1, 2, \ldots, Z$ then $$\prod_{i=1}^{Z} f_M(p_i) = \prod_{i=1}^{Z} \left( \prod_{j=1}^{n} \sigma_{Mj}^{-1} \right) (2\pi)^{\frac{n}{2}} \exp\left( -\sum_{k=1}^{n} \frac{(p_{ik} - \mu_{ik})^2}{2\sigma_{ik}} \right)$$

The media units selected to be shown to the UI component 236 are then taken from the top of that ranking order.

The measure of similarity based on the distribution $f_M$ and sample points $p_1, \ldots, p_Z$ does not have to be the product of the values of the distribution at these sample points. In some implementations the sum of these values is used, i.e.

$$\sum_{j=1}^{Z} f_M(p_j)$$

is used to rank the media units and then provide the top ones to the UI component 236.

In yet another implementation the measure used is the maximum of the values $f_M(p_j)$ for each $j=1 \ldots, Z$.

In some implementations of this process, the mean and variance vectors describing the distributions of the media units in the Search Collection 233 are kept in random access memory (RAM) and the calculations and ranking are done on the fly.

7.4. Implementation of Most Diverse Media Unit Search and Display in the Probabilistic Sampling Framework Analogous to the implementation of the most diverse media unit search process described above in the geometric framework, an implementation of this for the sampling implementations (Sections 7.1-7.3) is now described.

Similar to the description above in the other framework, only the work of the back-end component 238 and UI component 236 has to be modified. In fact, the modification of the UI component is precisely the same as the one described above. Similar to the above, two attributes are selected based on both the priority values given and a statistic from the static ASV data in the semantic representation space 233 for each attribute. Specifically, in some implementations all attributes are ranked according to the product of the priority value and the variance of the attribute coordinate values of all ASV values of the media units given in the specified Search Collection 233 in question.

When the back-end component 238 then receives virtual points from the model component in order to determine new media units from the semantic representation space 233 to present to the UI component in accordance with the implementations of the model component 237 described above, the steps described above for each implementation are modified in the following way. In implementations where the Search Collection 233 consists of points (and not distributions) in ASV, then, with reference to FIG. 23, the distance metric defined in step 2304 and used in step 2308 repeatedly, is only the weighted sum of those two distances of the chosen attributes and none other. The process described in FIG. 23 is thus modified to provide the intended output and the media units returned in step 2316 are then handed to the UI component 236. The UI component 236 then displays the media units as described for the implementations above.

Moreover, the finite scrolling feature described above is also implemented in some implementations. Upon the UI component requesting further media units along one given attribute value, the modified process described above with reference to FIG. 23 is once more called using either the ASV of the furthest MU displayed (as described above) to the user with respect to the given scrolling attribute, or by providing a few evenly spaced virtual points linearly continuing the given two dimensional trajectory the user is taking translated into attribute space and providing the results 2316 back to the UI component.

7.5. Sampling Only Implementation.

A further implementation of the media units search and display 204 is now described with reference to FIG. 5b, in which no Priority Weights are calculated. The UI component 236 remains unaffected and the output of the model component 237 now consists purely of virtual points. The model component 237 works as in all previous implementations described above, but refrains from calculating any Priority Weights. The back-end component 238's task is now to infer the next media units to suggest to the UI component 236 only on the basis of the virtual points transmitted via the model component 237. In one implementation this is done by following the same virtual point retrieval process as above, but setting the Priority Weights that are needed all to 1 (either explicitly or by using a similarity/distance measure that does not involve priority weight). In this way, the media units that are chosen at each iteration are the closest ones with regards to an unweighted, for example Euclidean, metric relative to the virtual points that have been sampled (and possibly sub-sampled or otherwise selected) at the respective iteration.

8. Generalisation to Non-Diagonal Multivariate Normal Distributions

A description is now provided for implementations of the media units search and display 204 in which the probability distributions both described by the feature sets and the probability distributions used to model the users intent are of a more general form. In implementations of the model components 237 of the media unit search and display processes 204 described above using the probabilistic framework so far, three essential steps were taken for each attribute j. As a first step, in step i of the media unit search and display 204, for each attribute distribution $X_j^{(i-1)}$ a distribution $\widehat{X^{(i)}}_j$ is inferred using only the user input that marks out the selected media units via formula (U1) or (U1-2). If there are none, the latter distribution is just declared to be the former. As a second step, using the user input that marks out all the media units that the UI component 236 showed to the user but which were not selected together with the notion of a punishing function F, the distribution $\widehat{X_j^{(i)}}$. F can be sampled. The third step consists of using these sample points and formula (U3) to infer a distribution $X_j^{(i)}$. Some of these sample points are used as Virtual Points to be output and the inferred distribution $X_j^{(i)}$ is used to calculate the Priority Weights, in implementations in which these are required. Where the feature sets consist of parameters describing probability distributions, the process of performing the first update via equation (U1) is replaced with that of equation (U1-2) as described above, but the remaining implementations remain the same. A key part in the above description was that each of $X_j^{(i-1)}$, $\widehat{X^{(i)}}_j$ and $X_j^{(i)}$ is a normal distribution with diagonal covariance matrix. This assumption is now dropped, i.e. the system only assumes that for each attribute j=1, ..., A $X_j^{(i)}$ and $\widehat{X^{(i)}}_j$ are normal distributions. The joint distributions $X^{(i)}$ and $\widehat{X^{(i)}}$ are then also normal distributions given by a block diagonal covariance matrix. Indeed, if instance $X_j^{(i)}$ is described by a mean vector $\mu_j$ and covariance matrix $\Sigma_j$, then the joint distribution p is defined by $$p(x_1, \ldots, x_A) = \frac{1}{Z} \prod_{j=1}^{A} \exp\left(-\frac{1}{2}(x_j - \mu_j)^t \sum_j^{-1} (x_j - \mu_j)\right)$$

$$= \frac{1}{Z} \exp\left\{-\frac{1}{2}\left(\sum_{j=1}^{A} (x_j - \mu_j)^t \sum_j^{-1} (x_j - \mu_j)\right)\right\}$$

$$= \frac{1}{Z} \exp\left\{-\frac{1}{2}(x - \mu)^t \sum^{-1} (x - \mu)\right\}$$

where each $x_j$ is a (column) vector representing a point in the j-th attribute space and x and $\mu$ are the column vector obtained from concatenating all the $x_j$ s and $\mu_j$ s, respectively, i.e.

$$x^t = (x_1, x_2, \ldots, x_A), \mu^t = (\mu_1, \ldots, \mu_A)$$

where Z is a constant and $\Sigma$ is the block diagonal matrix formed as follows:

$$\begin{pmatrix} \Sigma_1 & & & \\ & \Sigma_2 & & \\ & & \ddots & \\ & & & \Sigma_A \end{pmatrix}$$

and where the superscript t denotes the matrix transpose. This is well known, see [http://en.wikipedia.org/wiki/Multivariate normal distribution].

It thus follows that $X^{(i)}$ is a (multivariate) normal distribution with mean vector $\mu$ and block diagonal covariance matrix $\Sigma$. In the descriptions above, the term variance vector was used as a shorthand to identify the diagonal elements in the then used diagonal covariance matrix. In a similar vein, the term "block vector" ($\Sigma_1, \ldots, \Sigma_A$) is used to describe the block diagonal matrix $\Sigma$ efficiently. In all implementations using this more general form of probability distributions, the variance vectors are replaced by with block vectors. Changes to the model component 237 in order to handle these more general conditions are now described: an upgraded inference method generalizing (U1) and (U1-2), a different sampling method and a different formula for the Kullback-Leibler divergence (U3) are required. Turning first to the sampling methods, there are many known and efficient methods to sample random points from a general normal distribution (see Papoulis, A., *Probability, Random Variables, and Stochastic Processes,* 3rd ed., New York: McGraw-Hill, 1991). In some implementations a well-known transformation composed of normalized eigenvectors of the covariance matrix multiplied by the diagonal matrix of the square roots of the corresponding eigenvalues of the covariance matrix is used for sampling. See Papoulis, A., *Probability, Random Variables, and Stochastic Processes,* 3rd ed., New York: McGraw-Hill, 1991.

In implementations of the first step and some implementations of the inference in the third step which estimates the posterior distribution from a collection of sample points, a Bayesian method described in formula (GU) above using a Normal-Gamma prior was used above for each attribute at a time. A one-for-one replacement for this inference method for block-diagonal distributions is now described. Instead of using a Normal-Gamma prior distribution a Normal-Wishart prior distribution is used to infer an updated distribution one attribute at a time. is the Normal-Wishart distribution is a well-known higher dimensional generalization of the Normal-Gamma prior, see [http://en.wikipedia.org/wiki/Normal-Wishart distribution] and the references provided there. In particular, the Normal-Wishart distribution is a conjugate prior distribution to the multivariate Normal distribution, i.e. it describes a distribution over the parameters (mean and covariance matrix) of the multivariate Normal distribution and any Bayesian update of this Normal-Wishart distribution given observations of the multivariate Normal distributions leads to a simple update of the parameters describing the Normal-Wishart distribution (thus the posterior distribution of the Normal-Wishart distribution given such an observation is Normal-Wishart as well and the updated parameters describe this posterior distribution).

Concretely, the analogous update equations for parameters describing the Normal-Wishart distribution given observations $d_1, \ldots, d_n$ to (GU) are now provided. These are labelled (GU-2) below and will be used to derive the analogue (U1-3) to the update equation (U1) below: Suppose the prior parameters are given by $\mu_0, \lambda_0, v_0$ and $T_0$ then the updates (subscripted by 1) are $$\mu_1 = \frac{\lambda_0 \mu_0 + n\overline{d}}{\lambda + n} \quad \text{(GU-2)}$$

$$T_1 = T_0 + \sum_{i=1}^{n} (d_i - \overline{d})(d_i - \overline{d})^t + \frac{\lambda n}{\lambda + n}(\mu_0 - \overline{d})(\mu_0 - \overline{d})^t$$

$$v_1 = v_0 + n$$

$$\lambda_1 = \lambda_0 + n$$

where $$\overline{d} = \frac{1}{n} \sum_{j=1}^{n} d_j$$

is the sample mean. In analogy to the Normal-Gamma prior, the mean of the resulting distribution is at $\mu_1$, $v_1 T_1$ and the mode is at $\mu_1$, $(v_1 - d - 1)T_1$ where d is the dimension of the vector space over which the distribution is defined.

8.1 Point Feature Sets

For feature sets defined in terms of ASV points, with (GU-2) the update equation (U1) is rewritten as follows: in step i, for a given attribute j, given $\lambda_i$ as above, the Q selected media units $S_j^{(i)}=(S_{j1}^{(i)}, \ldots, S_{jQ}^{(i)})$, a mean vector $\mu=(\mu_1, \ldots, \mu_s)$ (where s denotes the dimension of attribute space j) and covariance matrix $\Sigma_{i-1}$ describing the distribution $X_j^{(i-1)}$, then with $$T = \frac{1}{\lambda_i}\sum_j \quad\quad (U1\text{-}3)$$

set $$\hat{\mu} = \frac{\lambda_i \mu + Q\overline{S}_j}{\lambda_i + Q}$$

$$\hat{T} = T + \sum_{k=1}^{Q}(S_{jk}^{(i)} - \overline{S}_j)(S_{jk}^{(i)} - \overline{S}_j)^t + \frac{\lambda_i Q}{\lambda_i + Q}(\mu - \overline{S}_j)(\mu - \overline{S}_j)^t$$

where $\overline{S}_j = \frac{1}{Q}\sum_{k=1}^{Q} S_{jk}^{(i)}$.

The distribution $\widehat{X^{(i)}}_j$ is then given by the mean $\hat{\lambda}$ and covariance matrix $$\widehat{\Sigma}_j = (\lambda_i + Q)\hat{T}$$

8.2. Distribution Feature Sets

Similarly, some implementations of model component 237 are described in which the feature sets representing media units consist of parameters describing probability distributions. In these implementations the update equations for the first step (U1-2) for Media Units represented by normal probability distributions with diagonal covariance matrix as described above are replaced by the equations (U1-4) below. If, as in the description of (U1-2) above, $d_1=(d_{11}, \ldots, d_{1s}), \ldots, d_{QY}=(d_{TY,1}, \ldots, d_{YT,s})$ denote the QY sample points from the Q selected media units in the $j^{th}$ attribute, then, with the notation above, upon defining the adjusted update equation $$\hat{\mu} = \frac{\lambda_i \mu + QY\overline{d}}{\lambda_i + QY} \quad\quad (U1\text{-}4)$$

$$\hat{T} = T + \sum_{k=1}^{QY}(d_k - \overline{d})(d_{jk} - \overline{d})^t + \frac{\lambda_i QY}{\lambda_i + QY}(\mu - widebard)(\mu - \overline{d})^t$$

then $\widehat{X^{(i)}}_j$ is defined by a mean vector $\hat{\mu}$ and covariance matrix $$\widehat{\Sigma}_j = (\lambda_i + QY)\hat{T}$$

where, as above, T was given by $$\frac{1}{\lambda_i}\sum_j .$$

8.3. Priority Weights

Finally, for implementations where Priority Weights are required, equation U3 above is developed in the context of feature sets defined by distributions rather than point values. Specifically, Priority Weights are calculated as is now described.

For step i in attribute j with original prior $X_j^{(0)}$ given by mean vector $\mu_0$ and covariance matrix $\Sigma_0$ and $X_j^{(i)}$ given by mean vector $\mu_i$ and covariance matrix $\Sigma_i$, say, the Priority Weight is again defined to be the Kullback-Leibler divergence of $$w_{ji} = \mathcal{D}_{KL}(X_j^{(i)} \| X_j^{(0)})$$

which is well known to be equal to $$w_{ji} = \frac{1}{2}\left\{tr\left(\sum_0^{-1}\sum_i\right) + (\mu_i - \mu_0)\sum_0^{-1}(\mu_i - \mu_0) - s + \log\left(\frac{\det\sum_0}{\det\sum_i}\right)\right\}$$

where s denotes the dimension of the attribute space, tr stands for the trace operator and det denotes the determinant (see http://en.wikipedia.org/wiki/Multivariate normal distribution).

8.4. Sampling Only Implementation.

The implementation of the media unit search and display 204 using a more general normal distribution as described in this section are easily adapted in the following way to an implementation of the media unit search and display 204 using these more general distributions but refraining from calculating any Priority Weights but using purely sample points. The UI component 236 and back-end component 238 are as described in section 7.3. The model component 237 is as described above (using update equations (U1-3) or (U1-4) dependent on the nature of the feature sets), but, as no Priority Weights are needed, one can express the set of values needed to describe a media unit in one single attributes, i.e. there is but a single set of values describing media units. In this way, the distribution $X^{(i)}$ is equal to $X_1^{(i)}$, i.e. the restriction of the distribution to its single attribute labelled 1, and can be modelled by a general normal distribution defined by a mean vector and general covariance matrix (i.e. any positive definite symmetric matrix). It is noted that this implementation of the media unit search and display 204 is functionally equivalent to bunching all the set of values describing media units in the Search Collection 233 into one set and then setting the single Priority Weight equal to 1 (or any constant) in the above description. This implies that the existing back-end component 238 described above can handle this Priority Weights free mechanism. It is noted that the form of the probability distributions the random variables modelling the user intent at each step $X^{(i)}$ take are general multivariate normal distributions, i.e. their covariance matrices can be any symmetric positive definite matrix and no further structural restrictions apply.

9. Conclusion

It will be understood that the above description of specific implementations has been made by way of example to aid the understanding of the invention and not by way of limitation. It will further be understood that section headings have been included in the text above for presentational reasons to aid the reader and that these heading therefore do not imply any limitation on the disclosed subject matter or any combination of the various features and implementations described above.

What is claimed is:

1. A computer-implemented method of transmitting media units or media unit identifiers for presentation of media units to a user on a user device, the method comprising
    transmitting a set of media units or respective media unit identifiers for presentation of the media units to the user on the user device, each media unit being associated with a respective feature set defining a set of attribute values or a set of parameters defining a probability distribution over attribute values for respective attributes; and repeatedly:
        receiving, via a user interface, a user input made by the user when presented with media units of the set of media units;
        updating a probability distribution over attribute values of the attributes using the user input;
        selecting a next set of media units using the updated probability distribution; and
        transmitting the media units of the next set or respective media unit identifiers for presentation of the media units to the user, on the user interface,
    wherein selecting the next set of media units comprises selecting a media unit of the next set of media units based on similarity of the media unit to a sampled set of attribute values sampled from a sampling distribution,
    wherein each feature set defines a respective set of attribute values and wherein the media units are grouped into media unit groups corresponding to a respective range for each attribute value based on the respective sets of attribute values, and
    selecting the next set of media units comprises:
        selecting a media unit group based on the sampled set of attribute values being within the respective range for each attribute value; and
        selecting a media unit from the media units in the selected media unit group, and wherein the media units are grouped into media unit groups corresponding to a respective range for each attribute value based on the respective sets of attribute values for each of a plurality of levels, the size of the respective ranges increasing from one level to the next, and
    selecting the next set of media units comprises:
        at a first one of the levels, determining if a media unit group exist associated with a range encompassing the sampled set of attribute values;
        if the determination is negative, determining if a media unit group exist associated with a range encompassing the sampled set of attribute values at a second one of the levels, wherein the second one of the levels has larger ranges than the first one of the levels; and
        if the determination is positive, selecting a media unit from the media units in the media unit group associated with the range encompassing the sampled set of attribute values.

2. The method of claim 1, wherein the user input identifies a set of one or more media units not selected by the user.

3. The method of claim 1, wherein receiving the user input comprises receiving one or more media unit identifiers each identifying a respective user-selected media unit selected by the user from media units presented to the user; and
    updating the probability distribution over attribute values of the attributes comprises using each respective feature set of the one or more selected media units.

4. The method of claim 1, wherein the probability distribution is parameterised by one or more parameters and updating the probability distribution comprises:
    updating the distribution over the parameters using the set of attribute values of any selected media units; and
    determining updated parameters of the probability distribution from the distribution over the parameters.

5. The method of claim 4, wherein updating the probability distribution comprises updating the probability distribution using the set of attribute values of any user-selected media units and respective sets of attribute values of at least some remaining media units of the media units presented to the user.

6. The method of claim 5, wherein updating the probability distribution comprises:
    sampling sets of attribute values from the probability distribution with the updated parameters, and
    subsampling the sampled sets of attribute values to define a plurality of subsampled sets of attribute values such as to reduce the similarity between the subsampled set of attribute values and the at least some remaining media units.

7. The method of claim 5, wherein each feature set defines a respective set of attribute values and updating the probability distribution comprises:
    sampling sets of attribute values from the probability distribution with the updated parameters; and
    subsampling the sampled sets of attribute values to define a plurality of subsampled sets of attribute values such as to reduce or eliminate the probability of a set of attribute values of the plurality subsampled sets of attribute values coinciding with any of the sets of attribute values of the at least some remaining media units.

8. The method of claim 6, wherein the probability distribution is a normal distribution and updating the probability distribution comprises determining parameters of the normal distribution from the plurality of subsampled sets of attribute values.

9. The method of claim 1, wherein each feature set defines a respective set of attribute values and selecting the next set of media units comprises:
    for each attribute, computing a distance between the set of attribute values of one of the one or more user-selected media unit and respective sets of attribute values for a plurality of media units;
    computing a weighted combination of the distances for at least some of the attributes, wherein each distance is weighted by a respective attribute weight and the attribute weights are computed using the probability distribution; and
    using the weighted combination of the distances to select the next set of media units.

10. The method of claim 9, wherein computing the attribute weights comprises;
    computing, for each attribute, a measure of information gain between a component of the probability distribution for the attribute after updating and a component of the probability distribution for the attribute before updating; and
    determining each attribute weight based on the respective measure of information.

11. The method of claim 1, wherein the selecting the media unit of the next set of media units based on similarity comprises computing a measure of similarity between the set of attribute values of the media unit and the sampled set of attribute values.

12. The method of claim 1, wherein each feature set defines a respective set of parameters defining a probability distribution over attribute values.

13. The method of claim 12, wherein selecting the next set of media units comprises selecting a media unit of the next set of media units based on values of the respective media unit distribution at a plurality of sampled sets of attribute values sampled from a sampling distribution.

14. The method of claim 1, wherein the sampled set of attribute values is one of the plurality of subsampled sets of attribute values.

15. The method of claim 1, wherein one or more of the attributes are semantic attributes representative of semantic features of items represented by the media units.

16. The method of claim 1, wherein one or more of the attribute values are derived from neural activations of an artificial neural network presented with an image associated with the media unit.

17. A system comprising:
a non-transitory memory;
a communications interface; and
a processor operatively coupled to the memory, wherein the processor is configured to:
transmit a set of media units or respective media unit identifiers for presentation of the media units to the user on a user device, each media unit being associated with a respective feature set to define a set of attribute values or a set of parameters defining a probability distribution over attribute values for respective attributes; and repeatedly: receive, via a user interface, a user input made by the user when presented with media units of the set of media units;
update a probability distribution over attribute values of the attributes using the user input;
select a next set of media units using the updated probability distribution; and
transmit the media units of the next set or respective media unit identifiers for presentation of the media units to the user, on the user interface,
wherein selecting the next set of media units comprises selecting a media unit of the next set of media units based on similarity of the media unit to a sampled set of attribute values sampled from a sampling distribution,
wherein each feature set defines a respective set of attribute values and wherein the media units are grouped into media unit groups corresponding to a respective range for each attribute value based on the respective sets of attribute values, and
selecting the next set of media units comprises:
selecting a media unit group based on the sampled set of attribute values being within the respective range for each attribute value; and
selecting a media unit from the media units in the selected media unit group, and
wherein the media units are grouped into media unit groups corresponding to a respective range for each attribute value based on the respective sets of attribute values for each of a plurality of levels, the size of the respective ranges increasing from one level to the next, and
selecting the next set of media units comprises:
at a first one of the levels, determining if a media unit group exist associated with a range encompassing the sampled set of attribute values;
if the determination is negative, determining if a media unit group exist associated with a range encompassing the sampled set of attribute values at a second one of the levels, wherein the second one of the levels has larger ranges than the first one of the levels; and
if the determination is positive, selecting a media unit from the media units in the media unit group associated with the range encompassing the sampled set of attribute values.

* * * * *